US006731407B1

(12) United States Patent
Hayama

(10) Patent No.: US 6,731,407 B1
(45) Date of Patent: May 4, 2004

(54) IMAGE PROCESSING METHOD AND DEVICE

(75) Inventor: Hitoshi Hayama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/431,634

(22) Filed: Nov. 1, 1999

(30) Foreign Application Priority Data

Nov. 2, 1998 (JP) .......................................... 10-312561
Nov. 2, 1998 (JP) .......................................... 10-312562
Nov. 2, 1998 (JP) .......................................... 10-312563

(51) Int. Cl.$^7$ ................................................ H04N 1/40
(52) U.S. Cl. ........................................ 358/3.2; 358/3.28
(58) Field of Search ................ 358/1.9, 2.1, 3.13–3.22, 358/450, 3.28

(56) References Cited

U.S. PATENT DOCUMENTS 4,736,254 A * 4/1988 Kotera et al. ............... 358/3.23
5,703,695 A * 12/1997 Nguyen ...................... 358/3.16
6,542,258 B1 * 4/2003 Garcia et al. ................. 358/1.9

* cited by examiner

Primary Examiner—Thomas D. Lee
Assistant Examiner—Stephen Brinich
(74) Attorney, Agent, or Firm—Hogan & Hartson, LLP

(57) ABSTRACT

There are provided an image processing method and device. Dithering is executed using a dither matrix of m-valued thresholds (m is an integer $\geq 2$) for comparison with n-valued gradation values (n is an integer $\geq 3$; $n \geq m$). An elementary shape image in a two-valued matrix is formed, for each selected image element of a whole image, which has pixels capable of being divided into ones forming an elementary object image and ones forming an elementary background image, by assigning a validity-indicative value to the former, and an invalidity-indicative value to the latter. For each corresponding selected image element, one of n possible numerical values is stored as a designated gradation value commonly applied to the former. A dither mask in a two-valued matrix identical in size to the dither matrix is stored. This two-valued matrix is formed by assigning the validity-indicative value and the invalidity-indicative value, respectively, to elements of the dither mask corresponding in location to respective ones of the thresholds with reference to which the designated gradation value is made valid, and remaining elements of the same. A dithered image element in a two-valued matrix identical in size to the dither mask is formed by a logical AND operation between each element of each matrix identical in size to the dither mask and constituting the elemetary shape image, and a corresponding one of the elements and the remaining elements.

114 Claims, 31 Drawing Sheets

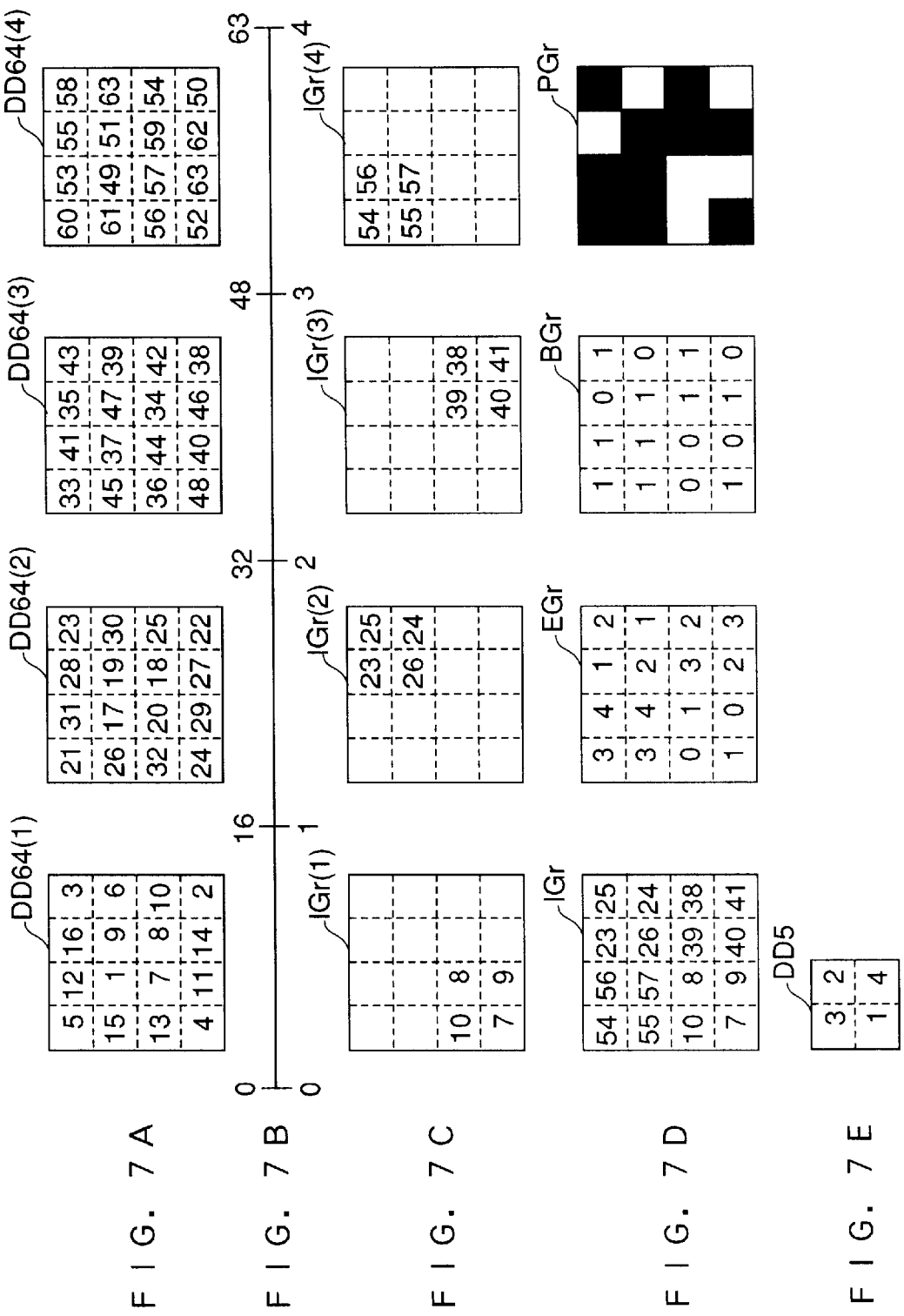

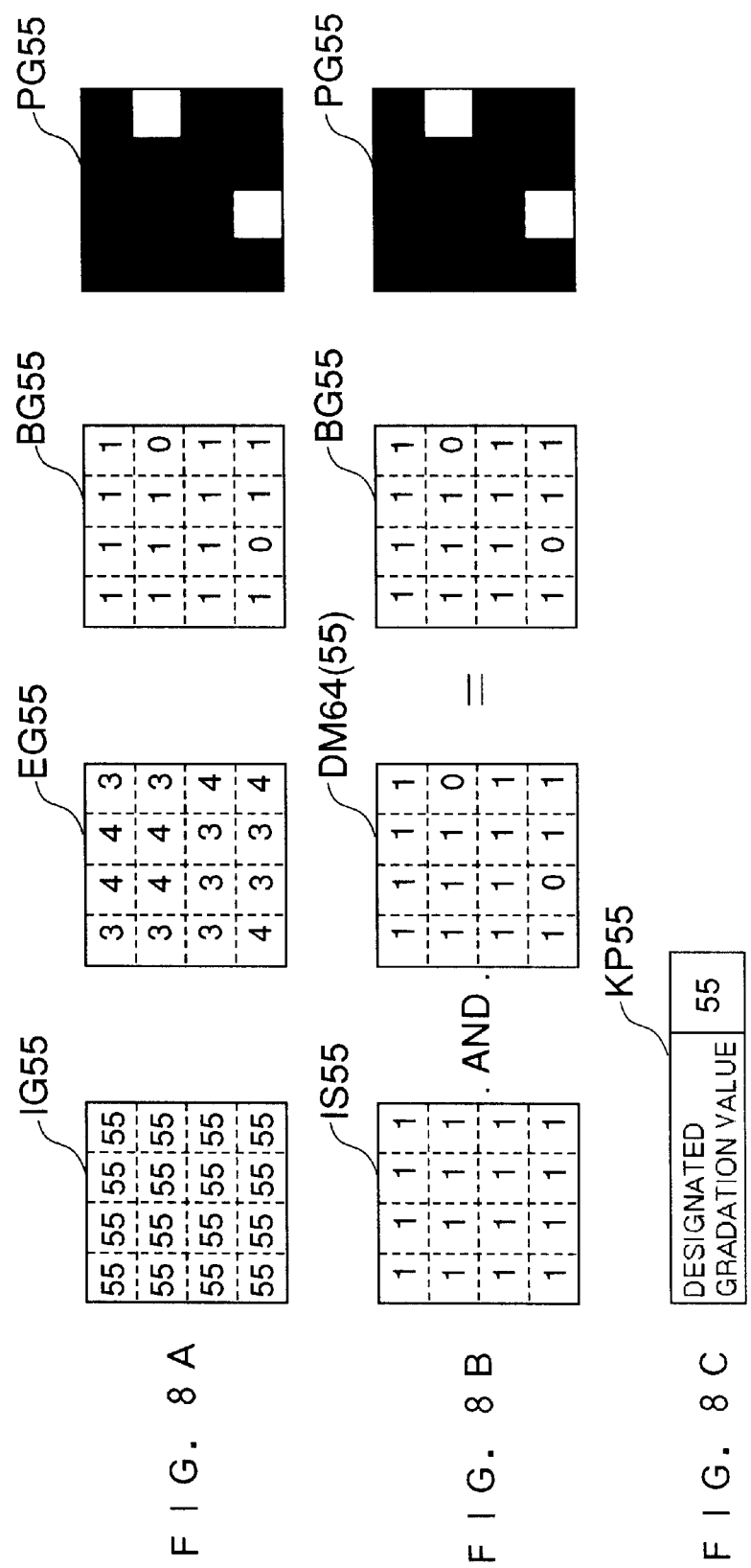

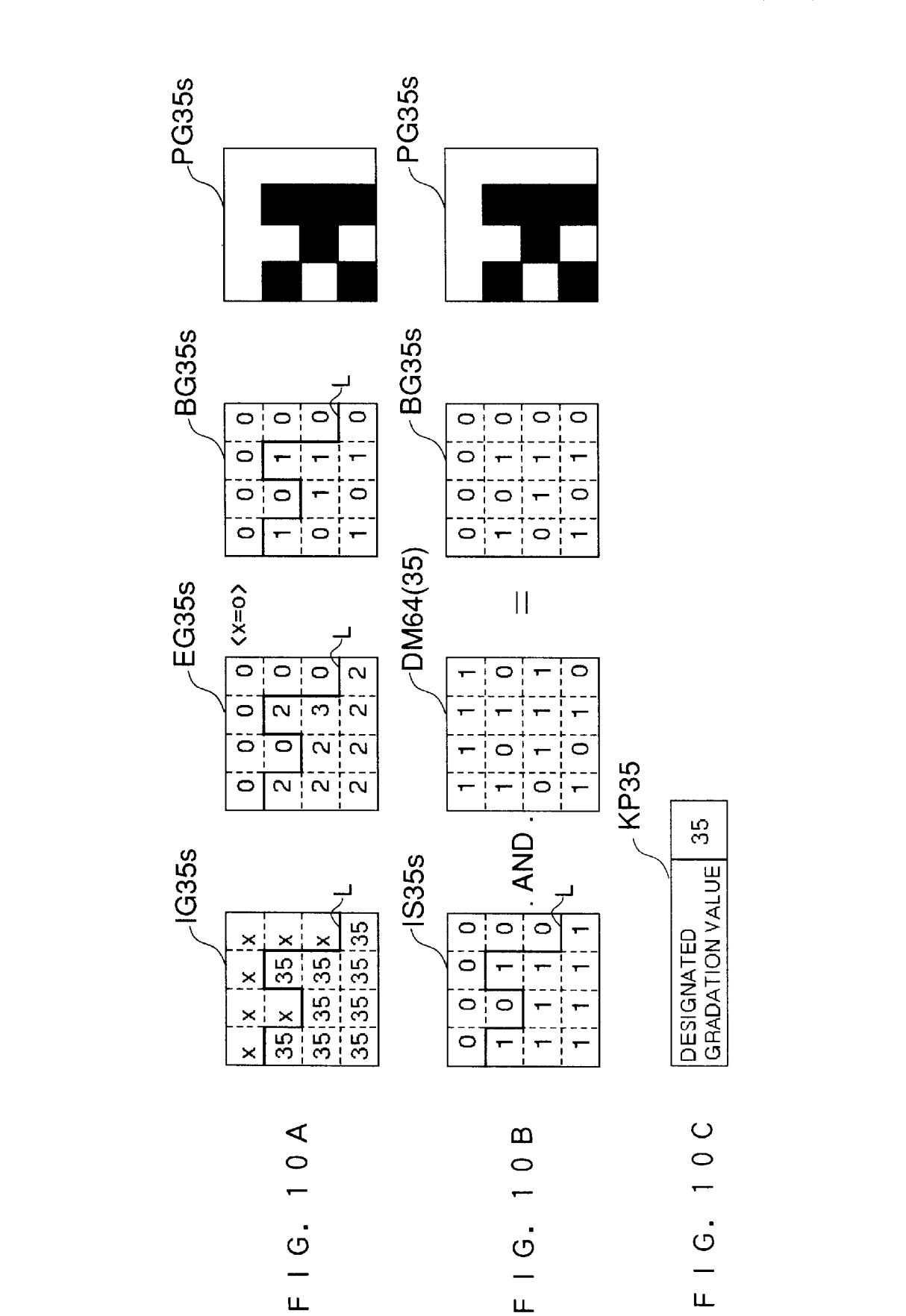

FIG. 11B (IMG)

FIG. 11C (AMG)

FIG. 12A

SG1, SG2, SG3 — pixel grids

FIG. 12B

| K(BLACK) | C | M | Y |
|---|---|---|---|
| MASK NUMBER | 4 | 4 | 4 |

CP1

| LIGHT AMARANTH | C | M | Y |
|---|---|---|---|
| MASK NUMBER | 0 | 2 | 1 |

CP2

| LIGHT YELLOW | C | M | Y |
|---|---|---|---|
| MASK NUMBER | 0 | 0 | 2 |

DD5

$\begin{array}{|c|c|} \hline 3 & 2 \\ \hline 1 & 4 \\ \hline \end{array}$

$\begin{pmatrix} \begin{array}{cc}0&0\\0&0\end{array} & \begin{array}{cc}0&0\\1&0\end{array} & \begin{array}{cc}0&1\\1&0\end{array} & \begin{array}{cc}1&1\\1&0\end{array} & \begin{array}{cc}1&1\\1&1\end{array} \end{pmatrix}$

DGC(DGK)

PGC(PGK)

DGM

PGM

DGC2

PGC2

DGM2

PGM2

F I G. 2 0

| No. | NAME OF COLOR | C | M | Y | K | C2 | M2 | Y2 |
|---|---|---|---|---|---|---|---|---|
| 1 | K(BLACK) | 4 | 4 | 4 | 4 | 0 | 0 | 0 |
| 2 | WHITE | 0 | 0 | 0 | 0 | 0 | 0 | 0 |
| 3 | DARK GRAY | 3 | 3 | 3 | 3 | 0 | 0 | 0 |
| 4 | GRAY | 2 | 2 | 2 | 2 | 0 | 0 | 0 |
| 5 | LIGHT GRAY | 1 | 1 | 1 | 1 | 0 | 0 | 0 |
| 6 | RED | 0 | 4 | 4 | 0 | 0 | 4 | 4 |
| 7 | BLUE | 4 | 4 | 0 | 0 | 4 | 4 | 0 |
| 8 | GREEN | 4 | 0 | 4 | 0 | 4 | 0 | 4 |
| 9 | CYAN | 4 | 0 | 0 | 0 | 4 | 0 | 0 |
| 10 | MAGENTA | 0 | 4 | 0 | 0 | 0 | 4 | 0 |
| 11 | YELLOW | 0 | 0 | 4 | 0 | 0 | 0 | 4 |
| 12 | LIGHT RED | 0 | 2 | 2 | 0 | 0 | 2 | 2 |
| 13 | LIGHT BLUE | 2 | 2 | 0 | 0 | 2 | 2 | 0 |
| 14 | LIGHT GREEN | 2 | 0 | 2 | 0 | 2 | 0 | 2 |
| 15 | LIGHT CYAN | 2 | 0 | 0 | 0 | 2 | 0 | 0 |
| 16 | LIGHT MAGENTA | 0 | 2 | 0 | 0 | 0 | 2 | 0 |
| 17 | LIGHT YELLOW | 0 | 0 | 2 | 0 | 0 | 0 | 2 |
| 18 | AMARANTH | 0 | 4 | 2 | 0 | 0 | 4 | 2 |
| 19 | LIGHT AMARANTH | 0 | 2 | 1 | 0 | 0 | 2 | 1 |
| 20 | ORANGE | 0 | 2 | 4 | 0 | 0 | 2 | 4 |
| 21 | LIGHT ORANGE | 0 | 1 | 2 | 0 | 0 | 1 | 2 |
| 22 | YELLOWISH GREEN | 4 | 0 | 2 | 0 | 4 | 0 | 2 |
| 23 | LIGHT YELLOWISH GREEN | 2 | 0 | 1 | 0 | 2 | 0 | 1 |
| 24 | DARK RED | 2 | 4 | 4 | 2 | 0 | 4-2 | 4-2 |
| 25 | DARK ORANGE | 1 | 2 | 3 | 1 | 0 | 2-1 | 3-1 |

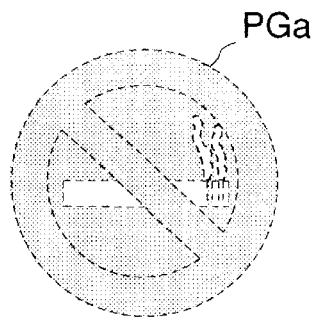
F I G. 2 2 A
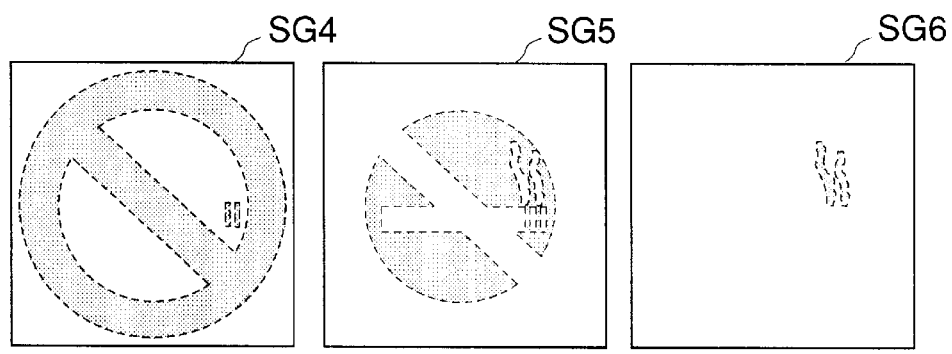
F I G. 2 2 B
| RED | C | M | Y |
|---|---|---|---|
| MASK NUMBER | 0 | 4 | 4 |
CP4
| SLIGHTLY LIGHT BLUE | C | M | Y |
|---|---|---|---|
| MASK NUMBER | 3 | 3 | 0 |
CP5
| LIGHT GRAY | C | M | Y |
|---|---|---|---|
| MASK NUMBER | 1 | 1 | 1 |
CP6
F I G. 2 2 C

IMAGE PROCESSING METHOD AND DEVICE

BACKGROUND OF THE INVENTION

1. Field of the Invention

This invention relates to an image processing method and device for carrying out pseudo-gradation processing on an image by a dither method.

2. Prior Art

When an image is to be out putted e.g. from a workstation, a personal computer, or a word processor (including a personal computer having a word processing program installed therein) to a display device (various kinds of displays) or a printing device (various kinds of printers), an original image cannot be output as it is, dependent on the specifications of the display device or the printing device. To output image data represented by matrix data (hereinafter simply referred to as a "matrix") having gradation values representative of e.g. 256 gradation levels assigned to matrix elements thereof, that is, image data (gradation image data) having information of an n-valued gradation value (n=256 in this embodiment) assigned to each pixel, to a tape printing apparatus capable of processing only image data with a smaller (limited) number of gradation values representative of respective gradation levels, it is required to convert the above image data to one (pseudo-gradation image data) adapted to the limited number of gradation values. One of methods used in such image conversion (compression) processing, that is, pseudo-gradation processing is a so-called dither method. It should be noted that "n-valued gradation value" is intended throughout the specification to mean "gradation value capable of having any one of n possible numerical values", and hence "5-valued gradation value", for instance, is a "gradation value which can have any one of five possible values". Further, "n-valued matrix" is intended throughout the specification to mean "matrix of matrix elements each capable of having any one of n possible numerical values", and hence "5-valued matrix", for instance, is a "matrix of matrix elements which can have any one of five possible values".

The dither method is employed to superimpose noise on gradation values of pixels constituting gradation image data of an original image and then carry out binarization (binary dither method) or limited multi-valued conversion (multi-valued dither method) on values resulting from the superimposition. This method takes advantage of the integrating function of human eyes that recognize contents in an area as a shade or a color. In the binary dither method, for instance, the ratio of assignment of two numerical values (e.g. 1's and 0's) to matrix elements of a matrix are changed according to the gradation values of respective pixels of an input gradation image (for instance, by thinning "1's" in the matrix according to the gradation values under a predetermined rule) to thereby represent intermediate gradation (for instance, a gray color represented by setting 1's and 0's to black and white, respectively). A typical binary dither method is a systematic dither method.

In the systematic dither method, first, for comparison with n-valued gradation values each defined by any one of n possible numerical values (n is an integer equal to or larger than 3) and assigned to pixels forming an original gradation image, a dither matrix of thresholds each defined by any one of m possible numerical values (m is an integer satisfying a condition of $n \geq m \geq 2$) and arranged therein as matrix elements is prepared beforehand. Next, (the matrix of) the original gradation image is divided into matrices each having the size of the dither matrix, and the gradation values of the respective elements of each of the divisional matrices and the corresponding thresholds of the dither matrix are compared with each other on an element-by-element basis to determine whether or not a gradation value satisfies a condition designated by a corresponding threshold. According to results of the determination, either of the numerical values 1 and 0 is assigned to each pixel to thereby form a pseudo-gradation image represented by a binary matrix. For instance, if the gradation value of a matrix element satisfies a condition designated by a corresponding threshold, a numerical value (e.g. 1) indicating validity of the gradation value is assigned to a corresponding matrix element, whereas if the gradation value does not satisfy the condition, a numerical value (e.g. 0) indicating invalidity of the gradation value is assigned to the corresponding matrix element, whereby a pseudo-gradation image represented by a two-valued (binary) matrix (i.e. of matrix elements each having a value 1 or 0) is formed.

By definition of relationship between gradation values and thresholds therefor, the gradation value of each matrix element which is equal to or larger than a corresponding threshold, larger than the threshold, equal to or smaller than the same, or smaller than the same, for instance, can be a gradation value satisfying a condition designated by the corresponding threshold. In the following, the dither method will be described based on a case, for example, in which a gradation value equal to a corresponding threshold also satisfies a condition (i.e. the condition is that the gradation value is equal to or larger than the threshold or that the gradation value is equal to or smaller than the corresponding threshold). Of course, even when the condition is defined such that it is not satisfied when a gradation value=a threshold holds, the gradation values can be processed based on the same principles.

The multi-valued dither method is a dither method in which, a converted (compressed) image, that is, a pseudo-gradation image is not an image represented by a binary matrix (binary image) but an image represented by a multi-gradation matrix of matrix elements having three or more gradation values (multi-valued image). However, it can be processed in the same manner as carried out in the binary dither method. For instance, when a gradation image with 256 gradation values ranging from 0 to 255 is processed, the 256 gradation values are classified into e.g. four ranges of gradation levels, that is, range 1 from 0 to 64, range 2 from 64 to 128, range 3 from 128 to 192 and range 4 from 192 to 255, and dither matrices are provided for application of the systematic dither method to respective ranges of gradation values. Further, two values representative of results of the application of the systematic dither method to range 1 are defined as 0 and 1, two values for range 2 as 1 and 2, two values for range 3 as 2 and 3, and two values for range 4 as 3 and 4. Then, when the systematic dither method is carried out on each range of gradation values, a 5-valued pseudo-gradation image represented by five gradation values of 0 to 4 can be formed. Of course, if the binary dither method is further carried out on such a multi-valued (e.g. 5-valued) pseudo-gradation image, it is also possible to finally obtain a two-valued or binary pseudo-gradation image.

The above pseudo-gradation processing by the dither method (hereinafter referred to as "dithering") can be applied not only to a monochrome image (gradation image having gradation values of gray tones) but also to a color image. That is, in this case, it is only required to carry out the dithering (color dithering) on gradation values of each of basic colors, such as three primary colors. For instance, to form a pseudo-gradation image as a display image to be output to a display or the like, it is only required to carry out dithering of gradation values of each of three primary colors, i.e. R (red), G (green) and B (blue), separately, whereas to form a pseudo-gradation image as a print image for printing, it is only required to carry out dithering of gradation values of each of three primary colors, i.e. C (cyan), M (magenta) and Y (yellow), separately. In the latter case, alternatively, dithering of gradation values of each of four basic colors, i.e. C, M, Y plus K (black) may be separately performed.

In the above dithering, however, a gradation image represented by a matrix in which n-valued gradation values (n≧3: in the above example, n=256) representative of respective gradation levels are used as matrix elements, that is, a gradation image having information of n gradation levels or n-valued gradation values (n=256 in this example) each assigned to a pixel is subjected to the image processing. Further, in the pseudo-gradation processing by the multi-valued dither method (multi-valued dither process), the capacity of the memory device for storing a multi-valued (5-valued, for instance) pseudo-gradation image as a result of the dithering is required. Further, a comparing operation between a gradation image and a dither matrix carried out as a basic process takes a very long processing time. Particularly in the color dithering, basic colors are processed on a primary color-by-primary color basis, and hence the problems of the capacity of the memory device and the long processing time become serious.

In a word processor and the like, when characters including letters, numerals, symbols, graphics and the like (hereinafter generically referred to as "characters") are input to display and print a character string having each of input characters as an element thereof, minimum units for carrying out color specification or the like are characters. Further, in a case where reversed images of characters are to be printed, or in a case where background colors can be set, it is possible to specify a color of the background of characters. Furthermore, in the above case of a character string being displayed and printed, if an image of a character string formed as a display image or a print image is regarded as a whole image, an image of each character included in the character string is an image element.

In the above case, when a character shape image which forms a body or object of each image element is defined as an elementary object image and an image of a background of the elementary object image is defined as an elementary background image, out of pixels of each image element, pixels of an elementary object image of the image element and pixels of an elementary background image as a background of the elementary object image can be discriminated through viewing the same on a display image or a print image. Correspondingly, when image data is processed, out of elements of a matrix representing the image element, matrix elements corresponding to pixels of the elementary object and matrix elements corresponding to pixels of the elementary background image can be distinguished from each other. Further, in this case, gradation values are separately set to the elementary object image and the elementary background image, respectively. That is, all the pixels of the elementary object image are set to an identical gradation value, and all the pixels of the elementary background image are set to an identical gradation value different from that of the elementary object image. It should be noted that in the above case of reversed images of characters, it is possible to regard a background of each character as an elementary object image and the character itself as an elementary background image of the elementary object image.

Similar images can be formed not only by a word processor as a so-called character entry device but also by an image input device (including a personal computer and the like having plotting software (design software) installed therein) which is capable of plotting a desired diagram or a picture for entry. More specifically, also when a diagram or a picture as part of a whole image has a gray tone or color designated therefor, an image of the diagram or picture is an image element, and an image in the shape of the diagram or the picture as a body or object of the image element corresponds to an elementary object image, and can be distinguished from an elementary background image as a background thereof. At least all the pixels of the elementary object image are set to an identical gradation value. Further, however complicated a plotted image is, it can be decomposed into image elements by regarding the plotted image as a synthesized image (whole image) formed by synthesizing the image elements in each of which at least all the pixels of an elementary object image thereof have an identical gradation value. Further, each image element can be decomposed into an elementary object image and an elementary background image other than the elementary object image. The elementary object image and the elementary background image can be distinguished from each other, with at least all the pixels of the elementary object image having an identical gradation value. It should be noted that an image, which is intuitively perceived as a background image, can be regarded as an object image through a change in viewpoint.

Next, differences between gradation values of an elementary object image and those of an elementary background image will be considered. Even if the elementary object image and elementary background image of a single image element can be distinguished from each other as described above, if the difference in gradation value (in density or gray tone) between them is small, e.g. when the density of the elementary object image is low with reference to that of the elementary background image, a boundary (contour line or the like) between the images becomes unclear when the image element is displayed or printed, thereby causing so-called blur to be produced. However, if the gradation values of the elementary object image, for instance, are corrected in a manner such that the density of the elementary object image is uniformly increased, irrespective of the original (designated) gradation values thereof, there is no difference between the present correction case and a case where gradation values close to maximum density are designated for the elementary object image from the very start, which prevents the user's intention from being reflected in the resulting image. Particularly when color images are corrected in such a fashion, the relationship among three or four basic colors can be made unbalanced or far from expressing a desired color tone, producing a different color from one intended by the user.

Further, when the difference in density is generally and uniformly increased (e.g. the elementary object image is increased in density), a so-called collapse of dots (to form a solid black area) or the like is produced. The same inconvenience occurs in a whole image as well, which causes relationship between the image elements to be made unbalanced or collapse of dots through interference between the same. Particularly when an image is output to the printing apparatus, that is, when a print image is formed by carrying out the dithering, if the gradation values of an elementary object image, for instance, are corrected in a manner such that the density of the elementary object image is uniformly increased, the printing apparatus suffers from the problem that the amount of ink droplets to be ejected onto a unit area of a printing object exceeds a limit of the amount of ink which can be absorbed by the unit area (hereinafter referred to as an "ejection amount-limiting value").

SUMMARY OF THE INVENTION

It is a first object of the invention to provide an image processing method and device which permits the dithering to be carried out on a whole image, at least one image element of which has an elementary object image as a body or object thereof whose pixels are distinguishable from the pixels of an elementary background image as the background of the elementary object image, with at least all the pixels of the elementary object image having an identical gradation value, while saving the capacity of a memory device and shortening processing time of the apparatus.

It is a second object of the invention to provide an image processing method and device which permits the dithering to be carried out on the aforementioned whole image, while saving the capacity of the memory device and shortening processing time of the apparatus, as well as preventing formation of so-called blurs or broken lines.

It is a third object of the invention to provide an image processing method and device which permits the dithering to be carried out on the aforementioned whole image, while saving the capacity of the memory device and shortening processing time of the apparatus, as well as reflecting the user's intention and preventing formation of blurs or collapse of dots.

To attain the first object, according to a first aspect of the invention, there is provided a method of carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values.

The method according to the first aspect of the invention is characterized by comprising the steps of:

forming and storing an elementary shape image represented by a first two-valued matrix of predetermined two values, for each of at least one selected image element of a whole image having at least one image element including the at least one selected image element, the at least one selected image element each having pixels which can be divided into pixels forming an elementary object image and pixels forming an elementary background image as a background of the elementary object image, by assigning a validity-indicative one of the two predetermined values to all of the pixels forming the elementary object image, and an invalidity-indicative one of the two predetermined values to all of the pixels forming the elementary background image;

storing, for each corresponding one of the at least one selected image element, one of the n possible numerical values as a designated gradation value commonly applied to the all of the pixels forming the elementary object image;

storing a dither mask represented by a second two-valued matrix of the two predetermined values identical in size to the dither matrix, the second two-valued matrix formed by assigning the validity-indicative one of the predetermined two values to matrix elements of the dither mask corresponding in matrix position to respective ones of the thresholds of the dither matrix with reference to which the designated gradation value satisfies a validity condition, and assigning the invalidity-indicative one of the predetermined two value to remaining matrix elements of the dither mask corresponding in matrix position to respective ones of the thresholds of the dither matrix with reference to which the designated gradation value does not satisfy the validity condition; and forming a dithered image element represented by a third two-valued matrix of the predetermined two values, the dithered image element being identical in size to the dither mask, by carrying out a logical AND operation between each of matrix elements of each of matrices forming the elementary shape image, the each of the matrices being identical in size to the dither mask, and a corresponding one of the matrix elements and the remaining matrix elements of the dither mask, on a matrix element-by-matrix element basis, such that the logical AND operation outputs the validity-indicative value only when the each of the matrix elements and the corresponding one both have the validity-indicative value.

To attain the first object, according to a second aspect of the invention, there is provided an image processing device for carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values.

The image processing device according to the second aspect of the invention is characterized by comprising:

elementary shape image-forming means for forming and storing an elementary shape image represented by a first two-valued matrix of predetermined two values, for each of at least one selected image element of a whole image having at least one image element including the at least one selected image element, the at least one selected image element each having pixels which can be divided into pixels forming an elementary object image and pixels forming an elementary background image as a background of the elementary object image, by assigning a validity-indicative one of the two predetermined values to all of the pixels forming the elementary object image, and an invalidity-indicative one of the two predetermined values to all of the pixels forming the elementary background image;

designated gradation value storage means for storing, for each corresponding one of the at least one selected image element, one of the n possible numerical values as a designated gradation value commonly applied to the all of the pixels forming the elementary object image;

dither mask storage means for storing a dither mask represented by a second two-valued matrix of the two predetermined values identical in size to the dither matrix, the second two-valued matrix formed by assigning the validity-indicative one of the predetermined two values to matrix elements of the dither mask corresponding in matrix position to respective ones of the thresholds of the dither matrix with reference to which the designated gradation value satisfies a validity condition, and assigning the invalidity-indicative one of the predetermined two value to remaining matrix elements of the dither mask corresponding in matrix position to respective ones of the thresholds of the dither matrix with reference to which the designated gradation value does not satisfy the validity condition; and dithered image element-forming means for forming a dithered image element represented by a third two-valued matrix of the predetermined two values, the dithered image element being identical in size to the dither mask, by carrying out a logical AND operation between each of matrix elements of each of matrices forming the elementary shape image, the each of the matrices being identical in size to the dither mask, and a corresponding one of the matrix elements and the remaining matrix elements of the dither mask, on a matrix element-by-matrix element basis, such that the logical AND operation outputs the validity-indicative value only when the each of the matrix elements and the corresponding one both have the validity-indicative value.

According to the image processing method and device, for each of at least one selected image element of a whole image having at least one image element including the at least one selected image element, the at least one selected image element each having pixels which can be divided into pixels forming an elementary object image and pixels forming an elementary background image as a background of the elementary object image, a validity-indicative one of the two predetermined values is assigned to all of the pixels forming the elementary object image, and an invalidity-indicative one of the two predetermined values to all of the pixels forming the elementary background image, thereby forming an elementary shape image represented by a first two-valued matrix of the predetermined two values. In short, there is obtained an elementary shape image represented by two-valued (binary) matrix in which the validity-indicative value is assigned to all the pixels of the elementary object image and the invalidity-indicative value to all the pixels of the elementary background image. Further, for all the pixels of the elementary object image, one of the n possible numerical values is stored as an identical designated gradation value.

In this case, it is only required to store one of binary values (indicative of validity and invalidity, respectively, e.g. "1" and "0") as information of each pixel of each elementary object image, even if the designated gradation value is stored separately from information of each pixel, so that the memory capacity can be made smaller than when information of an n-valued gradation value (n≧3) is stored for each pixel (on a pixel-by-pixel basis).

Further, in this case, the above elementary shape image may be formed based on an image (gradation image) having information of an n-valued gradation value for each pixel and at the same time a designated gradation value may be extracted. Alternatively, the elementary shape image may be formed separately from the designation of a designated gradation value from the beginning. For instance, when the elementary shape image is formed based on a gradation image produced by using the personal computer or the like, a method corresponding to the former may be employed, whereas when characters are entered via the keyboard of a word processor or the like, and a gradation value is designated (gray tone or color designation) on a character-by-character basis for forming an image element, a method corresponding to the latter may be employed.

In the image processing method and device, a dither mask is stored which is represented by a two-valued (binary) matrix having a size identical to a dither matrix. More specifically, as a dither mask, there is stored a matrix in which a validity-indicative one of two predetermined numerical values is assigned to each matrix element corresponding in matrix element location to each threshold of the dither matrix whose condition is satisfied by a designated gradation value, whereas an invalidity-indicative one of the two predetermined numerical values is assigned to each matrix element corresponding in matrix element location to each threshold of the dither matrix whose condition is not satisfied by the designated gradation value.

The dither mask in this case coincides with (the matrix of) a pseudo-gradation image as an image resulting from the binary dither process which is carried out by using the dither matrix on a predetermined gradation image having the same size as that of the dither matrix. In other words, the dither mask coincides with a matrix resulting from a binarization process in which, when a gradation image having the same size as that of the dither matrix has information of an n-valued gradation value per pixel, and at the same time information of gradation values for all the pixels indicates the above designated gradation value, the gradation value of each pixel of the gradation image is compared with each corresponding threshold in the dither matrix and then, the result of the comparison is binarized. It should be noted that in the above case, a dither mask for each of possible designated gradation values may be stored in advance, or a dither mask may be newly produced for storage by comparing a designated gradation value with each threshold in a dither matrix, after the designated gradation value is determined. In the former case, it is possible to omit computing time to thereby shorten processing time of the whole image processing operation. In the latter case, the capacity of the memory device for storing dither masks can be saved. In addition, since the above comparing operations are carried out between matrices having the size of the dither matrix, only relatively short processing time is required therefor.

Further, in the image processing method and device, a logical AND operation is performed between each matrix element of each of matrices of respective portions of an elementary shape image, each of the matrices having the same size as that of the dither mask, and a corresponding one (matrix element corresponding in matrix element location) of the matrix elements of the dither mask, such that a validity-indicative value is output only when both an element of each of the matrices of the respective portions of the elementary shape image and a corresponding matrix element of the dither mask have the validity-indicative value. As a result of the logical AND operation, there is produced a dithered image element represented by a predetermined binary matrix having a size identical to that of the elementary shape image.

More specifically, conventionally, the gradation value of each pixel of each image element matrix having the same size as that of the dither matrix is compared with a corresponding one of the thresholds of the dither matrix, to thereby obtain a pseudo-gradation image. In the image processing method and device, however, to obtain the same advantageous effect, it is only required to perform a simple logical AND operation, whereby it is possible to enhance processing speed (shorten processing time) of the apparatus. Moreover, since the inputs (a dither mask, and a matrix representing an elementary shape image) and output (matrix of dithered image element as a result) of the logical AND operation are represented by binary matrices, the capacity of the memory device can be saved. Of course, when similar processing can be carried out not only on image elements as portions of a whole image but also on the whole image itself, that is, when all the image elements can be divided into elementary object images and elementary background images, binary matrices are applied to the whole image, whereby it is possible to further save the capacity of the memory device as well as shorten processing time of the apparatus.

In the case of the conventional image processing method and device, an original designated gradation value of n is stored as gradation value information of each pixel, so that even if a multi-valued (e.g. 5-valued, described above) pseudo-gradation image is formed, information of the gradation value n is lost. Further, when the pseudo-gradation image is binarized, even multi-valued information thereof is lost. The same applies to the case of the binary dither process being carried out from the beginning, in which the information of the gradation value n is lost by binarization. In other words, to reconfirm a set or determined (designated) gradation value on a display screen, it is required to store an original gradation image, which necessitates an extra capacity of the memory. Further, even when an identical gradation value is designated for all the pixels of the elementary object image of an image element, the fact can not be viewed collectively, so that it is required that the gradation values of all the pixels of the gradation image are displayed or printed for viewing pixel by pixel. In the image processing method and device, however, when an identical gradation value is designated for all the pixels of the elementary object image of an image element, the gradation value designated for the elementary object image is stored separately from information of each pixel, so that the capacity of the memory device can be saved, and at the same time the designated identical gradation value can be collectively and directly confirmed or viewed (by displaying or printing the same, for instance).

For the above reason, in the image processing method and device, the dithering can be carried out on a whole image, at least one image element of which has an elementary object image as a body or object thereof whose pixels are distinguishable from the pixels of an elementary background image as the background of the elementary object image. In this case, all the pixels of at least the elementary object image have an identical gradation value. Therefore, the image processing method makes it possible to save the capacity of the memory device as well as shorten processing time.

Although in the above examples, description is made of a case in which characters are entered via a keyboard and gradation values are designated (a gray tone and a color thereof are designated) for each of the characters to thereby form an image element, this is not limitative, but when gradation values can be designated (a gray tone and a color thereof can be designated) for the background of each of the characters, the background is treated as an elementary object, whereby it is possible to form a dithered image element for the background of the character. This method is suitable for forming dithered image elements in the case of reversed character images of characters. In addition, it can also be applied to obtaining a dithered image element which is formed by carrying out the dithering of a dithered image element for a character as an elementary object image and a dithered image element for the background of the character as an elementary object image combined with (superimposed on) the dithered image element for the character.

Further, however complicated a plotted image is, if it is regarded as a synthesized image (whole image) formed by synthesizing image elements in which at least all the pixels of elementary object images thereof have identical gradation value to each other, the plotted image can be decomposed into each image element. Further, each image element can be decomposed into an elementary object image and an elementary background image other than the elementary object image, and the elementary object image and the elementary background image can be distinguished from each other. Therefore, dithered image elements corresponding to respective image elements are produced to combine the same (superimpose corresponding matrix elements), whereby it is possible to obtain a dithered image element as well, formed by carrying out the dithering of a complicated plotted image.

Similarly, the above image processing method and device can be applied to processing of color images. In this case, the color dithering is carried on the gradation value of each of the three primary colors R, G, B or C, M, Y, or alternatively, each of the four basic colors C, M, Y and K and then, dithered image elements for respective colors may be obtained for combining the same. Further, in this case, after dithered image elements for the respective colors C, M, and Y are obtained, a pixel (matrix element) having a validity-indicative value commonly among the dithered image elements is extracted, whereby it is also possible to obtain a dithered image element for a color K.

Preferably, the predetermined two values are 1 and 0.

According to this preferred embodiment of each of the first and second aspects of the invention, since the two predetermined numerical values are 1 and 0, each pixel can be represented by one bit in one binary digit, so that the memory capacity can be made small. Additionally, the above logical AND operations are logical AND operations performed by using AND elements arranged by one element per pixel or a corresponding program, and it is easy to carry out the operations on a matrix having a size equal to that of a dither matrix or a larger matrix including a plurality of matrices of the same size as the matrix, on a matrix by matrix basis, so that processing time of the apparatus can be further shortened.

More preferably, if the each of the at least one selected image element is a monochrome image,
  the step of storing the one of the n possible numerical values as the designated gradation value comprises the step of storing a gradation value indicative of a shading of the monochrome image as the designated gradation value.

More preferably, if the each of the at least one selected image element is a monochrome image,
  the designated gradation value storage means stores a gradation value indicative of a shading of the monochrome image as the designated gradation value.

According to these preferred embodiments, when image elements are monochrome images, gradation values indicating the gray tones of the images are stored as designated gradation values. Hence, the image elements can be applied to dithering of the gray tones of monochrome image elements.

Preferably, if the each of the at least one selected image element is a color image,
  the step of storing the one of the n possible numerical values as the designated gradation value comprises the step of storing primary color gradation values of respective three primary colors of the color image each as a kind of the designated gradation value;
  the step of storing the dither mask comprises the step of storing at least one primary color dither mask each as a kind of the dither mask, such that a single primary color dither mask corresponds to ones of the primary colors identical in the primary color gradation value; and the step of forming the dithered image element comprises the step of forming three dithered primary color image elements each as a kind of the dithered image element by carrying out the logical AND operation by using a corresponding one of the at least one primary color dither mask as an operand.

Preferably, if the each of the at least one selected image element is a color image, the designated gradation value storage means stores primary color gradation values of respective three primary colors of the color image each as a kind of the designated gradation value;

the dither mask storage means stores at least one primary color dither mask each as a kind of the dither mask, such that a single primary color dither mask corresponds to ones of the primary colors identical in the primary color gradation value; and the dithered image element-forming means forms three dithered primary color image elements each as a kind of the dithered image element by carrying out the logical AND operation by using a corresponding one of the at least one primary color dither mask as an operand.

According to these preferred embodiments, when the image element is a color image, the primary color gradation value of each of the three primary colors is stored as a type of designated gradation value, primary color dither masks corresponding to at least two primary color gradation values different from each other are each stored as a type of dither mask, and primary color dithered image elements corresponding to primary color dither masks are each formed as a kind of dithered image element. That is, when all the primary color gradation values of the three primary colors are identical to each other, at least one primary color dithered image element is formed, and when two of the primary color gradation values of the three primary colors are identical to each other, at least two primary color dithered image elements are formed. Further, when the three primary color gradation values are all different from each other, at least three primary color dithered image elements are formed. In this case, when all the primary color gradation values are identical to each other, one primary color dithered image element is made duplicate use of for the three primary colors, and when two of the primary color gradation values are identical to each other, two primary color dithered image elements are made duplicate use of for the two primary colors. In short, primary color dithered image elements for the three primary colors can be obtained. Therefore, the present image processing method and device can be applied to dithering concerning the primary color gradation values of the three primary colors of a color image element.

In the above case, primary color dither masks for respective possible primary color gradations values may be stored in advance as dither masks. Alternatively, a primary color dither mask may be newly formed for storage by comparing a primary color gradation value with each threshold in a dither matrix, after the primary color gradation value is determined.

More preferably, the method includes the step of forming, as an additional kind of the dithered image element, a dithered mixed color image element in which the validity-indicative value is assigned to only matrix elements each corresponding in matrix position to matrix elements of the three dithered primary color image elements all of which are commonly assigned the validity-indicative value.

More preferably, the image processing device includes dithered mixed color image element-forming means for forming, as an additional kind of the dithered image element, a dithered mixed color image element in which the validity-indicative value is assigned to only matrix elements each corresponding in matrix position to matrix elements of the three dithered primary color image elements all of which are commonly assigned the validity-indicative value.

According to these preferred embodiments, the mixed color dithered image element is produced, as a result of a logical AND operation which is performed between corresponding matrix elements of the formed primary color dithered image elements, such that the validity-indicative value is output only when all the matrix elements have a validity-indicative value. In short, the mixed color dithered image element can be created simply by carrying out a relatively simple logical AND operation.

Further preferably, the dithered mixed color image element is formed by carrying out a logical AND operation of matrix elements, corresponding in location, of the three dithered primary color image elements, such that the logical AND operation outputs the validity-indicative value only when the matrix elements of the three dithered primary color image elements all have the validity-indicative value.

Further preferably, the method further includes the step of converting values of matrix elements of the three dithered primary color image elements corresponding in matrix position to the only matrix elements of the dithered mixed color image element which are assigned the validity-indicative value, to the invalidity-indicative value.

Further preferably, the image processing device further includes mixed-color valid matrix elements-deleting means for converting values of matrix elements of the three dithered primary color image elements corresponding in matrix position to the only matrix elements of the dithered mixed color image element which are assigned the validity-indicative value, to the invalidity-indicative value.

According to these preferred embodiments, a mixed color valid matrix element-deleting process is effected, in which out of matrix elements of each of the primary color dithered image elements formed, having the validity-indicative value, each matrix element corresponding to each matrix element of the mixed color dither mask, having the validity-indicative value, has its validity-indicative value converted to the invalidity-indicative value. By carrying out this deleting process, out of matrix elements of each of the primary color dithered image elements for the three primary colors, having the validity-indicative value, each matrix element corresponding in matrix element location to each matrix element of the mixed color dithered image element, having the validity-indicative value, has its validity-indicative value canceled.

When primary color dithered image elements for the three primary colors and the mixed color dithered image element for the mixed color of the primary colors are combined with each other (superimposed one upon the other), there is redundancy between each matrix element of the mixed color dithered image element, having the validity-indicative value, and the corresponding matrix elements of the three primary color dithered image elements, commonly having the validity-indicative value. As a result, a mixed color by the primary color dithered image elements for the three primary colors and a mixed color by the mixed color dithered image element are redundant. In the image processing method and device, however, this color redundancy can be avoided by the above cancellation of redundant validity of values of matrix elements. Further, when the above-mentioned four colors of C, M, Y, and K are used, for instance, more attractive black can be obtained in general by printing K (black) by itself than by printing K (black) by actually mixing C (cyan), M (magenta) and Y (yellow), so that as described above, a beautiful image printed by using four colors can be obtained, if the value indicating validity commonly among the corresponding matrix elements of primary color dithered image elements for the three primary colors is canceled.

Still more preferably, the step of converting the values of the matrix elements includes the steps of:

forming an inverted dithered mixed color image element by carrying out a logical NOT operation on matrix elements of the dithered mixed color image element, such that the logical NOT operation outputs inverted values of the validity-indicative value and the invalidity-indicative value; and forming updated three dithered primary color image elements by carrying out the logical AND operation between each matrix element of each of the three dithered primary color matrix elements and a corresponding matrix element of the dithered mixed color image element, such that the logical AND operation outputs the validity-indicative value only when the each matrix element and the corresponding matrix element both have the validity-indicative value.

Still more preferably, the mixed-color valid matrix elements-deleting means includes:

inverted dithered mixed color image element-forming means for forming an inverted dithered mixed color image element by carrying out a logical NOT operation on matrix elements of the dithered mixed color image element, such that the logical NOT operation outputs inverted values of the validity-indicative value and the invalidity-indicative value; and updated dithered primary color image element-forming means for forming updated three dithered primary color image elements by carrying out the logical AND operation between each matrix element of each of the three dithered primary color matrix elements and a corresponding matrix element of the dithered mixed color image element, such that the logical AND operation outputs the validity-indicative value only when the each matrix element and the corresponding matrix element both have the validity-indicative value.

According to these preferred embodiments, a logical NOT operation for inverting the validity-indicative value and the invalidity-indicative value is carried out on the mixed color dithered image element, to thereby form a inverted dithered mixed color image element. Then, a logical AND operation is performed between each matrix element of each primary color dithered image element and a corresponding one of the matrix elements of the inverted dithered mixed color image element, such that the validity-indicative value is output only when both matrix elements have the validity-indicative value. As a result of the logical AND operation, there are produced dithered image elements which become new primary color dithered image elements. In other words, in this process, by carrying out a relatively simple logical NOT operation and logical AND operation, out of matrix elements of each of the primary color dithered image elements for the three primary colors, having the validity-indicative value, each matrix element corresponding in matrix element location to each matrix element of the mixed color dithered image element, having the validity-indicative value, has its validity-indicative value canceled.

Preferably, if the each of the at least one selected image element is a color image, the step of storing the one of the n possible numerical values as the designated gradation value comprises the step of storing primary color gradation values of respective three primary colors of the color image each as a kind of the designated gradation value;

the step of storing the dither mask comprises the steps of:

storing at least one provisional primary color dither mask each as a kind of the dither mask, such that a single primary color dither mask corresponds to ones of the primary colors identical in the primary color gradation value;

storing a mixed color dither mask in which the validity-indicative value is assigned to only matrix elements each corresponding in matrix position to matrix elements of the at least one provisional primary color dither mask all of which are commonly assigned the validity-indicative value; and converting, out of matrix elements of each of the at lest one provisional primary color dither mask which have the validity-indicative value, values of matrix elements corresponding in matrix position to matrix elements of the mixed color dither mask which have the validity-indicative value to the invalidity-indicative value, to thereby form at least one primary color dither mask, respectively, and storing the at least one primary color dither mask; and the step of forming the dithered image element comprises the step of forming a dithered mixed color image element corresponding to the mixed color dither mask and three dithered primary color image elements corresponding to the at least one primary color dither mask each as a kind of the dithered image element by carrying out the logical AND operation by using a corresponding one of the mixed color dither mask and the at least one primary color dither mask as an operand.

Preferably, if the each of the at least one selected image element is a color image, the designated gradation value storage means stores primary color gradation values of respective three primary colors of the color image each as a kind of the designated gradation value;

the dither mask storage means comprises:

provisional primary color dither mask storage means for storing at least one provisional primary color dither mask each as a kind of the dither mask, such that a single primary color dither mask corresponds to ones of the primary colors identical in the primary color gradation value;

mixed color dither mask storage means for storing a mixed color dither mask in which the validity-indicative value is assigned to only matrix elements each corresponding in matrix position to matrix elements of the at least one provisional primary color dither mask all of which are commonly assigned the validity-indicative value; and primary color dither mask storage means for converting, out of matrix elements of each of the at lest one provisional primary color dither mask which have the validity-indicative value, values of matrix elements corresponding in matrix position to matrix elements of the mixed color dither mask which have the validity-indicative value to the invalidity-indicative value, to thereby form at least one primary color dither mask, respectively, and storing the at least one primary color dither mask; and the dithered image element-forming means forms a dithered mixed color image element corresponding to the mixed color dither mask and three dithered primary color image elements corresponding to the at least one primary color dither mask each as a kind of the dithered image element by carrying out the logical AND operation by using a corresponding one of the mixed color dither mask and the at least one primary color dither mask as an operand.

According to these preferred embodiments, when an image element is a color image, at least provisional primary color dither masks corresponding to primary color gradation values of the image element different from each other, are each stored as a type of a dither mask, and a mixed color dither mask is stored, which is obtained by assigning the validity-indicative value only to each matrix element thereof corresponding in matrix element location to matrix elements of all the provisional primary color dither masks, commonly having the validity-indicative value. Further, out of matrix elements of each provisional primary color dither mask, having a validity-indicative value, each matrix element corresponding to each matrix element of the mixed color dither mask, having the validity-indicative value, has its validity-indicative value converted to an invalidity-indicative value, and the processed provisional primary color dither mask is stored as a primary color dither mask. Thereafter, a logical AND operation is performed by using the mixed color dither mask and each primary color dither mask, whereby a mixed color dithered image element and each primary color dithered image element corresponding to the mixed color dither mask and each of the primary color dither masks are created as a kind of dithered image element.

In this case, similarly to the above, when the image element is a color image, if all the primary color gradation values of the three primary colors are identical to each other, at least one primary color dithered image element is formed, and when two of the primary color gradation values are identical to each other, at least two primary color dithered image elements are formed. Further, when the three primary color gradation values are all different from each other, at least three primary color dithered image elements are formed. In short, primary color dithered image elements for the three primary colors can be obtained with duplicate use thereof, so that they can be applied to the dithering of the gradation values of three primary colors in a color image element. Further, in this case as well, a provisional primary color dither mask for each of possible primary color gradation values may be stored in advance as a dither mask. Alternatively, a provisional primary color dither mask may be newly formed for storage by comparing a primary color gradation value with each threshold in a dither matrix, after the primary color gradation value is determined. Further, when dither masks corresponding to possible designated gradation values are stored beforehand, after primary color gradation values are determined, a suitable one may be selected from the dither masks and stored as a primary color dither mask again.

Further, according to the image processing method and device, a mixed color dither mask, which is obtained by assigning the validity-indicative value only to each matrix element thereof corresponding in matrix element location to matrix elements of all the provisional primary color dither masks, commonly having the validity-indicative value, is used to carry out a logical AND operation, whereby a mixed color dithered image element corresponding to the mixed color dither mask is formed. Therefore, it is possible to obtain a mixed color dithered image element for use in mixture of the three primary colors, in addition to the above primary color dithered image element in the three primary colors. In short, the dithering of a mixed color can be effected. In the above case, in the primary color dither masks, out of the matrix elements of the provisional primary color dither mask, having the validity-indicative value, each matrix element corresponding to each matrix element of the mixed color dither mask, having the validity-indicative value, has its validity-indicative value converted to the invalidity-indicative value, that is, the validity-indicative value of each matrix element of the provisional primary color dither mask, corresponding to each matrix element of the mixed color dithered image element, having the validity-indicative value, is canceled. Therefore, similarly to the above, in each primary color dithered image element formed by using a corresponding primary color dither mask, a validity-indicative value of a matrix element thereof, which is at the same time a validity-indicative value on a side of the mixed color dithered image element, is canceled, whereby image processing can be carried out to obtain a beautiful image, also when the four colors C, M, Y, and K are used as basic colors, for instance.

Still further preferably, if all of the at least one provisional primary color dither mask are formed based on an identical dither matrix, one of the at least one primary color dither mask which contains a minimum number of matrix elements which have the validity-indicative value is stored as the mixed color dither mask.

According to the preferred embodiment of each of the first and second aspects of the invention, a provisional primary color dither mask, which has the smallest number of matrix elements having a validity-indicative value, is stored as a mixed color dither mask. Now, when all the provisional primary color dither masks are formed based on an identical dither matrix, each matrix element having the validity-indicative value in a provisional primary color dither mask having the smallest number of matrix elements having the validity-indicative value, corresponds to matrix elements of the other provisional primary color dither masks, also having the validity-indicative value. That is, in this case, irrespective of how many types (1 to 3 types) of provisional primary color dither masks are provided in a manner corresponding to the three primary colors, matrix elements having the validity-indicative value in a provisional primary color dither mask having the smallest number of matrix elements having the validity-indicative value, corresponds to matrix elements of the other provisional primary color dither masks, also having the validity-indicative value. Therefore, the provisional primary color dither mask which has the smallest number of matrix elements having the validity-indicative value, can be used as a mixed color dither mask for a mixed color of the three primary colors. It should be noted that the provisional primary color dither masks corresponding to primary color gradation values of the three primary colors can be defined based on the dither matrices having different values from each other. To do this, it is only required to employ the method using the logical AND operation, described hereinafter.

Even more preferably, the mixed color dither mask is one of the at least one provisional primary color dither mask corresponding to one of the primary color gradation values of the three primary colors selected such that the one of the primary color gradation values satisfies the validity condition with respect to a smallest number of thresholds of the dither matrix.

According to the preferred embodiment of each of the first and second aspects of the invention, if a primary color gradation value by which conditions of the smallest number of thresholds in the dither matrix are satisfied, is selected from the gradation values of each of the three primary colors, the mixed color dither mask can be obtained similarly to the case of the provisional primary color dither mask corresponding to a selected primary color gradation value. More specifically, the selection of a primary color gradation value makes it possible to select a provisional primary color dither mask which has the smallest number of matrix elements having the validity-indicative value, to thereby obtain a mixed color dither mask with ease.

Even further preferably, each of the primary color gradation values satisfies the validity condition when the each of the primary color graduation values is equal to or higher than a corresponding one of the thresholds of the dither matrix, and the one of the primary color gradation values of the three primary colors is selected by selecting a smallest one of the primary color graduation values.

According to the preferred embodiment of each of the first and second aspects of the invention, in a case where if a primary color gradation value is equal to or larger than a threshold, a condition designated by the threshold is satisfied, and a matrix element of the dither mask corresponding to the threshold has the validity-indicative value, a provisional primary color dither mask which has the smallest number of matrix elements having the validity-indicative value can be selected simply by selecting the smallest primary color gradation value, thereby permitting a mixed color dither mask to be easily obtained.

Even further preferably, each of the primary color gradation values satisfies the validity condition when the each of the primary color graduation values is equal to or lower than a corresponding one of the thresholds of the dither matrix, and wherein the one of the primary color gradation values of the three primary colors is selected by selecting a largest one of the primary color graduation values.

According to the preferred embodiment of each of the first and second aspects of the invention, in a case where if a primary color gradation value is equal to or smaller than a threshold, a condition designated by the threshold is satisfied, and a matrix element of the dither mask corresponding to the threshold has the validity-indicative value, a provisional primary color dither mask which has the smallest number of matrix elements having the validity-indicative value can be selected simply by selecting the largest primary color gradation value, thereby permitting a mixed color dither mask to be easily obtained.

More preferably, the mixed color dither mask is formed by carrying out the logical AND operation on corresponding matrix elements of the at least one provisional primary color dither mask, such that the logical AND operation outputs the validity-indicative value only when all of the corresponding matrix elements have the validity-indicative value.

According to the preferred embodiment of each of the first and second aspects of the invention, the mixed color dither mask is obtained by carrying out a logical AND operation between corresponding matrix elements of the provisional primary color dither masks such that the validity-indicative value is output only when all the matrix elements have a validity-indicative value. That is, irrespective of whether the provisional primary color dither masks are based on the same dither matrix or not, by carrying out the logical AND operation between the corresponding matrix elements of the provisional dither masks, it is possible to directly obtain matrix elements having the validity-indicative value commonly to all the primary color dither masks, and thereby form the mixed color dither mask.

More preferably, each of the at least one primary color dither mask is formed by carrying out the logical NOT operation on matrix elements of the colored dither, such that the logical NOT operation outputs inverted values of the validity-indicative value and the invalidity-indicative value, to form an inverted mixed color dither mask, and carrying out the logical AND operation between the inverted mixed color dither mask and each of the at least one provisional primary color dither mask such that the logical AND operation outputs the validity-indicative value only when corresponding matrix elements between the inverted mixed color dither mask and each of the at least one provisional primary color dither mask both have the validity-indicative value.

According to the preferred embodiment of each of the first and second aspects of the invention, each primary color dither mask is created in the following manner: First, a logical NOT operation for inverting the validity-indicative value and the invalidity-indicative value is carried out on the mixed color dither mask, to thereby form the inverted mixed color dither mask. Then, a logical AND operation is performed between each matrix element of each provisional primary color dither mask and a corresponding one of the matrix elements of the inverted mixed color dither mask such that the validity-indicative value is output only when both matrix elements have the validity-indicative value. As a result of the logical AND operation, each primary color dither mask is produced. That is, in this case, the primary color dither mask in which validity of matrix elements having the valid-indicative value in a redundant manner with a corresponding one of the mixed color dither mask is cancelled can be produced simply by carrying out the relatively simple logical NOT operation and the logical AND operation.

More preferably, the three primary colors are cyan, magenta, and yellow.

According to the preferred embodiment of each of the first and second aspects of the invention, the three primary colors are C (cyan), M (magenta) and Y (yellow). Therefore, colors are represented by a so-called subtraction color-mixing method which is suitable for representing colors by using reflection when printing is effected by using an XY plotter, a printer or the like. In this case, mixture of the CMY colors (mixed color) is K (black). In this case, it is preferable that the four colors C, M, Y and K (black) which are set to the basic colors.

Preferably, the dithered image element is formed as a print image for being printed on a print material.

According to the preferred embodiment of each of the first and second aspects of the invention, each dithered image element is created as a print image for being printed on a print material, the present method and device be applied to printers as the image processing method and device for creating print images.

More preferably, matrix elements of the dithered image element which have the validity-indicative value correspond to pixels for which ink is to be ejected from an ink jet head.

According to the preferred embodiment of each of the first and second aspects of the invention, since matrix elements of the dithered image element which have the validity-indicative value correspond to pixels for which ink is to be ejected from an ink jet head, the present method and device are suitably applied to ink jet printing apparatuses.

More preferably, the print material is a tape.

According to the preferred embodiment of each of the first and second aspects of the invention, since the print material on which each dithered image element is printed is a tape, the present method and device can be applied to tape printers.

More preferably, the three primary colors are red, green, and blue.

According to the preferred embodiment of each of the first and second aspects of the invention, the three primary colors are R (red), G (green) and B (blue), and colors can be represented by so-called additive color mixture. In this case, the image processing is suitable for a case where illuminants, such as CRTs, liquid crystal displays, and plasma displays, emit light for representation of colors. In addition, in this case, the mixture (mixed color) of the colors R, G, B results in white.

Preferably, the dithered image element is formed as a display image for being displayed on a display screen.

According to the preferred embodiment of each of the first and second aspects of the invention, since the dithered image element is formed as a display image for being displayed on a display screen, the invention can be applied to display devices etc., as the image processing method and device for creating display images.

To attain the second object, according to a preferred embodiment of the first aspect of the invention, the method further includes the step of forming a corrected dithered image element by correcting the dithered image element based on the elementary object image.

To attain the second object, according to a preferred embodiment of the second aspect of the invention, the image processing device further includes corrected dithered image element-forming means for forming corrected dithered image element by correcting the dithered image element based on the elementary object image.

According to the preferred forms of the first and second aspects of the invention, corrected dithered image element is formed by correcting the dithered image element based on the elementary object image. For instance, in the above elementary shape image, the validity-indicative values are assigned to the matrix elements representative of the pixels of the elementary object image, while the invalidity-indicative values are assigned to the matrix elements representative of the pixels of the elementary background image, so that the boundary (contour line of the elementary object image) between the images is clearly shown. However, as a result of a logical AND operation, the validity-indicative values and the invalidity-indicative values are mixed in matrix elements corresponding to the pixels of the elementary object image in the dithered image element, and hence the validity-indicative values and the invalidity-indicative values can be mixed also in matrix elements corresponding to the contour line of the elementary object image. In such a case, the boundary between the elementary object image and the elementary background image, that is, a portion corresponding to the contour line of the elementary object image is made unclear. To overcome this problem, the dithered image element is corrected based on the elementary object image, whereby it is possible to make clear the portion of the dithered image element, corresponding to the contour line of the elementary object image. Therefore, in the corrected dithered image element as a result of the correction, it becomes possible to prevent formation of the blurs or broken lines in the elementary object image, in addition to the above advantageous effects of the dithered image element.

Therefore, the present image processing method and device permits the dithering to be carried out on a whole image, at least one image element of which has an elementary object image as a body thereof whose pixels are distinguishable from pixels of an elementary background image as the background of the elementary object image, with at least all the pixels of the elementary object image having an identical gradation value, while saving the capacity of the memory device and shortening processing time of the apparatus, as well as preventing formation of so-called blurs or broken lines.

Preferably, the step of forming the corrected dithered image element includes the step of assigning the validity-indicative value of the predetermined two values to matrix elements of the dithered image element which correspond to a contour line of the elementary object image.

Preferably, the corrected dithered image element-forming means includes contour line-redrawing means for assigning the validity-indicative value of the predetermined two values to matrix elements of the dithered image element which correspond to a contour line of the elementary object image.

According to these preferred embodiments, in a case where a print image, formed by carrying out the dithering, is output to the printing apparatus, even if ink is exuded during printing, the print image can be prevented from being made unclear, by the reinforced contour line. Further, as described above, the printing apparatus has the ejection amount-limiting value dependent on a printing object. Therefore, since the printing apparatus has the limited amount (hereinafter referred to as a "ejection amount-limiting value") of ink which can be absorbed per unit area of the printing object, if the dithered image element is corrected in a manner such that the density thereof is uniformly increased, it suffers from the problem that the amount of ink ejected to the printing object exceeds the ejection amount-limiting value. However, in this example, it is only required to reinforce the contour line and further, the outside of the contour line is an area free of ink (area to which the invalidity-indicative value is assigned). Accordingly, a problem of the above-mentioned kind is prevented from occurring.

Further preferably, the step of forming and storing the elementary shape image includes the steps of:

forming an elementary object contour image represented by a two-valued matrix, based on a predetermined outline font, by assigning the validity-indicative value to only matrix elements forming a contour of the elementary object image, and assigning the invalidity-indicative value to the other matrix elements, and storing the elementary object contour image; and forming the elementary shape image by assigning the validity-indicative value to ones of the other matrix elements which are assigned the invalidity-indicative value, the ones being enclosed by the matrix elements forming the contour of the elementary object image.

Further preferably, the elementary shape image-forming means includes:

elementary object contour image-forming means for forming an elementary object contour image represented by a two-valued matrix, based on a predetermined outline font, by assigning the validity-indicative value to only matrix elements forming a contour of the elementary object image, and assigning the invalidity-indicative value to the other matrix elements, and storing the elementary object contour image; and elementary object contour-filling means for forming the elementary shape image by assigning the validity-indicative value to ones of the other matrix elements which are assigned the invalidity-indicative value, the ones being enclosed by the matrix elements forming the contour of the elementary object image.

According to these preferred embodiments, first, the validity-indicative value out of the two predetermined values is assigned only to each matrix element forming the contour line of the elementary object image based on a predetermined outline font, while the invalidity-indicative value out of the two predetermined values is assigned to each of the other matrix elements, whereby a character (elementary object) contour image represented by a predetermined binary matrix is produced. Then, out of the matrix elements having the invalidity-indicative values assigned thereto of the elementary object contour line image, matrix elements surrounded by matrix elements forming the contour line of the elementary object image have the validity-indicative values assigned thereto, whereby an elementary shape image represented by an elementary shape image matrix is created.

Since the outline font is defined by coordinates of the contour line and attributes thereof, the process of forming an image based on the outline font is generally executed by carrying out a contour-plotting process (contour line image-forming process: process of assigning validity-indicative values to matrix elements forming the contour line) and a so-called filling process (process of filling the inside of a contour line: process of assigning validity-indicative values to all the matrix elements inside the contour line) for filling a portion inside the contour line plotted. In short, in the above case, the elementary shape image can be easily formed by a general image-forming method carried out based on an outline font.

Further preferably, the step of forming the elementary object contour image includes the step of drawing a contour line of the elementary object image based on the predetermined outline font again onto the dithered image element.

Further preferably, the contour line-redrawing means includes elementary object contour line-redrawing means for drawing a contour line of the elementary object image based on the predetermined outline font again onto the dithered image element.

According to these preferred embodiments, a process similar to the contour-plotting process (contour line image-forming process) in the input character image-forming process (elementary shape image-forming process) is carried out on the dithered image element, that is, a elementary object contour-replotting process for replotting the contour line is executed on the dithered image element, so that it is possible to easily assign the validity-indicative value to matrix elements corresponding to the contour line of the elementary object image of the dithered image element, without additionally providing a new function.

Still more preferably, the step of forming the elementary object contour image includes the step of carrying out the logical OR operation on each matrix element of the dithered image element and a corresponding matrix element of the elementary object contour image such that the logical OR operation causes a corresponding matrix element of the elementary object contour image to have the validity-indicative value when the each matrix element or the corresponding matrix element has the validity-indicative value.

Still more preferably, the contour line-redrawing means includes logical OR operation means for carrying out the logical OR operation on each matrix element of the dithered image element and a corresponding matrix element of the elementary object contour image such that the logical OR operation causes a corresponding matrix element of the elementary object contour image to have the validity-indicative value when the each matrix element or the corresponding matrix element has the validity-indicative value.

According to these preferred embodiments, a logical OR operation is performed between each matrix element of each dithered image element matrix and a corresponding one of the matrix elements of the elementary object contour image matrix, such that each resulting matrix element has the validity-indicative value when either of the matrix elements has the validity-indicative value. That is, in the elementary object contour image matrix, the validity-indicative values are assigned only to matrix elements constituting the contour line of the elementary object image. Hence, a logical OR operation is carried out between the elementary object contour image matrix and the dithered image element matrix, whereby the validity-indicative values can be easily assigned to matrix elements corresponding to the contour line of the elementary object image of the dithered image element matrix. Further, it is only required to perform a logical OR operation, thereby enabling processing time of the apparatus to be shortened.

More preferably, the step of forming the corrected dithered image element includes the step of determining whether or not the elementary object image has a predetermined characteristic, and when it is determined that the elementary object image has the predetermined characteristic, the dithered image element is corrected to set the result image to the corrected dithered image element, and when it is determined that the elementary object image does not have the predetermined characteristic, the dithered image element is directly set to the corrected dithered image element without any correction.

More preferably, the corrected dithered image element-forming means includes elementary object image characteristic-determining means for determining whether or not the elementary object image has a predetermined characteristic, and when it is determined that the elementary object image has the predetermined characteristic, the dithered image element is corrected to set the result image to the corrected dithered image element, and when it is determined that the elementary object image does not have the predetermined characteristic, the dithered image element is directly set to the corrected dithered image element without any correction.

According to these preferred embodiments, it is determined whether or not the elementary object mage has predetermined characteristics. If it is determined that the elementary object mage has the predetermined characteristics, the dithered image element is corrected to a corrected dithered image element (character contour-replotting process). If it is determined that the elementary object mage does not have the predetermined characteristics, the dithered image element is used as a corrected dithered image element. That is, by determining whether or not the elementary object mage has the predetermined characteristics, a dithered image element to be corrected can be limited, and when there are a plurality of dithered image elements, it is possible to shorten whole processing time of the apparatus in comparison with a case where the plurality of dithered image elements are uniformly corrected.

Further preferably, the predetermined characteristic includes a characteristic concerning a size of the elementary object image, and whether or not the elementary object image has the predetermined characteristic is determined based on a dot size.

According to this preferred embodiment of the first and second aspects of the invention, the predetermined characteristics include a characteristic as to the size of the elementary object image. Clarity of a result of the dithering, particularly clarity of a result of so-called thinning depends on the size of the elementary object image, and if attention is paid to one of various sizes which is liable to influence clarity of a result of the dithering, a dithered image element to be corrected can be restricted, thereby enabling efficient correction of dithered images. Further, in the above case, the determination is effected based on general dot sizes, which makes it easy to carry out the dithering.

Further preferably, the predetermined characteristic includes a property that a whole shape of the elementary object image has a size smaller than a predetermined size.

According to this preferred embodiment of the first and second aspects of the invention, the predetermined characteristics include a condition that the whole size of the elementary object image is smaller than a predetermined size. That is, when the whole size of the elementary object image is small, if irregularities in thickness are produced at portions of the contour line or the like by so-called thinning operation, the irregularities become more conspicuous as the whole size of the elementary object image becomes small, which makes it difficult to grasp the original shape of the elementary object image. Therefore, when the whole size of the elementary object image is smaller than the predetermined size, it is possible to enhance clarity of the image and prevent formation of blur or the like by correcting the dithered image element created.

Further preferably, the predetermined characteristic includes a property that a line width of the elementary object image is smaller than a predetermined size.

According to this preferred embodiment of the first and second aspects of the invention, the predetermined characteristics include a condition that the elementary object image has a line width smaller than a predetermined size. In this case, even the character images having the same size can have different line widths dependent on the typeface, and hence there can be a case where it is impossible to carry out appropriate determination by the size of the whole shape of the above mentioned elementary object image alone. Further, even if the general shape can be grasped, if there is a narrow portion, it can be broken. To overcome this inconvenience, when the elementary object image has a line width smaller than a predetermined size, the dithered image element created is corrected thereby making it is possible to enhance clarity of the image and prevent formation of blur or the like.

To attain the third object, according to a third aspect of the invention, there is provided a method of carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values.

The method according to the third aspect of the invention is characterized by comprising the steps of:

forming and storing an elementary shape image represented by a first two-valued matrix of predetermined two values, for each of at least one selected image element of a whole image having at least one image element including the at least one selected image element, the at least one selected image element each having pixels which can be divided into pixels forming an elementary object image and pixels forming an elementary background image as a background of the elementary object image, by assigning a validity-indicative one of the two predetermined values to all of the pixels forming the elementary object image, and an invalidity-indicative one of the two predetermined values to all of the pixels forming the elementary background image;

storing, for each corresponding one of the at least one selected image element, one of the n possible numerical values as a designated gradation value commonly applied to the all of the pixels forming the elementary object image;

determining a corrected gradation value determining means for determining a corrected gradation value based on the designated gradation value;

storing a dither mask represented by a second two-valued matrix of the two predetermined values identical in size to the dither matrix, the second two-valued matrix formed by assigning the validity-indicative one of the predetermined two values to matrix elements of the dither mask corresponding in matrix position to respective ones of the thresholds of the dither matrix with reference to which the corrected gradation value satisfies a validity condition, and assigning the invalidity-indicative one of the predetermined two value to remaining matrix elements of the dither mask corresponding in matrix position to respective ones of the thresholds of the dither matrix with reference to which the designated gradation value does not satisfy the validity condition; and forming a dithered image element represented by a third two-valued matrix of the predetermined two values, the dithered image element being identical in size to the dither mask, by carrying out a logical AND operation between each of matrix elements of each of matrices forming the elementary shape image, the each of the matrices being identical in size to the dither mask, and a corresponding one of the matrix elements and the remaining matrix elements of the dither mask, on a matrix element-by-matrix element basis, such that the logical AND operation outputs the validity-indicative value only when the each of the matrix elements and the corresponding one both have the validity-indicative value.

To attain the third object, according to a fourth aspect of the invention, there is provided an image processing device for carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values.

The image processing device according to the fourth aspect of the invention is characterized by comprising:

elementary shape image-forming means for forming and storing an elementary shape image represented by a first two-valued matrix of predetermined two values, for each of at least one selected image element of a whole image having at least one image element including the at least one selected image element, the at least one selected image element each having pixels which can be divided into pixels forming an elementary object image and pixels forming an elementary background image as a background of the elementary object image, by assigning a validity-indicative one of the two predetermined values to all of the pixels forming the elementary object image, and an invalidity-indicative one of the two predetermined values to all of the pixels forming the elementary background image;

designated gradation value storage means for storing, for each corresponding one of the at least one selected image element, one of the n possible numerical values as a designated gradation value commonly applied to the all of the pixels forming the elementary object image;

corrected gradation value-determining means for determining a corrected gradation value based on the designated gradation value;

dither mask storage means for storing a dither mask represented by a second two-valued matrix of the two predetermined values identical in size to the dither matrix, the second two-valued matrix formed by assigning the validity-indicative one of the predetermined two values to matrix elements of the dither mask corresponding in matrix position to respective ones of the thresholds of the dither matrix with reference to which the corrected gradation value satisfies a validity condition, and assigning the invalidity-indicative one of the predetermined two value to remaining matrix elements of the dither mask corresponding in matrix position to respective ones of the thresholds of the dither matrix with reference to which the designated gradation value does not satisfy the validity condition; and dithered image element-forming means for forming a dithered image element represented by a third two-valued matrix of the predetermined two values, the dithered image element being identical in size to the dither mask, by carrying out a logical AND operation between each of matrix elements of each of matrices forming the elementary shape image, the each of the matrices being identical in size to the dither mask, and a corresponding one of the matrix elements and the remaining matrix elements of the dither mask, on a matrix element-by-matrix element basis, such that the logical AND operation outputs the validity-indicative value only when the each of the matrix elements and the corresponding one both have the validity-indicative value.

According to the image processing method and device, a dither mask is stored which is represented by a binary (two-valued) matrix having a size identical to a dither matrix and having two possible predetermined values. More specifically, a matrix is stored as a dither mask, in which a validity-indicative value out of the two predetermined numerical values is assigned to each matrix element corresponding to each threshold of the dither matrix, whose condition is satisfied by a designated gradation value, whereas an invalidity-indicative value out of the two predetermined numerical values is assigned to each matrix element corresponding to each threshold of the dither matrix, whose condition is not satisfied by the designated gradation value.

The dither mask in this case coincides with (the matrix of) a pseudo-gradation image as an image resulting from the binary dither process which is carried out by using the dither matrix on a predetermined gradation image having the same size as that of the dither matrix. In other words, the dither mask coincides with a matrix resulting from a binarization process in which, when a gradation image having the same size as that of the dither matrix has n-valued information per pixel capable of having n possible gradation values, and at the same time information of the gradation values for all the pixels indicates the above designated gradation value, the gradation value of each pixel of the gradation image is compared with a corresponding threshold therefor in the dither matrix and then, the result of the comparison is binarized. It should be noted that in the above case, dither masks for possible designated gradation values may be stored in advance, or a dither mask may be newly produced for storage by comparing a designated gradation value with each threshold in a dither matrix, after the designated gradation value is determined. In the former case, it is possible to omit computing time to shorten processing time.

Further, in the image processing method and device, a corrected gradation value is determined based on each designated gradation value. In this case, since the user's intention reflects on the designated gradation value, it is possible to cause the user's intention to reflect on the corrected gradation value produced based on the designated gradation value. Further, since the dithered image element is formed by using a dither mask corresponding to this corrected gradation value, it is also possible to cause the user's intention to reflect on the dithered image element. On the other hand, the dither mask used in this process corresponds to the designated gradation value not directly but via the corrected gradation value, so that by contriving methods of causing corrected gradation values to correspond to designated gradation values, gradation values can be corrected in various manners according to designated gradation values.

In correcting gradation values, the following method can be contemplated. That is, e.g. when gradation values designated for image elements of a whole image are concentrated within a narrow portion within a value range of n gradation values to make a very slight difference between the designated gradation values, corrected gradation values are determined by enlarging the very slight difference to disperse the gradation values, whereby correction is performed such that a contrast between the image elements is amplified for emphasis on the user's intention (making a difference between designated gradation values) Further, only when the difference in density between the elementary object image and elementary background image of each image element is small (for instance, when the density of the elementary background image is low with respect to that of the elementary background image), the difference in density is enlarged (to increase the density), whereas when the difference in density is large, corrected gradation values are made identical to designated gradation values, whereby it is possible to prevent formation of blur as well as generation of collapse of dots through value-correcting operations. In the above cases, correcting processing may be branched in a program according to the designated gradation values for determination of corrected gradation values. Alternatively, a table correlating designated gradation values with corrected gradation values may be provided to determine corrected gradation values with reference to the table.

Therefore, the present image processing method and device permit the dithering to be carried out on a whole image, at least one image element of which has an elementary object image as a body or object thereof whose pixels are distinguishable from pixels of an elementary background image as the background of the elementary object image, with at least all the pixels of the elementary object image having an identical gradation value, whereby it is made possible not only to save the memory capacity and shorten processing time of the apparatus but also to reflect the user's intention as well as correct gradation values to prevent formation of blur and collapse of dots.

Further, the same advantageous effects as provided by the first and second aspects of the invention can be obtained.

Preferably, the step of determining the corrected gradation value includes determining whether the designated gradation value is within a predetermined range for correction, and correcting the designated gradation value to the corrected gradation value when it is determined that the designated gradation value is within the predetermined range for correction, or setting the designated gradation value directly to the corrected gradation value without correction.

Preferably, the corrected gradation value-determining means determines whether the designated gradation value is within a predetermined range for correction, and corrects the designated gradation value to the corrected gradation value when it is determined that the designated gradation value is within the predetermined range for correction, or sets the designated gradation value directly to the corrected gradation value without correction.

According to these preferred embodiments, it is determined whether or not a designated gradation value is within a predetermined correcting range, and if it is within the predetermined range, the designated gradation value is adjusted to set a corrected gradation value, whereas if it is out of the predetermined range, the designated gradation value is determined as a corrected gradation value as it is. That is, by determining whether or not a designated gradation value is within a predetermined range of correction, the designated gradation value to be corrected can be limited within the correcting range, whereby it is possible to reduce generation of problems (collapse of dots and the like) in comparison with uniform correction of designated gradation values. In the above case, as described above, dither masks for possible corrected gradation values may be stored in advance. Alternatively, a dither mask may be newly formed for storage by comparing a corrected gradation value with each threshold in a dither matrix, after the corrected gradation value is determined. In the former case, after the corrected gradation value is determined, a dither mask corresponding to the same may be selected, or a dither mask, which is selected beforehand based on a designated gradation value (identical to a corrected gradation value when the designated gradation value is out of a correcting range), may be selected (changed) based on a corrected gradation value, only when the designated gradation value is determined to be within a correcting range.

More preferably, the predetermined range for correction is a range corresponding to a range of color density lower than a predetermined value.

According to the preferred embodiment of each of the third and fourth aspects of the invention, a predetermined correcting range is determined as a range corresponding to density equal to or lower than a predetermined reference level, whereby a designated gradation value to be corrected can be limited within a range corresponding to the density equal to or lower than the predetermined reference level of density. This makes it possible to exclude a designated gradation value corresponding to high density (density exceeding the predetermined reference level) from a range of designated gradation values to be corrected. As a result, the designated gradation value can be easily corrected such that formation of blur is prevented and at the same time collapse of dots due to a correction operation is also prevented. Especially when an image is output to the printing apparatus, more specifically, when a dithered image element for a print image is formed by carrying out the dithering thereon, if the image is caused to have a corrected gradation value which is further increased in density based on a designated gradation value corresponding to high density, there is a fear that the amount of ink droplets ejected to a printing object exceeds the ejection amount-limiting value as described above. In the present image processing method and device, however, the predetermined correcting range is a range corresponding to density equal to or lower than a predetermined reference level, which causes almost no problems, even if correction operation of uniformly increasing the density of a gradation value in the correcting range, for instance, is carried out without much attention. This enables correction processing to be carried out with ease.

More preferably, the predetermined range for correction is defined based on a ratio of a color density corresponding to the designated gradation value to a maximum color density.

According to the preferred embodiment of each of the third and fourth aspects of the invention, the predetermined correcting range is defined based on a ratio, that is, based on percentage, for instance, of density corresponding to a designated gradation value to the maximum density. This makes it easy to grasp an image of the range of density to be corrected. Further, since the image of the range of density can be easily recognized, it becomes easy to define and change the range of density.

More preferably, the predetermined range for correction is defined as a range of gradation values.

According to the preferred embodiment of each of the third and fourth aspects of the invention, since the predetermined range for correction is defined as a range of gradation values, the determination can be directly carried out from the designated gradation value, and it is easy to effect the determination and to define the range.

More preferably, the predetermined range for correction is defined as a range of numbers of matrix elements of the dither mask to which the validity-indicative value is assigned assuming that the designated gradation value is directly set to the corrected gradation value without correction.

According to the preferred embodiment of each of the third and fourth aspects of the invention, a predetermined correcting range is defined as the range of the number of the matrix elements of a dither matrix, having the validity-indicative value assigned thereto, assuming that a designated gradation value is used as an adjustment value for correction as it is. Density does not necessarily have a predetermined (e.g. linear) relationship with a change in a gradation value, depending on a manner of defining dither matrices, so that in such a case, a desired correcting range can be more easily defined in association with density, if the correcting range is defined by the number of matrix elements having the validity-indicative value assigned thereto in a dither matrix having a predetermined relationship with density. In this case, although the number of the matrix elements of the dither mask, having the validity-indicative value assigned thereto, may be directly counted, this is not limitative, but it is convenient if a table correlating the numbers of matrix elements with designated gradation values and a table correlating the numbers of matrix elements with corrected gradation values are separately provided for reference, or if a table correlating designated gradation values, the numbers of matrix elements of a dither mask, having the validity-indicative value assigned thereto, and corrected gradation values with each other are provided for reference.

Preferably, the predetermined two values are 1 and 0.

Preferably, if the each of the at least one selected image element is a monochrome image, the step of storing the one of the n possible numerical values as the designated gradation value comprises the step of storing a gradation value indicative of a shading of the monochrome image as the designated gradation value.

Preferably, if the each of the at least one selected image element is a monochrome image, the designated gradation value storage means stores a gradation value indicative of a shading of the monochrome image as the designated gradation value.

More preferably, if the each of the at least one selected image element is a color image, the step of storing the one of the n possible numerical values as the designated gradation value comprises the step of storing primary color gradation values of respective three primary colors of the color image each as a kind of the designated gradation value;

the step of determining the corrected gradation value comprises the step of determining a corrected primary color gradation value for each of the primary colors based on a corresponding one of the primary color gradation values, as a kind of the corrected gradation value;

the step of storing the dither mask comprises the step of storing at least one primary color dither mask each as a kind of the dither mask, such that a single primary color dither mask corresponds to ones of the primary colors identical in the corrected primary color gradation value; and the step of forming the dithered image element comprises the step of forming three dithered primary color image elements each as a kind of the dithered image element by carrying out the logical AND operation by using a corresponding one of the at least one primary color dither mask as an operand.

More preferably, if the each of the at least one selected image element is a color image, the designated gradation value storage means stores primary color gradation values of respective three primary colors of the color image each as a kind of the designated gradation value;

the corrected gradation value-determining means determines the corrected gradation value comprises the step of determining a corrected primary color gradation value for each of the primary colors based on a corresponding one of the primary color gradation values, as a kind of the corrected gradation value;

the dither mask storage means stores at least one primary color dither mask each as a kind of the dither mask, such that a single primary color dither mask corresponds to ones of the primary colors identical in the corrected primary color gradation value; and the dithered image element-forming means forms three dithered primary color image elements each as a kind of the dithered image element by carrying out the logical AND operation by using a corresponding one of the at least one primary color dither mask as an operand.

According to these preferred embodiments, when the image element is a color image, primary color gradation values of the three primary colors are stored as types of designated gradation values, corrected primary color gradation values for the primary colors are determined based on the respective primary color gradation values, as kinds of the corrected gradation value, primary color dither masks corresponding to at least two corrected primary color gradation values different from each other are each stored as a type of dither mask, and primary color dithered image elements corresponding to primary color dither masks are formed as kinds of dithered image elements. That is, when all the corrected primary color gradation values of the three primary colors are identical to each other, at least one primary color dithered image element is formed, and when two of the corrected primary color gradation values of the three primary colors are identical to each other, at least two primary color dithered image elements are formed. Further, when the three corrected primary color gradation values are all different from each other, at least three primary color dithered image elements are formed. In this case, when all the corrected primary color gradation values are identical to each other, one primary color dithered image element is made duplicate use of for the three primary colors, and when two of the corrected primary color gradation values are identical to each other, two primary color dithered image elements are made duplicate use of for the two primary colors. In short, primary color dithered image elements for the three primary colors can be obtained. Therefore, the present image processing method and device can be applied to dithering concerning the primary color gradation values of the three primary colors of a color image element.

In the above case, primary color dither masks for possible corrected primary color gradation values may be stored in advance as dither masks. Alternatively, a primary color dither mask may be newly formed for storage by comparing a primary color gradation value with each threshold in a dither matrix, after the primary color gradation value is determined.

Further preferably, the method includes the step of forming, as an additional kind of the dithered image element, a dithered mixed color image element in which the validity-indicative value is assigned to only matrix elements each corresponding in matrix position to matrix elements of the three dithered primary color image elements all of which are commonly assigned the validity-indicative value.

Further preferably, the image processing device includes dithered mixed color image element-forming means for forming, as an additional kind of the dithered image element, a dithered mixed color image element in which the validity-indicative value is assigned to only matrix elements each corresponding in matrix position to matrix elements of the three dithered primary color image elements all of which are commonly assigned the validity-indicative value.

Still more preferably, the dithered mixed color image element is formed by carrying out a logical AND operation of matrix elements, corresponding in location, of the three dithered primary color image elements, such that the logical AND operation outputs the validity-indicative value only when the matrix elements of the three dithered primary color image elements all have the validity-indicative value.

Still more preferably, the method includes the step of converting values of matrix elements of the three dithered primary color image elements corresponding in matrix position to the only matrix elements of the dithered mixed color image element which are assigned the validity-indicative value, to the invalidity-indicative value.

Still more preferably, the image processing device further includes mixed-color valid matrix elements-deleting means for converting values of matrix elements of the three dithered primary color image elements corresponding in matrix position to the only matrix elements of the dithered mixed color image element which are assigned the validity-indicative value, to the invalidity-indicative value.

Still further preferably, the step of converting the values of the matrix elements includes the steps of:

forming an inverted dithered mixed color image element by carrying out a logical NOT operation on matrix elements of the dithered mixed color image element, such that the logical NOT operation outputs inverted values of the validity-indicative value and the invalidity-indicative value; and forming updated three dithered primary color image elements by carrying out the logical AND operation between each matrix element of each of the three dithered primary color matrix elements and a corresponding matrix element of the dithered mixed color image element, such that the logical AND operation outputs the validity-indicative value only when the each matrix element and the corresponding matrix element both have the validity-indicative value.

Still further preferably, the mixed-color valid matrix elements-deleting means includes:

inverted dithered mixed color image element-forming means for forming an inverted dithered mixed color image element by carrying out a logical NOT operation on matrix elements of the dithered mixed color image element, such that the logical NOT operation outputs inverted values of the validity-indicative value and the invalidity-indicative value; and updated dithered primary color image element-forming means for forming updated three dithered primary color image elements by carrying out the logical AND operation between each matrix element of each of the three dithered primary color matrix elements and a corresponding matrix element of the dithered mixed color image element, such that the logical AND operation outputs the validity-indicative value only when the each matrix element and the corresponding matrix element both have the validity-indicative value.

Preferably, if the each of the at least one selected image element is a color image, the step of storing the one of the n possible numerical values as the designated gradation value comprises the step of storing primary color gradation values of respective three primary colors of the color image each as a kind of the designated gradation value;

the step of determining the corrected gradation value comprising the step of determining a corrected primary color gradation value for each of the primary colors based on a corresponding one of the primary color gradation values, as a kind of the corrected gradation value;

the step of storing the dither mask comprising the steps of:
storing at least one provisional primary color dither mask each as a kind of the dither mask, such that a single primary color dither mask corresponds to ones of the primary colors identical in the corrected primary color gradation value;

storing a mixed color dither mask in which the validity-indicative value is assigned to only matrix elements each corresponding in matrix position to matrix elements of the at least one provisional primary color dither mask all of which are commonly assigned the validity-indicative value; and converting, out of matrix elements of each of the at lest one provisional primary color dither mask which have the validity-indicative value, values of matrix elements corresponding in matrix position to matrix elements of the mixed color dither mask which have the validity-indicative value to the invalidity-indicative value, to thereby form at least one primary color dither mask, respectively, and storing the at least one primary color dither mask; and the step of forming the dithered image element comprising the step of forming a dithered mixed color image element corresponding to the mixed color dither mask and three dithered primary color image elements corresponding to the at least one primary color dither mask each as a kind of the dithered image element by carrying out the logical AND operation by using a corresponding one of the mixed color dither mask and the at least one primary color dither mask as an operand.

Preferably, if the each of the at least one selected image element is a color image, the designated gradation value storage means stores primary color gradation values of respective three primary colors of the color image each as a kind of the designated gradation value; and the corrected gradation value-determining means determines the corrected gradation value comprises the step of determining a corrected primary color gradation value for each of the primary colors based on a corresponding one of the primary color gradation values, as a kind of the corrected gradation value; and the dither mask storage means comprising:
provisional primary color dither mask storage means for storing at least one provisional primary color dither mask each as a kind of the dither mask, such that a single primary color dither mask corresponds to ones of the primary colors identical in the corrected primary color gradation value;

mixed color dither mask storage means for storing a mixed color dither mask in which the validity-indicative value is assigned to only matrix elements each corresponding in matrix position to matrix elements of the at least one provisional primary color dither mask all of which are commonly assigned the validity-indicative value; and primary color dither mask storage means for converting, out of matrix elements of each of the at lest one provisional primary color dither mask which have the validity-indicative value, values of matrix elements corresponding in matrix position to matrix elements of the mixed color dither mask which have the validity-indicative value to the invalidity-indicative value, to thereby form at least one primary color dither mask, respectively, and storing the at least one primary color dither mask; and the dithered image element-forming means forming a dithered mixed color image element corresponding to the mixed color dither mask and three dithered primary color image elements corresponding to the at least one primary color dither mask each as a kind of the dithered image element by carrying out the logical AND operation by using a corresponding one of the mixed color dither mask and the at least one primary color dither mask as an operand.

According to these preferred embodiments, when an image element is a color image, at least provisional primary color dither masks corresponding to corrected primary color gradation values of the image element different from each other, are each stored as a type of a dither mask, and a mixed color dither mask is stored, which is obtained by assigning the validity-indicative value only to each matrix element thereof corresponding in matrix element location to matrix elements of all the provisional primary color dither masks, commonly having the validity-indicative value. Further, out of matrix elements of each provisional primary color dither mask, having the validity-indicative value, each matrix element corresponding to each matrix element of the mixed color dither mask, having the validity-indicative value, has its validity-indicative value converted to the invalidity-indicative value, and the processed provisional primary color dither mask is stored as a primary color dither mask. Thereafter, a logical AND operation is performed by using the mixed color dither mask and each primary color dither mask, whereby a mixed color dithered image element corresponding to the mixed color dither mask and primary color dithered image elements corresponding to the primary color dither masks are created as kinds of dithered image elements.

In this case, similarly to the above, when the image element is a color image, if all the corrected primary color gradation values of the three primary colors are identical to each other, at least one primary color dithered image element is formed, and when two of the corrected primary color gradation values are identical to each other, at least two primary color dithered image elements are formed. Further, when the three corrected primary color gradation values are all different from each other, at least three primary color dithered image elements are formed. In short, primary color dithered image elements for the three primary colors can be obtained with duplicate use thereof, so that they can be applied to the dithering of the gradation values of three primary colors in a color image element. Further, in this case as well, provisional primary color dither masks for possible corrected primary color gradation values may be stored in advance as dither masks. Alternatively, a provisional primary color dither mask may be newly formed for storage by comparing a primary color gradation value with each threshold in a dither matrix, after the corrected primary color gradation value is determined. Further, when dither masks corresponding to possible designated gradation values are stored beforehand, after corrected primary color gradation values are determined, a suitable one may be selected from the dither masks and stored as a primary color dither mask again.

Further, according to the image processing method and device, a mixed color dither mask is employed to carry out a logical AND operation, whereby a mixed color dithered image element corresponding to the mixed color dither mask is formed. Therefore, it is possible to obtain a mixed color dithered image element for a mixed color of the three primary colors, in addition to the above primary color dithered image element in the three primary colors. In short, the dithering of a mixed color can be effected. In the above case, in the primary color dither masks, out of the matrix elements of the provisional primary color dither mask, having the validity-indicative value, each matrix element corresponding to each matrix element of the mixed color dither mask, having the validity-indicative value, has its validity-indicative value converted to the invalidity-indicative value, that is, the validity-indicative value of each matrix element of the provisional primary color dither mask, corresponding to each matrix element of the mixed color dither mask, having the validity-indicative value, is canceled. Therefore, similarly to the above, in each primary color dithered image element formed by using the corresponding primary color dither mask, the validity-indicative value of each matrix element thereof, corresponding to each matrix element of the mixed color dithered image element, having the validity-indicative value, is canceled, whereby image processing can be effected to obtain a beautiful image, also when the four colors C, M, Y, and K, for instance, are used as the basic colors.

More preferably, if all of the at least one provisional primary color dither mask are formed based on an identical dither matrix, one of the at least one primary color dither mask which contains a minimum number of matrix elements which have the validity-indicative value is stored as the mixed color dither mask.

According to this preferred embodiment of the third and fourth aspects of the invention, a provisional primary color dither mask, which has the smallest number of matrix elements having a validity-indicative value, is stored as a mixed color dither mask. Now, when all the provisional primary color dither masks are formed based on an identical dither matrix, each matrix element having the validity-indicative value in a provisional primary color dither mask having the smallest number of matrix elements having the validity-indicative value, corresponds to matrix elements of the other provisional primary color dither masks, also having the validity-indicative value. That is, in this case, irrespective of how many types (1 to 3 types) of provisional primary color dither masks are provided in a manner corresponding to the three primary colors, each matrix element having the validity-indicative value in the provisional primary color dither mask having the smallest number of matrix elements having the validity-indicative value, becomes a matrix element common to all the provisional primary color dither mask and having the validity-indicative value. Therefore, the provisional primary color dither mask which has the smallest number of matrix elements having the validity-indicative value can be used as a mixed color dither mask for the mixed color of the three primary colors. It should be noted that the provisional primary color dither masks corresponding to corrected primary color gradation values of the three primary colors can be defined based on the dither matrices having different values from each other. To do this, it is only required to employ the method using the logical AND operation, described hereinafter.

More preferably, the mixed color dither mask is one of the at least one provisional primary color dither mask corresponding to one of the corrected primary color gradation values of the three primary colors selected such that the one of the corrected primary color gradation values satisfies the validity condition with respect to a smallest number of thresholds of the dither matrix.

According to this preferred embodiment of the third and fourth aspects of the invention, if a primary color gradation value satisfying conditions of the smallest number of thresholds in the dither matrix, is selected from the gradation values of each of the three primary colors, the mixed color dither mask can be obtained similarly to the case of the provisional primary color dither mask corresponding to a selected primary color gradation value. More specifically, the selection of a primary color gradation value makes it possible to select a provisional primary color dither mask which has the smallest number of matrix elements having the validity-indicative value, thereby obtaining a mixed color dither mask with ease.

Further preferably, each of the corrected primary color gradation values satisfies the validity condition when the each of the corrected primary color graduation values is equal to or higher than a corresponding one of the thresholds of the dither matrix, and the one of the corrected primary color gradation values of the three primary colors is selected by selecting a smallest one of the corrected primary color graduation values.

According to this preferred embodiment of the third and fourth aspects of the invention, if, in a case where a corrected primary color gradation value is equal to or larger than a threshold, a condition designated by the threshold is satisfied, and a matrix element of the dither mask corresponding to the threshold has the validity-indicative value, a provisional primary color dither mask which has the smallest number of matrix elements having a validity-indicative value can be selected simply by selecting the minimum corrected primary color gradation value, whereby a mixed color dither mask can be easily obtained.

Even further preferably, each of the primary color gradation values satisfies the validity condition when the each of the corrected primary color graduation values is equal to or lower than a corresponding one of the thresholds of the dither matrix, and wherein the one of the corrected primary color gradation values of the three primary colors is selected by selecting a largest one of the corrected primary color graduation values.

According to the preferred embodiment of each of the third and fourth aspects of the invention, in a case where if a corrected primary color gradation value is equal to or smaller than a threshold, a condition designated by the threshold is satisfied, and a matrix element of the dither mask corresponding to the threshold has the validity-indicative value, a provisional primary color dither mask which has the smallest number of matrix elements having the validity-indicative value can be selected simply by selecting the maximum corrected primary color gradation value, whereby a mixed color dither mask can be easily obtained.

More preferably, the mixed color dither mask is formed by carrying out the logical AND operation on corresponding matrix elements of the at least one provisional primary color dither mask, such that the logical AND operation outputs the validity-indicative value only when all of the corresponding matrix elements have the validity-indicative value.

More preferably, each of the at least one primary color dither mask is formed by carrying out the logical NOT operation on matrix elements of the colored dither, such that the logical NOT operation outputs inverted values of the validity-indicative value and the invalidity-indicative value, to form an inverted mixed color dither mask, and carrying out the logical AND operation between the inverted mixed color dither mask and each of the at least one provisional primary color dither mask such that the logical AND operation outputs the validity-indicative value only when corresponding matrix elements between the inverted mixed color dither mask and each of the at least one provisional primary color dither mask both have the validity-indicative value.

More preferably, the three primary colors are cyan, magenta, and yellow.

Preferably, the dithered image element is formed as a print image for being printed on a print material.

More preferably, matrix elements of the dithered image element which have the validity-indicative value correspond to pixels for which ink is to be ejected from an ink jet head.

Preferably, the print material is a tape.

More preferably, the three primary colors are red, green, and blue.

Preferably, the dithered image element is formed as a display image for being displayed on a display screen.

Preferably, the method further includes the step of entering a character including a letter, a numeral, a symbol, and a figure, as text data,
  the elementary shape image being formed by creating a character image corresponding to the text data of the entered character, based on predetermined font data.

Preferably, the image processing device further includes character entry means for entering a character including a letter, a numeral, a symbol, and a figure, as text data; and
  font data storage means for storing predetermined font data;
  the elementary shape image being formed by creating a character image corresponding to the text data of the entered character, based on the predetermined font data.

According to these preferred embodiments, the elementary shape image is formed by entering a character including a letter, a numeral, a symbol, or a figure as text data, and a character image is formed from the entered text data of the character based on predetermined font data. That is, according to this image processing method and device, the elementary shape image can be easily formed by a general image-forming (code-conversion) method by using the predetermined font data, which can be an outline font or a dot font (bit map font).

The above and other objects, features, and advantageous of the invention will become more apparent from the detailed description taken in conjunction with the accompanying drawings.

BRIEF DESCRIPTION OF THE DRAWINGS

FIGS. 6A to 6E are diagrams showing examples of matrices which are useful in explaining the principle of a binary dither process, in which:

FIG. 6A is a diagram showing an example of a dither matrix;

FIG. 6B is a diagram showing examples of divisional input matrices;

FIG. 6C is a diagram showing examples of satisfied threshold matrices;

FIG. 6D is a diagram showing examples of divisional output matrices; and

FIG. 6E is a diagram showing examples of divisional images;

FIGS. 7A to 7D are diagrams showing examples of matrices which are useful in explaining the principle of a multi-valued dither process;

FIG. 7E is a diagram showing an example of a 2 times 2 dither matrix;

FIGS. 8A and 8B are diagrams which are useful in explaining, in comparison with the conventional dithering, the principle of dithering according to the invention, based on an example of a divisional input matrix representative of a portion inside a contour line of an elementary object image formed of pixels having an identical gradation value;

FIG. 8C is a diagram showing an example of a designated gradation value;

FIGS. 10A and 10B are diagrams similar to FIGS. 8A and 8B, which are useful in explaining the principle of the dithering based on still another example:

FIG. 10C is a diagram showing the same designated gradation value as shown in FIG. 9C;

FIG. 11A is a diagram showing the same dither matrix as shown in FIG. 7E;

FIGS. 11B and 11C are diagrams which are useful in explaining the principle of the conventional dithering based on an example of the same being carried out on a whole image element and a whole image, in which:

FIG. 11B is a diagram showing an example of an input matrix;

FIG. 11C is a diagram showing a matrix in which matrix elements of the input matrix each satisfying a condition designated by a corresponding threshold value of the dither matrix DD5 are represented by their original gradation values, while matrix elements of the same not satisfying such a condition are represented by "0s";

FIGS. 12A to 12D are diagrams useful in explaining the principle of the dithering according to the invention, based on an example corresponding to that shown in FIGS. 11B to 11C, in which:

FIG. 12A is a diagram showing examples of elementary shape images;

FIG. 12B is a diagram showing an example of a table of color pallet data;

FIG. 12C is a diagram showing the same dither matrix as shown in FIG. 7E;

FIG. 12D is a diagram showing examples of dither masks together with corresponding images;

FIG. 20 is a diagram illustrating an example of a color conversion table;

FIG. 22A is a diagram showing a figure of "no-smoking mark" just registered or registered previously and just read out again;

FIG. 22B shows image elements formed by decomposing the figure of the FIG. 22A "no-smoking mark";

FIG. 22C shows an example of a color pallet data;

DETAILED DESCRIPTION

Figure 1:
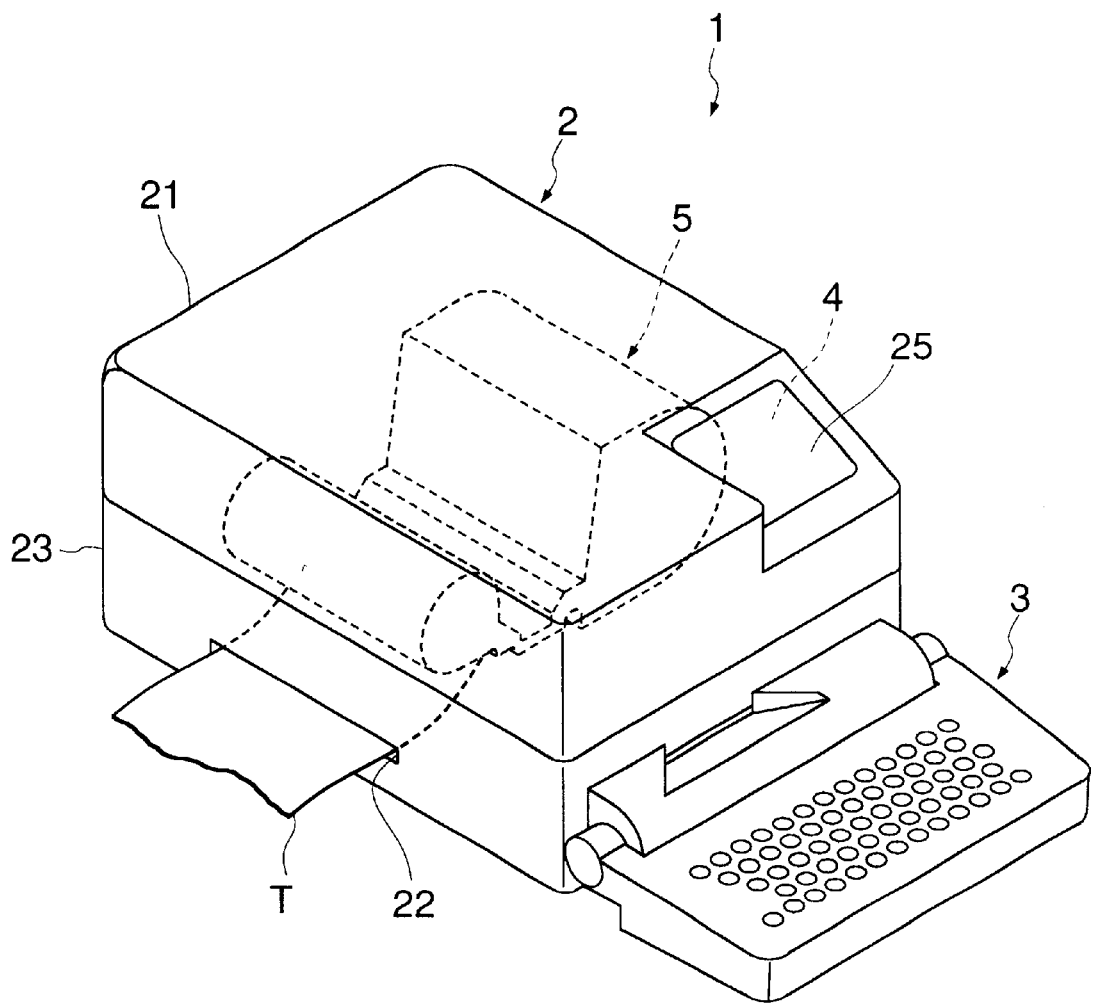
FIG. 1 is a perspective view of an appearance of a tape printing apparatus to which is applied an image processing method and device according to the invention.
Figure 2:
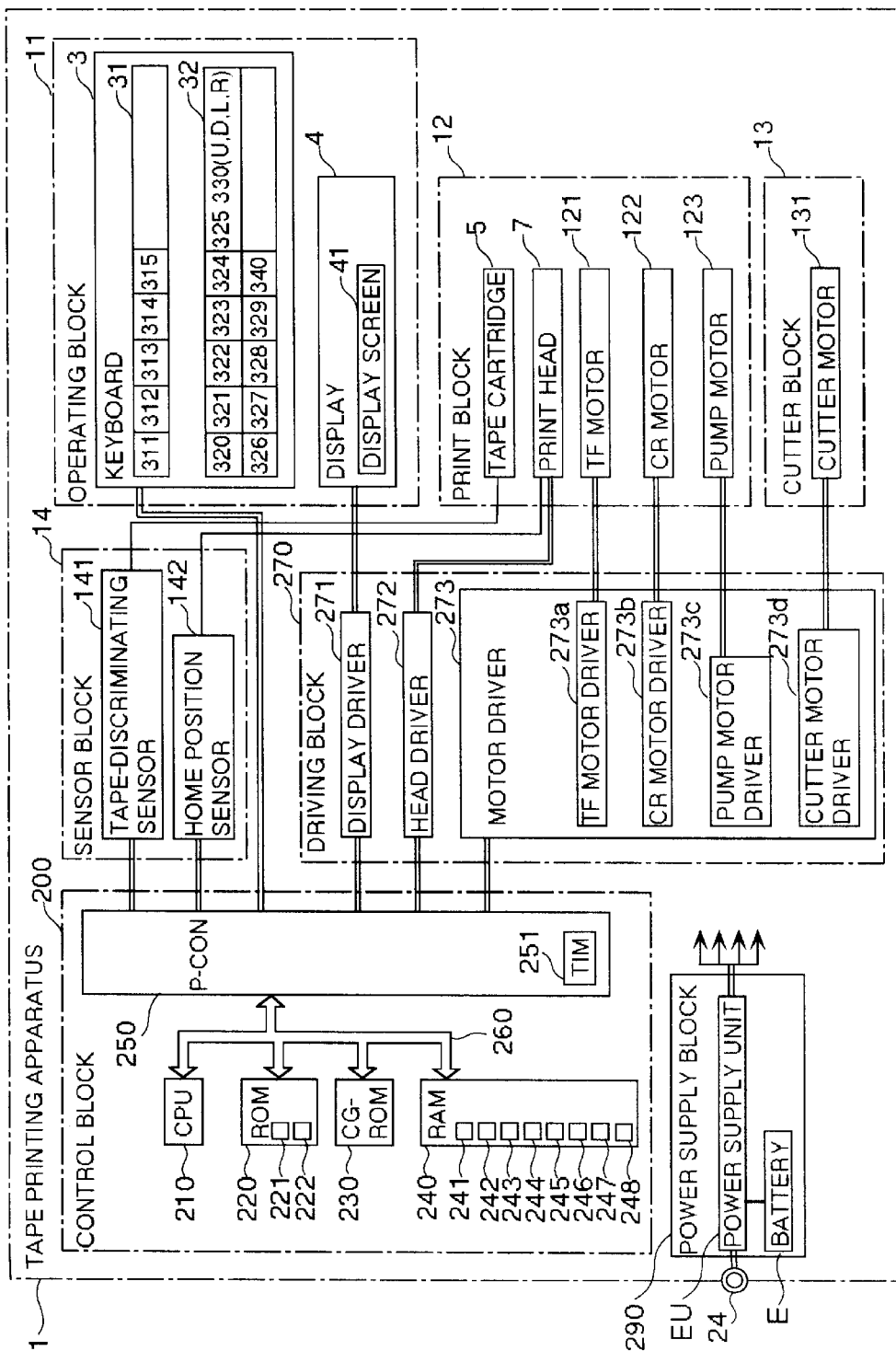
FIG. 2 is a block diagram of a control system of the FIG. 1 tape printing apparatus.

The invention will now be described in detail with reference to the drawings showing an embodiment thereof. In the embodiment, an image processing method and device according to the invention is applied to a tape printing apparatus. FIG. 1 is a perspective view of an appearance of the tape printing apparatus, and FIG. 2 is a block diagram of the control system thereof.

The tape printing apparatus 1 is capable of carrying out color printing of a print image on a printing tape T1 by an ink jet printing method as well as cutting off the printed portion of the printing tape T1 to thereby produce a label. The print image is formed based on desired characters and the like entered via a keyboard of the apparatus. Further, the tape printing apparatus 1 is capable of mounting not only the printing tape T1 but also a laminating tape T2 (see FIGS. 3 and 4) to thereby affix the laminating tape T2 to a printed portion of the printing tape T1 and cut the printing tape T1 and the laminating tape T2 in the laminated state, for producing a laminated label. Hereinafter, a type of tape formed of only the printing tape T1 and a type of tape formed of both the printing tape T1 and the laminating tape T2 (to be) added thereto will be generically referred to as the "tape T".

The printing tape T1 is comprised of a substrate tape, an adhesive layer coated on a underside surface of the substrate tape, and a release paper tape affixed to the adhesive layer. The substrate tape is formed of a material which is capable of readily absorbing ink, such as paper, paper with a coated layer or a film with a coated layer. The adhesive layer is used for affixing a printing tape T1 as a label to an object article, such as a file, while the release paper tape is used for preventing dust or dirt from depositing on the adhesive layer.

On the other hand, the laminating tape T2 is comprised of a substrate tape, and an adhesive layer coated on a underside surface of the substrate tape. The substrate tape is formed of a transparent film having a thickness of approximately 16 to 38 μm. The printing tape T1 and the laminating tape T2 are generally fabricated to have identical widths and affixed to each other in a manner such that side ends thereof are aligned one upon the other. Actually, the laminating tape T2 has a slightly smaller width (by approximately 0.3 mm) than the printing tape T1 such that slight lateral displacement of the laminating tape T2 can be accommodated when the same is affixed to the printing tape T1.

Tape cartridges are provided which contain various (approximately ten) kinds of tapes T with various tape widths of from 4.5 mm to 96 mm. A print image having a resolution of 24 to 1024 dots in the direction of the width thereof is printed on the printing tape T, dependent on the width thereof. It should be noted that there are provided still other tapes T different in material or having background colors other than white. Therefore, it is possible to use at least several tens of kinds of tapes T including ones to be adopted in the future. The tape cartridges 5 are classified into a type which contains both a printing tape T1 and a laminating tape T2 and another type which contains only a printing tape T1 (see FIG. 4), and each include three kinds of tape cartridges, such as "large", "medium" and "small", different in width.

Referring to FIG. 1, the tape printing apparatus 1 is comprised of an apparatus body 2, a keyboard 3 mounted on a front-side portion of the apparatus body 2, a tape cartridge 5 containing a tape T (printing tape T1+laminating tape T2: see FIG. 3), and an ink cartridge 8 (see FIG. 3) filled with four colors of ink. The tape cartridge 5 and the ink cartridge 8 are removably loaded within the apparatus body 2. The apparatus body 2 has an apparatus casing 23 upper part of which is formed by a lid 21 which can be opened and closed for inserting and removing (i.e. loading and unloading) the tape cartridge 5 and the ink cartridge 8. In a side wall of the apparatus casing 23 is formed a tape exit 22 in the form of a slit through which the tape T is sent out of the apparatus.

The keyboard 3 is hinged on a lower portion of a front surface of the body 2 of the tape printing apparatus 1 such that it can be brought either to an upright position or to a horizontal position for use with the body 2. When the apparatus is used for printing, the keyboard 3 is brought to the horizontal position, whereas when the same is carried by the user, the keyboard 3 is brought to the upright or folded position. In a right-side front portion of the lid 21 is formed a small window 25 which, when the lid 21 is closed, corresponds in location to a display 4 incorporated in the apparatus body 2. The keyboard 3 and the display 4 will be described hereinafter.

Further, as shown in FIG. 2, the tape printing apparatus 1 is basically comprised of an operating block 11 having the keyboard 3 and the display 4 and interfacing with the user, a printer block 12 having a print head 7 of an ink jet type for printing on a tape T (printing tape T1) unwound from the tape cartridge 5, a cutter block 13 for cutting off the printed portion of the tape T, a sensor block 14 having various sensors for carrying out various detecting operations, a driving block 270 having drivers for driving circuits of blocks and devices, a power supply block 290, and a control block 200 for controlling operations of components of the tape printing apparatus 1 including the above-mentioned sensors and drivers.

To implement the above construction, the apparatus casing 23 accommodates a circuit board, not shown, in addition to the printer block 12, the cutter block 13, the sensor block 14 and so forth. On the circuit board are mounted the power supply block 290 and the circuits of the driving block 270 and the control block 200. The power supply unit EU of the power supply block 290 is connected to a connector socket 24 connectable with an AC adapter and a battery E, such as a nicad battery, removably mounted from the outside of the casing 2, so as to supply power to the components of the tape printing apparatus 1.

Figure 3:
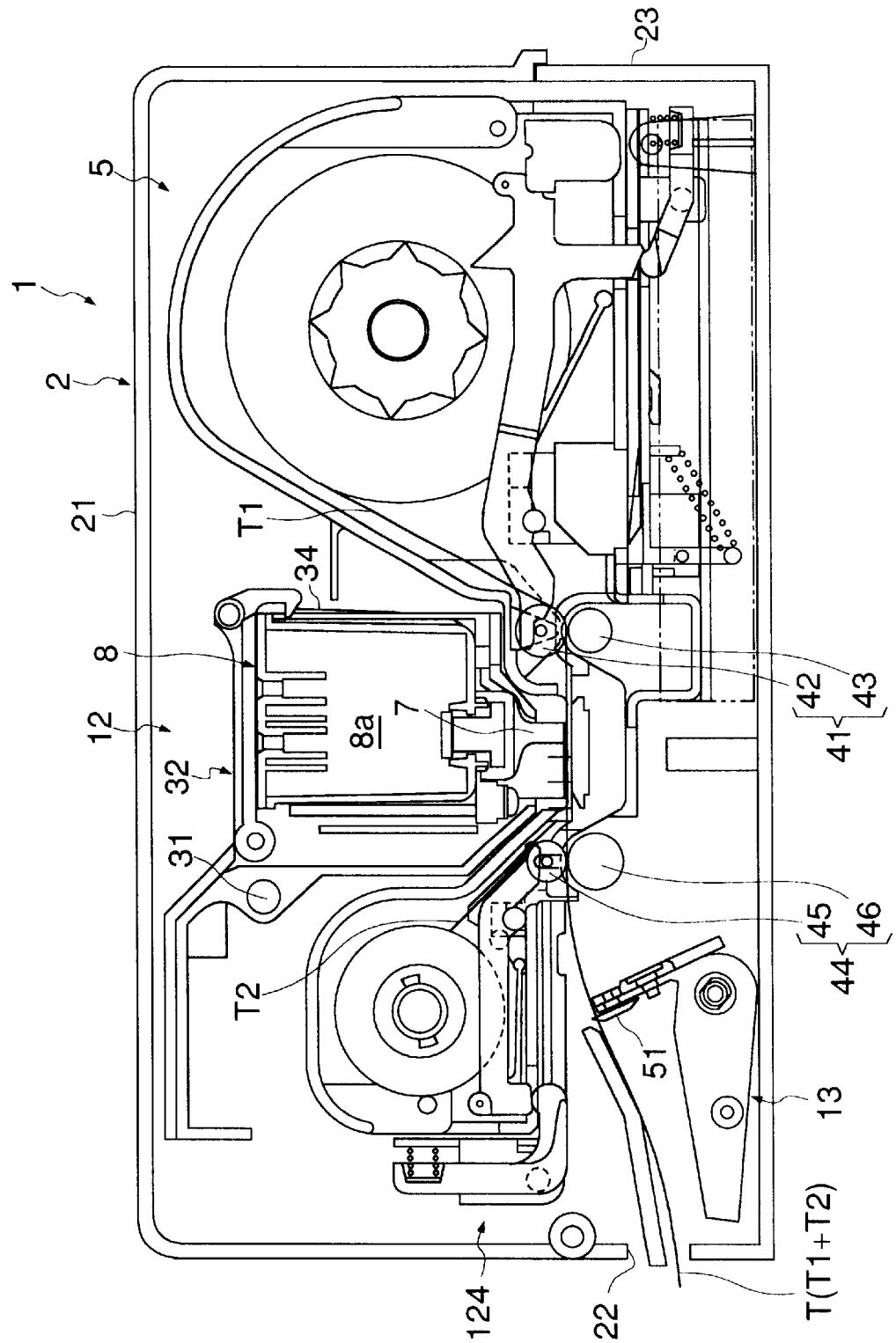
FIG. 3 is a cross-sectional view of a body of the FIG. 1 tape printing apparatus.

FIG. 3 is a cross-sectional view of the body of the tape printing apparatus 1. Referring to FIGS. 2 and 3, the printer block 12 includes a carriage guide shaft 31 having opposite ends thereof supported on a frame, not shown, a carriage 32 slidably attached to the carriage guide shaft 31, a timing belt, not shown, which is driven in a forward or reverse direction to move the carriage 32 in the direction of the width of the tape T in a reciprocating manner, a carriage motor (CR motor) 122 for driving the timing belt in a forward or reverse direction, feed roller means 41 comprised of a feed driven roller 42 positioned above and a feed drive roller 43 positioned below, laminating roller means 44 comprised of a laminating driven roller 45 positioned above and a laminating drive roller 46 positioned below, a tape feed motor (TF motor) 121 for driving the feed drive roller 43 and the laminating drive roller 46 for rotation via a reduction gear train, not shown, a head cap mechanism, not shown, for closing the ink nozzles of the print head 7 as well as cleaning the same by using a pump motor 123 as required, and a latching mechanism 124 for setting the tape cartridge 5 in the tape printing apparatus 1.

On the carriage 32 are integrally mounted the print head 7 for printing on the tape T, at a lower portion thereof, and a cartridge holder 34 at an upper portion of the same, for holding therein the ink cartridge 8 for supplying ink to the print head 7. In this case, the print head 7 is mounted on the carriage 32 in a manner facing downward, and the ink cartridge 8 is held in the cartridge holder 34 in a manner facing downward. When the ink cartridge 8 is loaded in the cartridge holder 34, ink from the ink cartridge 8 is allowed to flow from four ink reservoirs 8a to the print head 7. The ink reservoirs 8a are filled with C (cyan) ink, M (magenta) ink, Y (yellow) ink, and K (black) ink, respectively.

Further, the carriage 32 has light shields, not shown, projecting therefrom. When one of the light shields is brought before a home position sensor 142 comprised of a photo interrupter or the like, the print head 7 is detected to be at a home position, not shown, whereby the correction of the position of the print head 7, such as zero position adjustment, is carried out. The home position serves not only as a standby position of the print head 7 but also as a reference position for printing. The CR motor 122 is driven for rotation in a predetermined number of steps to move the print head 7 from the reference position, whereby the carriage 32 is moved with accuracy to each position in the direction of the width of the tape T within a printing range, and the print head 7 is driven for printing in synchronism with movement of the carriage 32 to thereby effect printing of characters and figures on a surface of the tape T in a desired manner.

Figure 4:
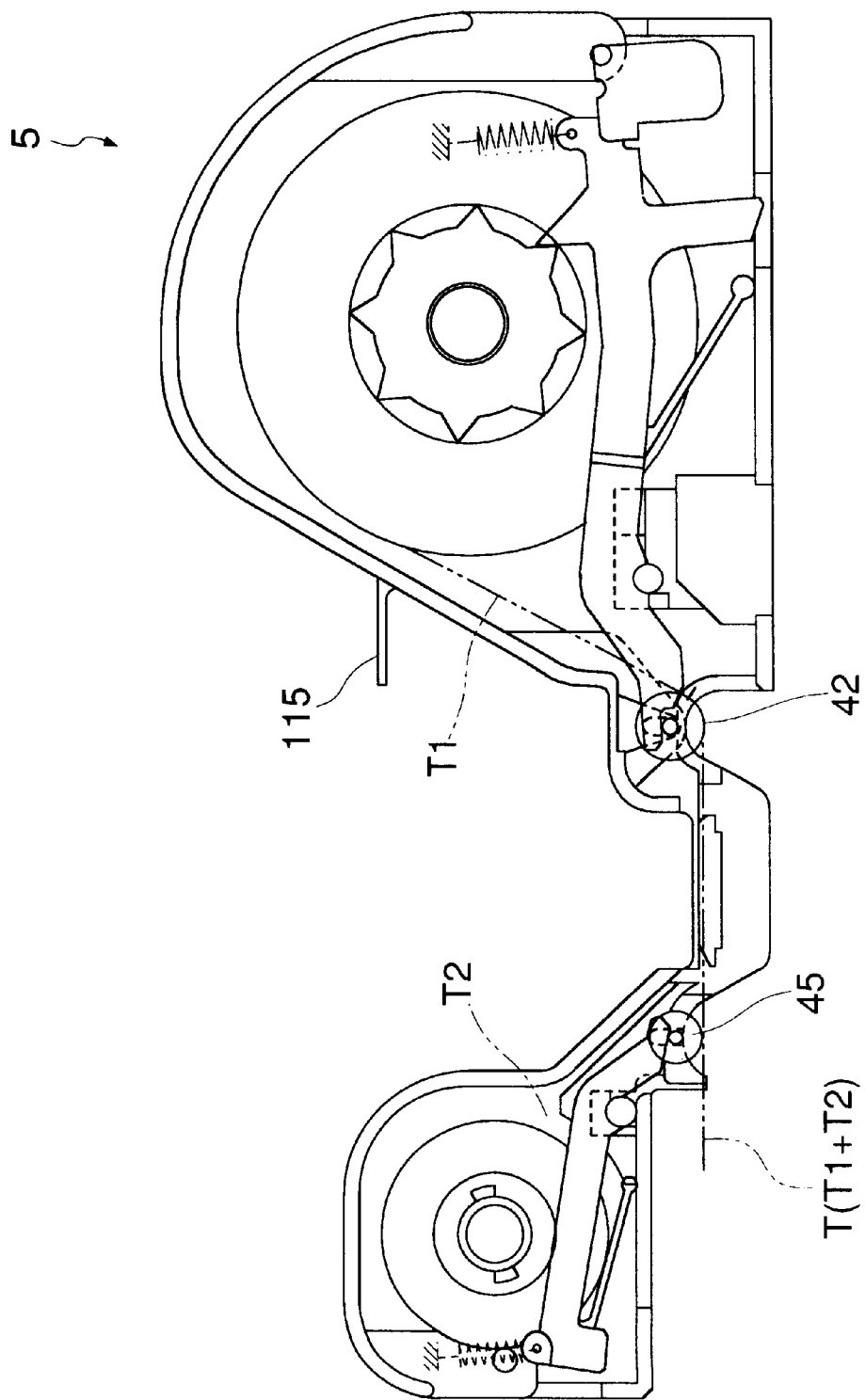
FIG. 4 is a cross-sectional view of a tape cartridge for being mounted in the FIG. 1 tape printing apparatus.

The tape cartridge 5 includes a discriminating plate 115 for designating discriminating information based on bit patterns or the like (see FIG. 4). A tape-discriminating sensor 141 mounted on the above-mentioned carriage 32 is caused to face toward the discriminating plate 115 to thereby detect a type of a tape cartridge 5, a type of a printing tape T1 and a type of a laminating tape T2 as well as a print-starting position at which the printing tape T1 starts to be printed. Hereinafter, signals indicative of the sensed types and print-starting position are referred to as the "tape-discriminating signals".

The feed drive roller 43 is arranged in the body 2 of the tape printing apparatus, while the feed driven roller 42 is arranged in the tape cartridge 5. When the tape cartridge 5 is mounted in the body 2, the feed driven roller 42 presses the printing tape T1 in a manner sandwiching the tape T1 between the feed drive roller 43 and the feed driven roller 42 itself. The printing tape T1 is advanced in this state as the TF motor 121 rotates.

The laminating drive roller 46 is arranged in the body 2, while the laminating driven roller 45 is arranged in the tape cartridge 5. When the tape cartridge 5 is mounted in the body 2, the laminating driven roller 45 presses the printing tape T1 and the laminating tape T2 in a manner sandwiching them between the laminating drive roller 46 and the laminating driven roller 45 itself. The printing tape T1 and the laminating tape T2 are advanced in this state while being affixed to each other as the TF motor 121 rotates.

The cutter block 13 includes a cutter 51 and a cutter motor 131 for driving the cutter 51 for cutting operations. After the printing is completed, the tape T (printing tape T1+laminating tape T2) is stopped when the TF motor 121 further feeds the same by a predetermined number of steps, whereupon the cutter motor 131 is driven to cut off the tape T. It should be noted that the tape printing apparatus 1 is provided with a cut key 340 for enabling the user to manually cut the tape by key stroke, and it is possible to switch between an automatic cutting mode and a manual cutting mode.

Referring to FIG. 2, the sensor block 14 includes the tape-discriminating sensor 141 and the home position sensor 142. As described hereinabove, the tape-discriminating sensor 141 discriminates the types of tape cartridge 5 and tape T to generate a discriminating information signal indicative of the sensed types of the tape cartridge 5 and tape T, and detects the print-starting position for starting a printing operation on the printing tape T1 to generate a signal indicative of detection of the print-starting position. These signals are supplied to the control block 200. The home position sensor 142 detects that the print head 7 has reached the home position and generates a position-detecting signal indicative of detection of the home position of the print head 7, which is also supplied to the control block 200. It should be noted that in the sensor block 14 can be provided other sensors, such as a voltage sensor which is connected to the power supply unit EU of the power supply block 290 for supplying power to the components of the tape printing apparatus 1 and detects changes in the electric potential of the power supply unit EU, an ambient temperature sensor, a head surface temperature sensor and the like, or some of them can be omitted to suit the actual requirements of the apparatus.

The driving block 270 includes a display driver 271, a head driver 272, and a motor driver 273. The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200. Further, the motor driver 273 has a TF motor driver 273a for driving the TF motor 121 of the printer block 12, a CR motor driver 273b for driving the CR motor 122 of the printer block, a pump motor driver 273c for driving the pump motor 123 of the printer block, and a cutter motor driver 273d for driving the cutter motor 131 of the cutter block 13, and similarly to the display driver 271 and the head driver 272, drives each motor in accordance with commands from the control block 200.

The operating block 11 includes the keyboard 3 and the display 4. The display 4 has a display screen 41 which is capable of displaying display image data of 96×64 dots on a rectangular display area of approximately 6 cm in the horizontal direction (horizontal)×4 cm in the vertical direction (vertical). The display 4 is used by the user when he enters data via the keyboard 3 to form or edit matrix data representative of a character string image having characters (used to mean letters, numerals, symbols, simple figures, etc., as described above) arranged therein and a print image including the character string image, view the resulting data, and enter various commands including ones for selection via the keyboard 3.

On the keyboard 3 there are arranged a character key group 31 including an alphabet key group 311, a symbol key group 312, a number key group 313, and a nonstandard character key group 315 for calling nonstandard characters for selection as well as a function key group 32 for designating various operation modes. In a type of the apparatus which is capable of entering the Japanese language, there is also provided a kana key group 314 for entering Japanese hiragana letters and Japanese katakana letters.

The function key group 32 includes a power key 320, a print key 321 for instructing a printing operation, a form key 322 for displaying a selection screen for use in switching modes and formats, such as character sizes, kinds of decoration and the like, a selection key 323 for determining selection of one of modes and the like on a selection screen as well as finally determining entry of character data and starting a new line during text entry, a color specification key 324 for specifying printing colors including neutral colors (mixed colors) of print image data, a color-setting key 325 for setting colors of characters and background colors, and four cursor keys 330 (up arrow key 330U, down arrow key 330D, left arrow key 330L, and right arrow key 330R) for moving the cursor or the display range of print image data on the display screen 41 in respective upward, downward, leftward, and rightward directions.

The function key group 32 also includes a cancel key 326 for canceling instructions, a shift key 327 for use in changing roles of respective keys as well as modifying registered image data, an image key 328 for alternately switching between a text entry screen or a selection screen and a display screen (image screen) for displaying print image data, a proportion-changing (zoom) 329 key for changing a proportion between the size of print image data and the size of display image data displayed on the image screen, and the cut key 340 for manually cutting the tape T.

Similarly to keyboards of the general type, the above key entries may be made by provision of respective keys or by provision of a smaller number of keys which are permitted to be operated in combination with the shift key 327 or the like. Here, for purposes of ease of understanding, the following description will be made assuming that there are provided as many keys as described above.

As shown in FIG. 2, from the keyboard 3, various commands described above and data are input to the control block 200.

The control block 200 includes a CPU 210, a ROM 220, a character generator ROM (CG-ROM) 230, a RAM 240, a peripheral control circuit (P-CON) 250, all of which are connected to each other by an internal bus 260.

The ROM 220 has a control program area 221 for storing control programs executed by the CPU 210 as well as a control data area 222 for storing control data including a color conversion table, a character modification table, a dither matrix, a predetermined basic (prescript) dither matrix and the like. The CG-ROM 230 stores font data, i.e. data defining characters, symbols, figures and the like, provided for the tape printing apparatus 1. When code data identifying a character or the like is input thereto, it outputs the corresponding font data.

The RAM 240 is backed-up such that stored data items can be preserved even when the power is turned off by operating the power key 320. The RAM 240 includes areas of a register group 241, a text data area 242 for storing text data of characters or the like entered by the user via the keyboard 3, a display image data area 243 for storing image data displayed on the display screen 41, a print image data area 244 for storing print image data, a registered image data area 245 for storing registered image data, a dither mask area 246 for storing a dither mask being processed or already processed, a color pallet data area 247 for storing color pallet information, such as printing colors or the like, and buffer areas 248 including a character image-forming buffer (font color buffer), a color conversion buffer, a color-by-color dithered image matrix-arranging buffer, a print buffer, and so forth. The RAM 240 is used as a work area for carrying out the control process.

The P-CON 250 incorporates a logic circuit for complementing the functions of the CPU 210 as well as dealing with interface signals for interfacing between the CPU 210 and peripheral circuits. The logic circuit is implemented by a gate array, a custom LSI and the like. A timer 251, for instance, is also incorporated in the P-CON 250 for the function of measuring elapsed time. The P-CON 250 is connected to the sensors of the sensor block 14 and the keyboard 3, for receiving the signals generated by the sensor block 14 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driving block 270 directly or after processing them.

The CPU 210 of the control block 200 receives the signals and data from the components of the tape printing apparatus 1 via the P-CON 250, according to the control program read from the ROM 220, processes font data from the CG-ROM 230 and various data stored in the RAM 240, and delivers signals and data to the components of the tape printing apparatus 1 via the P-CON 250 to thereby carry out position control during printing operations, the display control of the display screen 41, and the printing control that causes the print head 7 to carry out printing on the tape T under predetermined printing conditions. In short, the CPU 210 controls the overall operation of the tape printing apparatus 1.

Next, the overall control process carried out by the tape printing apparatus 1 will be described with reference to FIG. 5. As shown in the figure, when the program for carrying out the control process is started e.g. when the power key 320 is depressed (the power of the tape printing apparatus 1 is turned on), first, at step S1, initialization of the system including restoration of saved control flags is carried out to restore the tape printing apparatus 1 to the state it was in before the power was turned off the last time. Then, the image that was displayed on the display screen 41 before the power was turned off the last time is shown as the initial screen at step S2.

Figure 5:
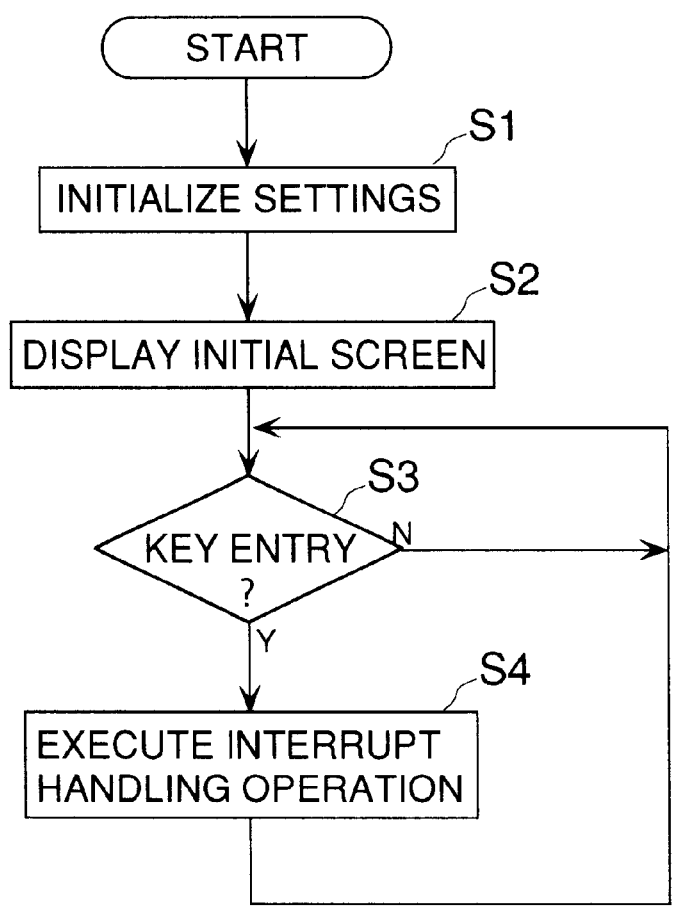
FIG. 5 is a flowchart showing a conceptual representation of an overall control process executed by the FIG. 1 tape printing apparatus.

The following steps in FIG. 5, that is, step S3 for determining whether or not a key entry has been made and step S4 for carrying out an interrupt handling operation are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print the image data at a desired time point, by depressing the print key 321 to thereby generate an interrupt by the print key and start a printing process. In short, an operating procedure up to the printing operation can be selected by the user as he desires.

Next, an image-forming/printing process carried out by the tape printing apparatus 1, more particularly, dithering carried out thereby will be described. First, in the following, description is made of the principle of the dithering.

To output image data represented by matrix data (hereinafter simply referred to as a "matrix") having gradation values representative of e.g. 256 gradation levels assigned to matrix elements thereof, that is, image data (gradation image data) having information of an n-valued gradation value (n=256 in this embodiment) assigned to each pixel, to a tape printing apparatus capable of processing only image data with a smaller (limited) number of gradation values representative of respective gradation levels, it is required to convert the above image data to one (pseudo-gradation image data) adapted to the limited number of gradation values. One of methods used in such image conversion (compression) processing, that is, pseudo-gradation processing is a so-called dither method. It should be noted that, as described herein before, "n-valued gradation value" is intended throughout the specification to mean "gradation value capable of having any one of n possible numerical values", and hence "5-valued gradation value", for instance, is a "gradation value which can have any one of five possible values". Further, "n-valued matrix" is intended throughout the specification to mean "matrix of matrix elements each capable of having any one of n possible numerical values", and hence "5-valued matrix", for instance, is a "matrix of matrix elements which can have any one of five possible values".

The dither method is employed to superimpose noise on gradation values of pixels constituting gradation image data of an original image and then carry out binarization (binary dither method) or limited multi-valued conversion (multi-valued dither method) on values resulting from the super imposition. This method takes advantage of the integrating function of human eyes that recognize contents in an area as a shade or a color. In the binary dither method, for instance, the ratio of assignment of two numerical values (e.g. 1's and 0's) to matrix elements of a matrix are changed according to the gradation values of respective pixels of an input gradation image (for instance, by thinning "1's" in the matrix according to the gradation values under a predetermined rule) to thereby represent intermediate gradation (for instance, a gray color represented by setting 1's and 0's to black and white, respectively). A typical binary dither method is a systematic dither method.

In the systematic dither method, first, for comparison with n-valued gradation values each defined by any one of n possible numerical values (n is an integer equal to or larger than 3) and assigned to pixels forming an original gradation image, a dither matrix of thresholds each defined by any one of m possible numerical values (m is an integer satisfying a condition of n≧m≧2) and arranged therein as matrix elements is prepared beforehand. Next, (the matrix of) the original gradation image is divided into matrices each having the size of the dither matrix, and the gradation values of the respective elements of each of the divisional matrices and the corresponding thresholds of the dither matrix are compared with each other on an element-by-element basis to determine whether or not a gradation value satisfies a condition designated by a corresponding threshold. According to results of the determination, either of the numerical values 1 and 0 is assigned to each pixel to thereby form a pseudo-gradation image represented by a binary matrix. For instance, if the gradation value of a matrix element satisfies a condition designated by a corresponding threshold, a numerical value (e.g. 1) indicating validity of the gradation value is assigned to a corresponding matrix element, whereas if the gradation value does not satisfy the condition, a numerical value (e.g. 0) indicating invalidity of the gradation value is assigned to the corresponding matrix element, whereby a pseudo-gradation image represented by a two-valued (binary) matrix (i.e. of matrix elements each having a value 1 or 0) is formed.

By definition of relationship between gradation values and thresholds therefor, the gradation value of each matrix element which is equal to or larger than a corresponding threshold, larger than the threshold, equal to or smaller than the same, or smaller than the same, for instance, can be a gradation value satisfying a condition designated by the corresponding threshold. Now, the dither method will be described, by way of example, based on a case in which a gradation value equal to or larger than a corresponding threshold (gradation value≧threshold) satisfies the condition designated by the threshold. Of course, even when the condition of a gradation value satisfying a corresponding threshold is differently defined, the dithering can be carried out based on the same principle as described above. Further, assuming that the above-mentioned systematic dither method is used as the binary dither method, a pseudo-gradation processing carried out by the binary dither method (binary dither process) will be mainly described hereafter.

Figures 6A, 6B, 6C, 6D, 6E:
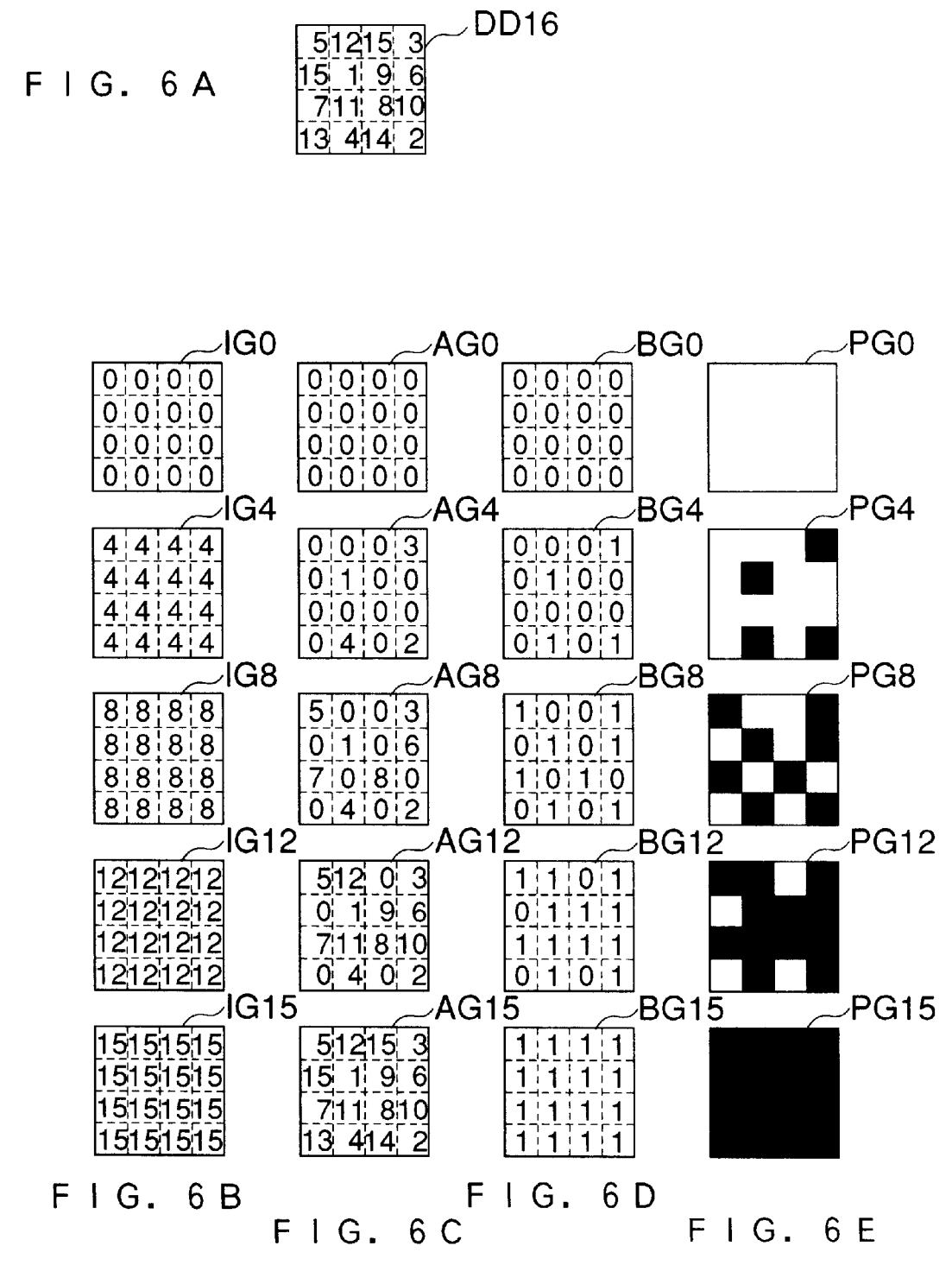

For instance, let it be assumed that to output image data represented by a matrix of matrix elements having 16 gradation values 0 to 15, that is, image data (original gradation image) having information of 16-valued gradation values each assigned to a pixel, to a tape printing apparatus capable of processing only image data with two gradation levels (image data having two-valued gradation values each assigned to a pixel), processing (binary dither process) is carried out for converting (compressing) the image data of the original gradation image, i.e. the gradation image with 16 gradation levels, to a pseudo-gradation image with two gradation levels. In this case, as shown in FIG. 6A, there is provided a dither matrix DD16 composed of 4 times 4 matrix elements, for instance. More specifically, for comparison with n-valued gradation values (n=16 in the present example) each assigned to a pixel of the original gradation image and having any one of n possible numerical values, m-valued thresholds each defined by any one of m possible numerical values (m is an integer satisfying a condition of n≧m≧2: here, m=15 between 1 and 15) and then, a dither matrix DD16 having the defined thresholds arranged therein as 4 times 4 matrix elements is prepared beforehand.

Then, a matrix representative of the original gradation image is divided into matrices each having the size of the dither matrix DD16, that is, 4 times 4 matrices, and the gradation values of the elements of each of the matrices and the thresholds of the corresponding dither matrices are compared with each other on an element-by-element basis for determining whether or not each gradation value of the matrix elements satisfies a condition (gradation value≧threshold in the present example) designated by a corresponding threshold. Depending on results of the determination made based on each comparison, one of binary values 1 and 0 is assigned to a matrix element of a binary matrix to thereby form a pseudo-gradation image represented by the binary matrix.

For instance, when a matrix (hereinafter referred to as an "input matrix") representing an original gradation image is divided into 4 times 4 matrices, and one of the matrices (hereinafter referred to as a "divisional input matrix") is a divisional input matrix IG4 shown in FIG. 6B, the gradation values of the elements of the divisional input matrix IG4 are all equal to "4", so that only conditions designated by the thresholds "1" to "4" of the dither matrix DD16 are satisfied.

In this case, by representing, out of the matrix elements or thresholds of the dither matrix DD16, ones whose conditions are not satisfied by using "0" and ones whose conditions are satisfied by using the thresholds (hereinbelow, a matrix represented as above is referred to as a "satisfied threshold matrix"), a satisfied threshold matrix AG4, as viewed in FIG. 6C, is formed. Further, by assigning a numerical value (e.g. 1) indicating the validity of the gradation value to a corresponding matrix element if the gradation value of each matrix element satisfies the condition designated by the corresponding threshold, and assigning a numerical value (e.g. 0) indicating the invalidity of the gradation value to a corresponding matrix element if the gradation value of each matrix element does not satisfy the condition, a two-valued or binary matrix BG4 of matrix elements "1's" and "0's" shown in FIG. 6D is obtained.

The matrix BG4 is one of matrices which are formed by dividing a matrix (hereinafter referred to as an "output matrix") representing a pseudo-gradation image desired to be produced through the binary dither process, into 4 times 4 matrices (hereinbelow, a matrix such as the matrix BG4 is referred to as a "divisional output matrix"). The matrix BG4 is a resulting matrix of the binary dither process carried out on the divisional input matrix IG4. An image represented by the divisional output matrix BG4 becomes a divisional image PG4 appearing in FIG. 6E, if "1" and "0" are used to indicate black and white, respectively.

The divisional image PG4 is one of matrices which are formed by dividing the desired pseudo-gradation image into 4 times 4 images (e.g. images of 4 times 4 dots). The divisional image PG4 is created by converting a portion (image of 4 times 4 dots represented by the divisional input matrix IG4) of matrix elements having a gradation value "4" out of a gradation image with information of 16-valued gradation values ("0" to "15"), into a pseudo-binary image.

Similarly, when the binary dither process is carried out on a portion of an input matrix representing the gradation image with information of 16-valued gradation values ("0" to "15"), e.g. on a divisional input matrix IG8 representing a 4 times 4 matrix portion of the input matrix whose matrix elements all have a gradation value "8", a satisfied threshold matrix AG8, a divisional output matrix BG8, and a divisional image PG8, shown in FIGS. 6C, 6D and 6E, respectively, are formed. Similarly, when the binary dither process is carried out on a divisional input matrix IG0 representing a 4 times 4 matrix portion of the input matrix whose matrix elements all have a gradation value "0", a divisional input matrix IG12 representing a 4 times 4 matrix portion of the input matrix whose matrix elements all have a gradation value "12", and a divisional input matrix IG15 representing a portion 4 times 4 matrix of the input matrix whose matrix elements all have a gradation value "15", satisfied threshold matrices AG0, AG12, and AG15, divisional output matrices BG0, BG12, and BG15, and divisional images PG0, PG12, and PG15 are obtained, respectively.

Although in the above cases, the gradation values shown in each 4 times 4 matrix are all identical to each other, this is not limitative, but even if gradation values in a 4 times 4 matrix have various values, it is possible to process them in the same manner as described above, since a satisfied threshold matrix can be obtained. Further, although in a multi-valued dither process, a converted (compressed) image, that is, a pseudo-gradation image is not an image represented by a binary matrix (binary image) but an image represented by a multi-valued gradation matrix having three or more gradation values (multi-valued image), the multi-valued image can be processed in the same manner as carried out in the binary dither process.

For instance, when the multi-valued dither process is carried out on (an input matrix representative of) a gradation image with 64-valued gradation values 0 to 63 so as to obtain (an output matrix representative of) a multi-valued pseudo-gradation image, as shown in FIGS. 7A and 7B, a plurality of (four in this example) dither matrices similar to the above dither matrix DD16 are prepared beforehand according to ranges of gradation values, and then a dither matrix DD64(1) is applied to gradation values 0 to 16 [1], a dither matrix DD64(2) is applied to gradation values 16 to 32 [2], a dither matrix DD64(3) is applied to gradation values 32 to 48 [3], and a dither matrix DD64(4) is applied to gradation values 48 to 63 [4]. Further, as a result of the above application to the gradation values [1], if a condition designated by a threshold for a gradation value is not satisfied (gradation value<threshold), it is determined to assign "0" to a corresponding matrix element, whereas if the condition is satisfied (gradation value<threshold), it is determined to assign "1" to a corresponding matrix element. Similarly, as a result of the above application to the gradation values [2], when conditions are not satisfied, "1" is assigned, whereas when the conditions are satisfied, "2" is assigned, and as a result of the application to the gradation values [3], if the conditions are not satisfied, "2" is assigned, whereas if the conditions are satisfied, "3" is assigned. Finally, as a result of the application to the gradation values [4], if the conditions are not satisfied, "3" is assigned, whereas if the conditions are satisfied, "4" is assigned.

Now, a divisional input matrix IGr shown in FIG. 7D is considered. In this case, gradation values designated by four matrix elements (see a matrix IGr(1) appearing in FIG. 7C) at a lower left portion of the divisional input matrix IGr are within the range of the gradation values 0 to 16 [1], and hence the dither matrix DD64(1) is applied to them. A gradation value "7" and a threshold "4" (gradation value≧threshold: satisfied: result "1"), a gradation value "9" and a threshold "11" (gradation value<threshold: unsatisfied: result "0"), a gradation value "10" and a threshold "13" (gradation value<threshold: unsatisfied: result "0"), and a gradation value "8" and a threshold "7" (gradation value≧threshold: satisfied: result "1") are compared, respectively, whereby as results of the comparison, it is possible to obtain the values of four matrix elements located at a lower left portion of a divisional output matrix EGr appearing in FIG. 7D.

Similarly, since gradation values designated by four matrix elements (see a matrix IGr(2) appearing in FIG. 7C) at an upper right portion of the divisional input matrix IGr are within the range of the gradation values 16 to 32 [2], the dither matrix DD64(2) is applied to them. A gradation value "26" and a threshold "19" (gradation value threshold: satisfied: result "2"), a gradation value "24" and a threshold "30" (gradation value<threshold: unsatisfied: result "1"), a gradation value "23" and a threshold "28" (gradation value<threshold: unsatisfied: result "1"), and a gradation value "25" and a threshold "23" (gradation value≧threshold: satisfied: result "2") are compared, respectively, whereby as results of the comparison, it is possible to obtain the values of four matrix elements located at an upper right portion of the divisional output matrix EGr. It should be noted that when a gradation value is "16", either of the dither matrix DD64(1) and the dither matrix DD64(2) is applied to the gradation value, whereby the same result "1" is obtained.

Similarly, since gradation values designated by four matrix elements (see a matrix IGr(3) appearing in FIG. 7C) at a lower right portion of the divisional input matrix IGr are within the range of the gradation values 32 to 48 [3], the dither matrix DD64(3) is applied to them. Further, gradation values designated by four matrix elements (see a matrix IGr(4) appearing in FIG. 7C) at an upper left portion of the divisional input matrix IGr are within the range of the gradation values 48 to 63 [4], and hence the dither matrix DD64(4) is applied to them. The same comparison as described above is carried out, whereby it is possible to obtain the values of four matrix elements located at a lower right portion of the divisional output matrix EGr and four matrix elements located at an upper left portion thereof. It should be noted that when a gradation value is "32", either of the dither matrix DD64(2) and the dither matrix DD64(3) is applied to the gradation value, whereby the same result "2" is obtained. When a gradation value is "48", either of the dither matrix DD64(3) and the dither matrix DD64(4) is applied to the gradation value, whereby the same result "3" is obtained.

The above divisional output matrix EGr corresponds to one of matrices which are formed by dividing an output matrix representing a pseudo-gradation image produced through the multi-valued (5-valued in this example) dither process, into 4 times 4 matrices. The divisional output matrix EGr is a matrix resulting from the multi-valued dither process carried out on the divisional input matrix IGr. In other words, the divisional output matrix EGr is a portion of (an output matrix representative of) a multi-valued pseudo-gradation image as a result of the multi-valued dither process carried out on (an input matrix representative of) a gradation image represented by a matrix of matrix elements each having anyone of 64 gradation values 0 to 63. It should be noted that a multi-valued (e.g. 5-valued) pseudo-gradation image can be further subjected to the binary dither method, thereby finally obtaining a two-valued (binary) pseudo-gradation image. That is, the binary dither process can be further carried out on a multi-valued (5-valued) matrix such as the above divisional output matrix EGr.

To do this, as shown in FIG. 7E, a 2 times 2 dither matrix DD5 is prepared, for instance, and the divisional output matrix EGr is divided into 2 times 2 matrices each having the same size as that of the dither matrix DD5. Then, the matrix elements of each of the 2 times 2 matrices are compared with the corresponding matrix elements of the dither matrix DD5, and it is determined on an element-by-element basis whether the condition is satisfied (gradation value≧threshold) or not (gradation value<threshold). When the condition is satisfied, "1" is assigned, whereas when the same is not satisfied, "0" is assigned, whereby as results of the comparison, it is possible to obtain a two-valued or binary divisional output matrix BGr appearing in FIG. 7D, which corresponding to a divisional image PGr in FIG. 7D.

Although in the above case, a gradation image with 64 gradation levels (64-valued gradation image) was converted to a multi-valued (5-valued) pseudo-gradation image to further convert the same to a two-valued (binary) pseudo-gradation image, this is not limitative, but it is also possible to define thresholds therefor based on 64 values 0 to 63, and provide a dither matrix as an 8 times 8 matrix of matrix elements each having any one of the 64 thresholds, thereby directly converting the 64-valued gradation image to the 2-valued pseudo-gradation image. In short, the dithering for converting "64-valued gradation to 2-valued gradation" can also be carried out in place of the dithering for converting "64-valued gradation to 5-valued gradation to 2-valued gradation".

Similarly, when a 256-valued gradation image represented by a matrix of matrix elements each having any one of 256 gradation values ranging from 0 to 255 is processed, the 256 gradation levels are classified into e.g. four gradation ranges, that is, gradation range 1 from 0 to 64, gradation range 2 from 64 to 128, gradation range 3 from 128 to 192, and gradation range 4 from 192 to 255, and dither matrices are prepared for application to respective gradation ranges of gradation values. Further, two values as results of the application to gradation range 1 are defined as 0 and 1, ones for gradation range 2 as 1 and 2, ones for gradation range 3 as 2 and 3, and ones for gradation range 4 as 3 and 4. Then, when the binary dither process is carried out on gradation values in each gradation range (i.e. when the systematic dither method is applied to gradation values at each gradation range), a 5-valued pseudo-gradation image having five gradation values 0 to four can be formed as a result of the application. Of course, if the binary dither method is further executed on such a multi-valued (e.g. 5-valued) pseudo-gradation image, it is also possible to finally obtain a two-valued pseudo-gradation image.

Figure 31:
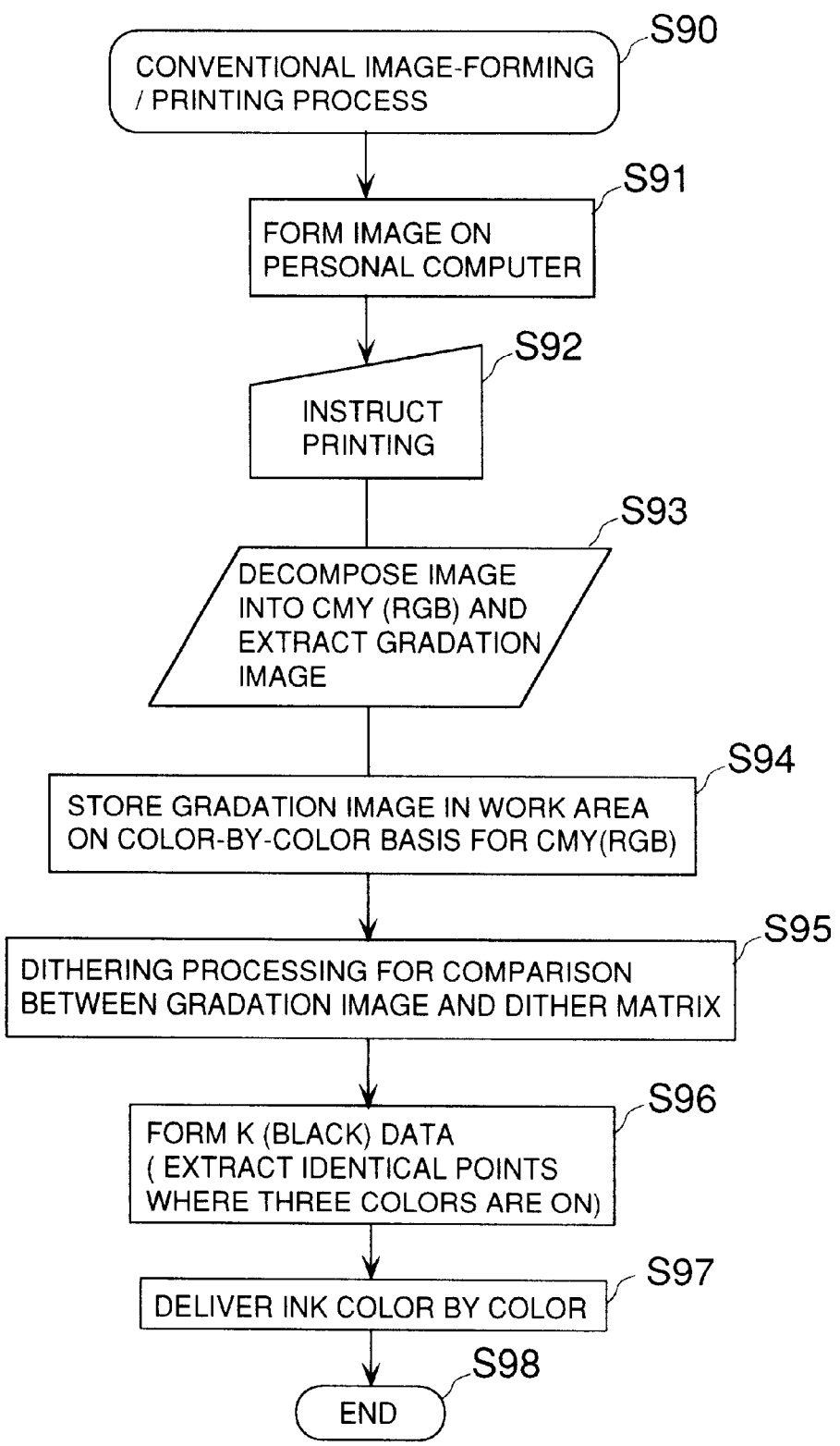
FIG. 31 is a flowchart showing an example of the conventional image-forming/printing process.

The above dithering can be applied not only to a monochrome image (gradation image having gradation levels of gray tones) but also to a color print image. That is, the dithering (color dithering) on gradation values of basic colors, such as three primary colors and the like, may be carried out. For instance, when a pseudo-gradation image is formed as a display image to be output to a display or the like, it is only required that the dithering is carried out on gradation values of each of three primary colors, i.e. R (red), G (green) and B (blue), whereas when a pseudo-gradation image is produced as a print image for printing, it is only required that the dithering is carried out on gradation values of each of three primary colors, i.e. C (cyan), M (magenta) and Y (yellow). In this case, alternatively, the dithering may be carried out on gradation values of each of four basic colors i.e. C, M, Y and K (black) For instance, when a multi-valued gradation image (hereinafter referred to as "multi-gradation image") e.g. in 256-valued gradation values (i.e. with 256 gradation levels) created by using a personal computer or the like is output to a printing apparatus (printer, etc.) which can treat only a color image with two gradation levels per color, dithering for processing the gradation value of each of the three primary colors C, M, Y, or dithering for processing the gradation value of each of the four basic colors C, M, Y and K (black) is to be carried out. Although an identical process can be carried out in a printer of a thermal type or the like, in this embodiment, let it be assumed that a printer of a so-called ink jet type is used to suit the requirements of the tape printing apparatus 1. An example of the dithering is shown in FIG. 31.

Referring to the figure, in a conventional image-forming/printing process (S90) of the above-mentioned kind, first, an image (gradation image) is formed on a personal computer at step S91, and printing of the gradation image is instructed by operating a print key or the like at step S92. Then, (an input matrix representative of) the gradation image is decomposed to extract (input matrices representative of) color-by-color gradation images for colors C, M, and Y at step S93. The color-by-color gradation images are separately stored in a work area at step S94. Next, the dithering is carried out at step S95 for comparison between (an input matrix representative of) each color-by-color gradation image and a dither matrix. Thereafter, K (black) data is formed at step S96 by carrying out an identical point extraction process on the three colors, and ink is delivered color by color at step S97, followed by terminating the image-forming/printing process (S90) at step S98. Further, when a multi-gradation image created on a personal computer is output to a display device of a display or the like connected to the personal computer, R, G, B are used in place of C, M, and Y at the steps S93 and S94 in the above process, and the K data-forming step (S96) and the ink delivery step (S97) are omitted.

In a word processor and the like, when characters including letters, numerals, symbols, graphics and the like (hereinafter generically referred to as "characters") are input to display and print a character string having each of the characters as an element thereof, minimum units for carrying out color specification or the like are characters. Further, in the case of reversed images of characters, or in a case where a background color can be set, it is possible to specify a color of the background of characters. Furthermore, in the above case of a character string being displayed and printed, if an image of a character string formed as a display image or a print image is referred to as a whole image, an image of each character included in the character string becomes an image element.

In the above case, when a character shape image to be a body or object of each image element is defined as an elementary object image and an image of the background of the elementary object image is defined as an elementary background image, out of pixels of each image element, pixels of an elementary object image of the image element and pixels of an elementary background image as the background of the elementary object image can be discriminated through viewing the same on a display image or a print image. Correspondingly, when image data is processed, out of elements of a matrix representing the image element, matrix elements corresponding to pixels of the elementary object and matrix elements corresponding to pixels of the elementary background image can be distinguished from each other. Further, in this case, different gradation values are set to the elementary object image and the elementary background image, respectively. That is, the elementary object image has pixels all having an identical gradation value to each other, and the elementary background image also has pixels all having a gradation value identical to each other but not identical to that of the elementary object image. It should be noted that in the above case of reversed images of characters, it is possible to regard the background of each character as an elementary object image and the character itself as an elementary background image of the elementary object image.

Similar images can be formed not only by a word processor as a so-called character entry device but also by an image input device (including a personal computer or the like having plotting software (design software) installed therein) which permits a desired diagram and picture to be plotted and input. More specifically, also when an arbitrary diagram or picture as a component of a whole image has gray tones or colors designated therefor, an image of the arbitrary diagram or picture is an image element, and an image in the shape of a diagram or a picture as a body or object of the image element corresponds to an elementary object image, and can be distinguished from an elementary background image as a background thereof. At least all the pixels of the elementary object image have an identical gradation value. Further, however complicated a plotted image is, if it can be regarded as a synthesized image (whole image) formed by synthesizing image elements in each of which all the pixels of at least an elementary object image have an identical gradation value, the plotted image can be decomposed into the image elements. Further, each image element can be decomposed into an elementary object image and an elementary background image other than the elementary object image, and the elementary object image and the elementary background image can be distinguished from each other, with all the pixels of at least the elementary object image having an identical gradation value. It should be noted that an image, which is intuitively considered as a background image, can be regarded as a body or object image depending on the viewpoint.

Therefore, in the following, description will be made of a case where dithering is carried out on a whole image, at least one image element of which has an elementary object image as a body thereof whose pixels are distinguishable from pixels of an elementary background image as the background of the elementary object image, with all the pixels of at least the elementary object image having an identical gradation value. First, a case is described in which the above-mentioned dithering (binary dither process and multi-valued dither process) is directly applied.

For instance, when all the pixels of an elementary object image have an identical gradation value of "55", one of 64 gradation values ranging from 0 to 63, a divisional input matrix within a contour of an elementary object image of an image element is considered as one of divisional input matrices formed by dividing an input matrix representing the image element into 4 times 4 matrices. In this case, as shown in FIG. 8A, the divisional input matrix is represented as a 4 times 4 divisional input matrix IG55 whose gradation values are all equal to "55". When the multi-valued (5-valued) dither process described above with reference to FIGS. 7A to 7E is carried out on the divisional input matrix IG55, a FIG. 8A multi-valued divisional output matrix EG55 is obtained. When the binary dither process is further carried out based on the FIG. 7E dither matrix DD5, a two-valued divisional output matrix BG55 is obtained which represents a corresponding divisional image PG55.

Figures 9A, 9B, 9C:
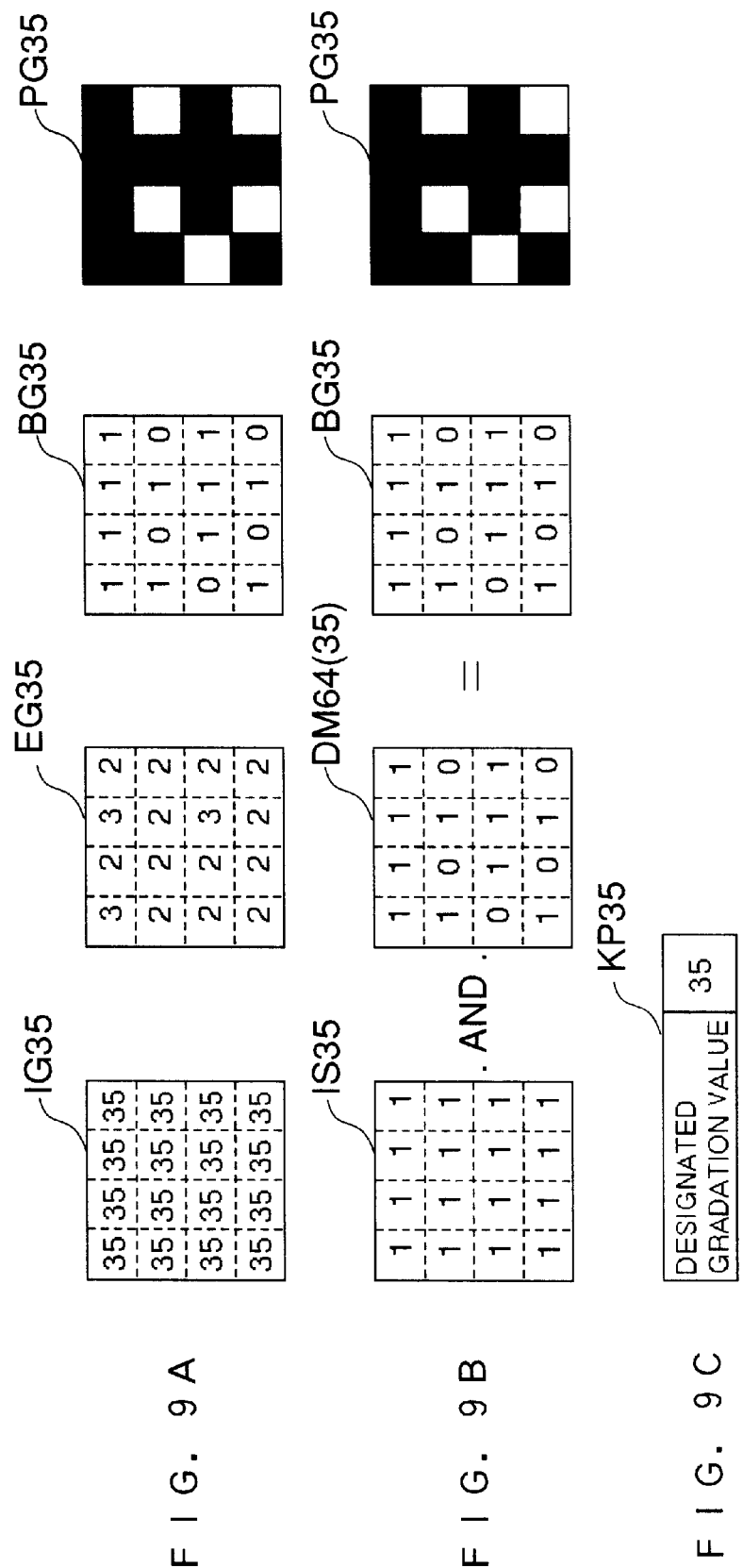
FIGS. 9A and 9B are diagrams similar to FIGS. 8A and 8B, which are useful in explaining the principle of the dithering based on another example.
FIG. 9C is a diagram showing an example of a designated gradation value.

Similarly, when all the pixels of an elementary object image have an identical gradation value "35", a 4 times 4 divisional input matrix within a contour line of the elementary object image is represented as a 4 times 4 divisional input matrix IG35 whose gradation values are all equal to "35", as shown in FIG. 9A. When the multi-valued (5-valued) dither process is carried out thereon, a multi-valued divisional output matrix EG35 is obtained. When the binary dither process is further carried out, a two-valued divisional output matrix BG35 is obtained which corresponds to a divisional image PG35.

On the other hand, an example of a 4 times 4 divisional input matrix containing therein part of a contour line L of the elementary object image all pixels of which have an identical gradation value "35" is a divisional input matrix IG35s, as shown in FIG. 10A, which includes matrix elements within the contour line L of the elementary object image whose gradation values are all equal to "35", and matrix elements outside the contour line L, that is, matrix elements of an elementary background image having a gradation value x (in this example, x=0 for purposes of ease of understanding) When the multi-valued (5-valued) dither process described above with reference to FIGS. 7A to 7E is carried out on the divisional input matrix IG35s, a multi-valued divisional output matrix EG35s including the part of the contour line L is obtained. When the binary dither process is further carried based on the FIG. 7E dither matrix DD5, a two-valued (binary) divisional output matrix BG35s is obtained which represents a corresponding divisional image PG35s.

In the above dithering, however, a gradation image represented by a matrix of matrix elements each having any one of n gradation values (n≧3: in the above example, n=64), that is, a gradation image having information of n-valued gradation values (n=64 in this example) each assigned to the image processing. This requires a memory device having a large capacity, to say nothing of processing of the aforementioned gradation image with 256 gradation levels (i.e. represented in the matrix of matrix elements each having any one of 256-valued gradation values). Further, in the pseudo-gradation processing by the multi-valued dither method (multi-valued dither process), the capacity of the memory device for storing a multi-valued (5-valued, for instance) pseudo-gradation image as a result of the dithering is required. Further, a comparing operation between a gradation image and a dither matrix carried out as a basic process takes a very long processing time. Particularly in the color dithering, the basic colors are processed on a primary color-by-primary color basis, and hence the problems of the capacity of the memory device and the long processing time become serious.

To eliminate the above inconveniences, in the tape printing apparatus 1 is adopted an image processing method which is capable of carrying out the dithering on a whole image, at least one image element of which has an elementary object image as a body or object whose pixels are distinguishable from the pixels of an elementary background image as the background of the elementary object image, with all the pixels of at least the elementary object image having an identical gradation value. Therefore, the image processing method makes it possible to save the capacity of the memory device as well as shorten processing time of the apparatus. In the following, the image processing method employed in the tape printing apparatus 1 will be described in detail.

More specifically, in the tape printing apparatus 1, assuming that out of the image elements of a whole image, at least one image element has an elementary object image as a body thereof having pixels distinguishable from pixels of an elementary background image as a background of the elementary object image, a validity-indicative one of predetermined validity-indicative and invalidity-indicative values is assigned to each pixel of the elementary object image, while the invalidity-indicative value is assigned to each pixel of the elementary background image, whereby an elementary shape image represented by a matrix formed of the predetermined validity-indicative and invalidity-indicative values is produced. That is, an elementary shape image is created, which is represented by a two-valued matrix of matrix elements having a validity-indicative value ("1" for instance) and assigned to pixels of an elementary object image and invalidity-indicative values ("0" for instance) and assigned to pixels of an elementary background image as the background of the elementary object image.

As described hereinbefore, the FIG. 8A divisional input matrix IG55 and the FIG. 9A divisional input matrix IG35 are formed of only matrix elements representing the pixels of the elementary object image within the contour thereof, so that matrices (hereinafter referred to as the "divisional elementary shape image matrices") IS55, IS35 as portions of matrices (hereinafter referred to as the "elementary shape image matrices") representing the elementary shape image, corresponding to the divisional input matrices IG55, IG35, are composed of only matrix elements each having the validity-indicative value "1" assigned thereto, as shown in FIGS. 8B and 9B.

As described above, the FIG. 10A divisional input matrix IG35s contains therein part of the contour line L of the elementary object image, and includes matrix elements within the contour line L of the elementary object image whose gradation values are all equal to "35", and matrix elements outside the contour line L, that is, matrix elements of the elementary background image having a gradation values "x", so that as shown in FIG. 10B, a divisional elementary shape image matrix IS35s corresponding to the divisional input matrix IG35s, has the validity-indicative value "1" assigned to matrix elements thereof corresponding to the pixels of the elementary object image, and the invalidity-indicative values "0" assigned to matrix elements thereof corresponding to the pixels of the elementary background image.

In the cases of the examples illustrated in FIGS. 8A to 10C, while each elementary shape image is formed, one of n (n=64 in this example) gradation values is stored as an identical designated gradation value assigned to all the pixels of each elementary object image, as shown in FIGS. 8C, 9C and 10C. More specifically, in the FIG. 8C example, the designated gradation value KP55 gradation value "55" is stored, and in the examples appearing in FIGS. 9C and 10C, the designated gradation value KP35 gradation value "35" is stored. In these cases, it is only required to store one of binary values (indicative of validity and invalidity, respectively, i.e. "1" and "0") as information of each pixel of each elementary object image, even if the designated gradation value is stored separately from information of each pixel, so that the memory capacity can be made smaller than when information of an n-valued gradation value (n≧3: n=64 in this example) is stored for each pixel (on a pixel-by-pixel basis).

For instance, to represent one of gradation values between 0 and 63, that is, 64 gradation values, 6 bits is necessitated, so that only to secure 6-bit information for each matrix element of the above 4 times 4 matrix, a memory capacity of minimum 6 bits×16=96 bits is simply required. On the other hand, to store one designated gradation value extracted from 64 gradation values as it is as a numerical value, simply 4 bits×4+6 bits=22 bits is required. Further, in the former case, only to represent an image element by an 8 times 8 matrix, a memory capacity four times as large as the 96-bit memory capacity (i.e. a memory capacity of 6 bits×64) is necessitated, and if a 16 times 16 matrix is to be used, a memory capacity further four times as large as the memory capacity for the 8 times 8 matrix (i.e. a memory capacity of 6 bits×256) is required. In the latter case, however, it is only required to store only one (in the above case, simply 6-bit) designated gradation value regardless of the size of a matrix, so long as it is a designated gradation value of an elementary object image all the pixels of which have an identical gradation value. Hence, as the size of an elementary object image becomes larger, a required capacity of memory becomes markedly different between the two cases.

Further, in the latter case, the above elementary shape image may be formed based on an image (gradation image) having information of an n-valued gradation value (in the above example, n=64) per pixel and at the same time a designated gradation value may be extracted. Alternatively, the elementary shape image may be formed separately from the designation of a designated gradation value from the beginning. For instance, when the elementary shape image is formed based on a gradation image produced by using the personal computer or the like, a method corresponding to the former may be employed, whereas when characters are entered via the keyboard of a word processor or the like, and a gradation value is designated (gray tone or color designation) on a character-by-character basis for forming an image element, a method corresponding to the latter may be employed.

In the tape printing apparatus 1, a dither mask is stored which is represented by a two-valued (binary) matrix having a size identical to a dither matrix. More specifically, as a dither mask, there is stored a matrix in which a validity-indicative one of two predetermined numerical values is assigned to each matrix element corresponding to each threshold of the dither matrix whose condition is satisfied by a designated gradation value, whereas an invalidity-indicative one of the two predetermined numerical values is assigned to each matrix element corresponding to each threshold of the dither matrix whose condition is not satisfied by the designated gradation value.

The dither mask in this case coincides with (the matrix of) a pseudo-gradation image as an image resulting from the binary dither process which is carried out by using the dither matrix on a predetermined gradation image having the same size as that of the dither matrix. In other words, the dither mask coincides with a matrix resulting from a binarization process in which, when a gradation image having the same size as that of the dither matrix has information of an n-valued gradation value per pixel, and at the same time information of gradation values for all the pixels indicates the above designated gradation value, the gradation value of each pixel of the gradation image is compared with a corresponding threshold in the dither matrix and then, the result of the comparison is binarized.

For instance, in the case of the examples illustrated in FIGS. 8A to 8C, the designated gradation value KP55= gradation value "55" holds, so that if the dither matrix DD64(4) as shown in FIG. 7A is applied to carry out the multi-valued (5-valued) dither process, and further the dither matrix DD5 shown in FIG. 7E is applied to carry out the binary dither process, the two-valued divisional output matrix BG55 shown in FIG. 8A is obtained. In the present case, however, a matrix of matrix elements having the same values as those of the divisional output matrix BG55 is stored as a dither mask DM64(55). Similarly, in the case of the examples illustrated in FIG. 9A to 9C as well, the designated gradation value KP35=gradation value "35" holds, so that if the dither matrix DD64(3) as shown in FIG. 7A is applied to carry out the multi-valued (5-valued) dither process, and further the dither matrix DD5 shown in FIG. 7E is applied to carry out the binary dither process, the two-valued divisional output matrix BG35 shown in FIG. 9A is obtained. In the present case, however, a matrix of matrix elements having the same values as those of the divisional output matrix BG35 is stored as a dither mask DM64(35).

It should be noted that in the above case, a dither mask for each of possible designated gradation values may be stored in advance, or a dither mask may be newly produced for storage by comparing a designated gradation value with each threshold in a dither matrix, after the designated gradation value is determined. In the former case, there are 64 (0 to 63) candidate designated gradation values, for instance, so that if dither masks, such as dither masks DM64(0) to DM64(63), are stored beforehand for respective designated gradation values between 0 and 63, it is only required to read one of them when it is employed. This makes it possible to omit computing time to thereby shorten processing time of the whole image processing operation.

In the latter case, for instance, in the case of the examples illustrated in FIGS. 8A to 8C, after the designated gradation value "55" is determined, the FIG. 7A dither matrix DD64 (4) and the FIG. 7E dither matrix DD5 are applied, and similarly to the FIG. 9A divisional output matrix BG35, the dither mask DM64(55) is newly generated for storage by comparing operations. In this case, however, differently from the above-mentioned possible dither masks DM64(0) to DM64(63), there is no need to store data of the dither masks for 64 possible designated gradation values (0 to 63), so that the capacity of the memory device for storing dither masks can be saved. In addition, since the above comparing operations are carried out between matrices having the size of the dither matrix, only relatively short processing time is required therefor.

In the tape printing apparatus 1, a logical AND operation is performed between each matrix element of each of matrices of respective portions of an elementary shape image, each of the matrices having the same size as that of the dither mask, and a corresponding one (corresponding in matrix element location) of the matrix elements of the dither mask, such that the validity-indicative value is output only when both a matrix element of each of the matrices of the respective portions of the elementary shape image and a corresponding matrix element of the dither mask have the validity-indicative value. As a result of the logical AND operations, there is produced a dithered image element represented by a predetermined binary matrix having a size identical to that of the elementary shape image.

In the foregoing description referring to FIGS. 8A to 10C, only portions of a matrix representative of an elementary shape image (hereinafter referred to as an "elementary shape image matrix"), each of which has a size identical to that of the dither matrix, that is, 4 times 4 divisional matrices (hereinafter referred to as "divisional elementary shape image matrices") IS55, IS35 and IS35s have been described. Therefore, the above phrase "each of portions of a matrix representative of an elementary shape image, each having the same size as that of the dither mask" will be explained later, and only the logical AND operation will be described next.

As described above, in the foregoing examples described with reference to FIGS. 8A to 9C, the divisional elementary shape image matrices IS55, IS35 are composed only by matrix elements all having the validity-indicative value "1" assigned thereto, as shown in FIGS. 8B and 9B, and hence if the logical AND operation is performed between each matrix element of the divisional elementary shape image matrix IS55 and a corresponding one of the matrix elements of the dither mask DM64(55) or between each matrix element of the divisional elementary shape image matrix IS35 and a corresponding one (corresponding in matrix element location) of the matrix elements of the dither mask DM64(35), a resulting matrix having the same values as those of the dither mask DM64(55) or DM64(35) is obtained. In other words, out of an output matrix representative of a dithered image element (hereinafter referred to as the "dithered image element matrix"), which is obtained by the logical AND operation, divisional output matrices (hereinafter referred to as "divisional dithered image element matrices") corresponding to the divisional elementary shape image matrices IS55, IS35 become matrices identical to the dither masks DM64(55) and DM64(35), as shown in FIGS. 8A to 9C.

On the other hand, in the case of the examples illustrated in FIGS. 10A to 10C, in the divisional elementary shape image matrix IS35s, the validity-indicative value "1" is assigned to matrix elements corresponding to pixels of the elementary object image, and the invalidity-indicative value "0" is assigned to matrix elements corresponding to pixels of the elementary background image, as shown in FIG. 10B. Referring to the figure, a logical AND operation (represented by ". AND ." in the figure) between the divisional elementary shape image matrix IS35s and the dither mask DM64 (35) corresponding to the designated gradation value KP35= the gradation value "35" is carried out, that is, a logical AND operation is performed between each matrix element of the divisional elementary shape image matrix IS35s and a corresponding one (corresponding in matrix element location) of the matrix elements of the dither mask DM64 (35) such that the validity-indicative value ("1" in this example) is obtained only when elements of the matrix and the dither mask both have the validity-indicative value ("1"). This makes it possible to obtain the same two-valued divisional output matrix (divisional dithered image element matrix) BG35s as obtained by the comparing operations through the multi-valued dither process and the binary dither process, described above with reference to FIG. 10A.

Conventionally, the gradation value of each pixel of each image element matrix having the same size as that of the dither matrix is compared with a corresponding one (corresponding in matrix element location) of the thresholds of the dither matrix, to thereby obtain a pseudo-gradation image. In the tape printing apparatus 1, however, to obtain the same advantageous effect, it is only required to perform the logical AND operation, which is simple, whereby it is possible to enhance processing speed (shorten processing time) of the apparatus. Moreover, since the inputs (the dither mask and the elementary shape image matrix) and the output (dithered image element as a result) of the logical AND operation are represented by binary matrices, the capacity of the memory device can be saved. Of course, when similar processing can be also carried out on the whole image itself, that is, when all the image elements can be divided into elementary object images and elementary background images, by carrying out the above processing on the whole image, it is possible to further save the capacity of the memory device as well as shorten processing time of the apparatus. In the following, the case of the above processing being applied to all the image elements and the whole image will be described.

It should be noted that in the following, for convenience of representations of figures and explanation thereof (for efficiency of description) as well as for purposes of ease of understanding, description is made based on five gradation values 0 to 4 (n=5) and by using a 2 times 2 matrix as a dither matrix. Of course, a gradation image with 64 or 256 gradation levels described above can be processed based on the same principle. Further, the above 4 times 4 matrix and 8 times 8 matrix can be employed as a dither matrix. Furthermore, in the following, the dither matrix DD5 (see FIG. 7F, FIG. 11A and FIG. 12C: the matrices appearing in the figures are all identical) used in the above description is employed as the 2 times 2 dither matrix for the same reason. Although in such a case, $2^k$ gradation values o to ($2^k$−1) (k is a natural number equal to or larger than 2), such as 64 gradation values 0 to 63, and 256 gradation values 0 to 255, described above, are normally used for efficiency of binary digital information, in the following, five gradation values 0 to 4 are employed with preference to ease and clarity of explanation. Further, in the following, first, the case of a monochrome image (normally, white, black, and gray tones different in shading) being processed is described. However, the description will be made by using figures showing examples of Y (yellow) level values, referred to hereinafter, since the processing of a color image is described next.

Figures 11A, 11B, 11C:
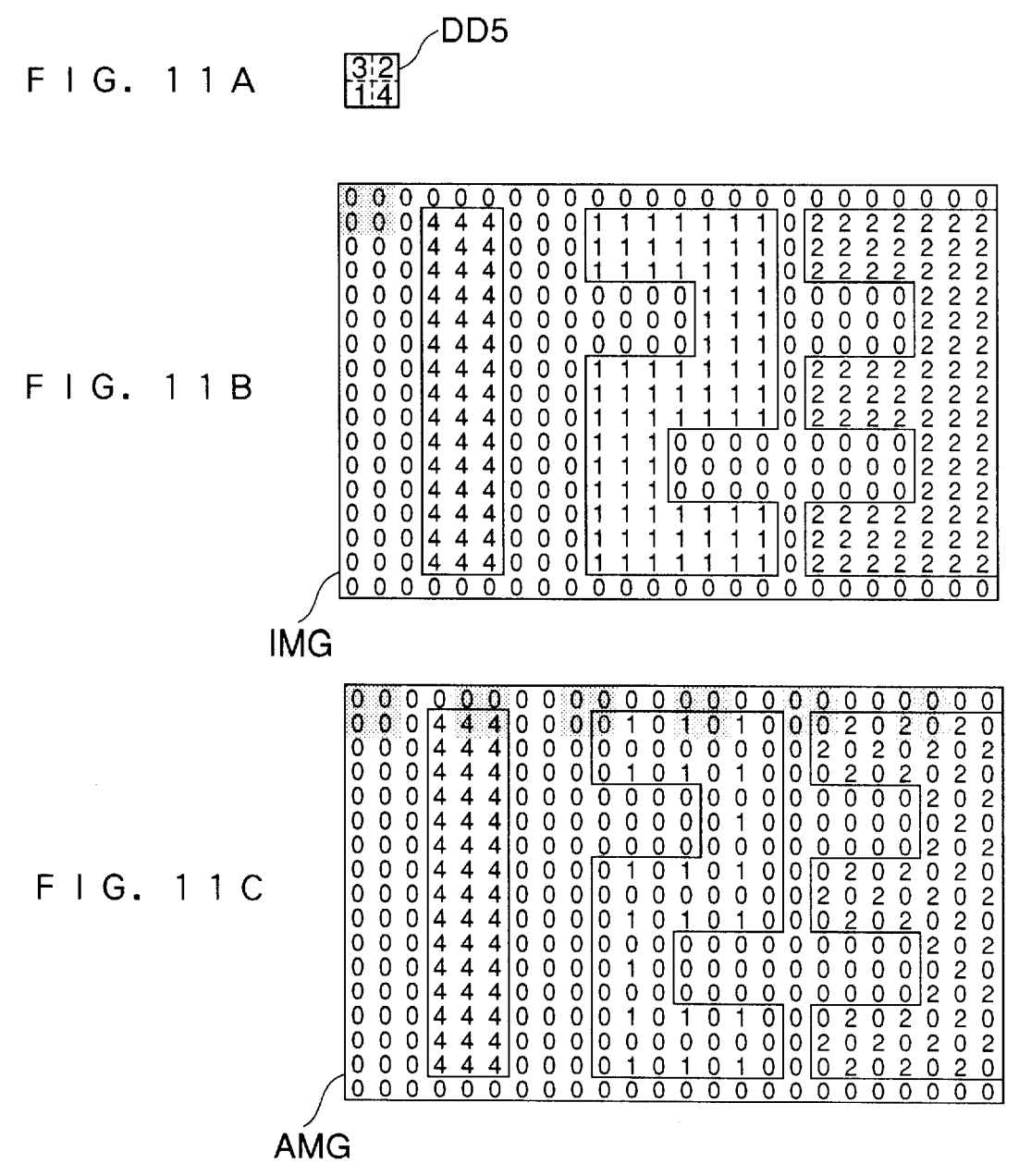

First, referring to FIGS. 11A to 11C, description is made of a case where a FIG. 11A dither matrix DD5 is determined in advance and the binary dither process is carried out by the conventional method on (an input matrix representative of) a gradation image IMG, such as one appearing in FIG. 11B, represented with five gradation levels 0 to 4 (corresponding to respective gradation values of the matrix).

As shown in the figure, here, the character image of numeral "1" has a gradation value "4", the character image of numeral "2" has a gradation value "1", and the character image of numeral "3" has a gradation value "2", whereby a character string image of a character string (numeral string) "123" is formed as a whole. In this case, the character string image of the character string "123", corresponding to a whole image, is represented by the input matrix IMG of 24 (in a horizontal direction) times 17 (in a vertical direction) matrix elements. Further, one of image elements constructing the whole image is the character image of a character "1", and represented by a matrix of 8 (horizontal) times 17 (vertical). Similarly, the character image of a character "2" and the character image of a character "3" are image elements of the whole image, each represented by a matrix of 8 (horizontal) times 17 (vertical) (see FIG. 12A).

When the conventional binary dither process is carried out on the input matrix IMG by using the dither matrix DD5, the input matrix IMG representing the original gradation is divided into (2 times 2) matrices (examples are shown as respective shaded portions in FIGS. 11B and 11C) each having the same size of that of the dither matrix DD5. Then, the gradation value of each element of each resulting matrix and a corresponding one (corresponding in matrix element location) of the thresholds of the dither matrix DD5 are compared with each other to thereby determine whether or not each gradation value satisfies a condition designated by a corresponding threshold. Next, either of the above-mentioned two numerical values is assigned according to the result of the determination, whereby a pseudo-gradation image represented by a binary matrix is formed.

A matrix AMG appearing in FIG. 11C is a matrix in which for purposes of ease of understanding, each matrix element satisfying a condition designated by a corresponding threshold (gradation value≧threshold) is represented by an original gradation value thereof, while each matrix element not satisfying the condition (gradation value<threshold) is represented by "0". In this case, a matrix, in which the validity-indicative value "1" is assigned to a matrix element satisfying the condition, while the invalidity-indicative value "0" is assigned to a matrix element not satisfying the condition, becomes a binary matrix resulting from the binary dither process, that is, an output matrix (the same as an output matrix DGY appearing in FIG. 13A) representative of the desired two-valued pseudo-gradation image. An image represented by this output matrix becomes a desired pseudo-gradation image (the same as a FIG. 13B pseudo-gradation image PGY, that is, a print image PGY, described hereinafter, e.g. if "1" represents black and "0" white).

On the other hand, in the image processing method employed in the tape printing apparatus 1, assuming that out of the image elements of a whole image, at least one image element has an elementary object image as a body or object thereof having pixels distinguishable from pixels of an elementary background image as the background of the elementary object image, a validity-indicative one of predetermined validity-indicative and invalidity-indicative values is assigned to each pixel of the elementary object image, while an invalidity-indicative one of them is assigned to each pixel of the elementary background image, whereby an elementary shape image represented by a matrix of matrix elements each having the predetermined validity-indicative or invalidity-indicative value. That is, an elementary shape image is created which is represented by a two-valued matrix having the validity-indicative value assigned to each the pixels of an elementary object image and the invalidity-indicative value assigned to each of the pixels of an elementary background image as the background of the elementary object image. On the other hand, one of the n gradation values is stored as an identical designated gradation value for all the pixels of the elementary object image.

More specifically, as shown in FIG. 12A, out of image elements (image elements of the character image of the character "1", the character image of the character "2" and the character image of the character "3" in this example) forming the character string image of the character string "123" as a whole image, for at least one image element (each of all the image elements in this example, since all the image elements are distinguishable between an elementary object image and an elementary background image) which has an elementary object image as a body or object having pixels distinguishable from the pixels of an elementary background image as the background of the elementary object image, the validity-indicative value "1" is assigned to the elementary object image and the invalidity-indicative value "0" is assigned to the elementary background image, whereby elementary shape images represented by elementary shape image matrices SG1, SG2 and SG3 are produced. Further, as shown in FIG. 12B (see the values of a color Y, here), one of n (5) gradation values is stored for all the pixels of the elementary object image as the identical designated gradation value therefor (that is, gradation value "4" is stored for the elementary object image of the character image of the character "1", gradation value "1" for the elementary object image of the character image of the character "2", and gradation value "2" for the elementary object image of the character image of the character "3").

In this cases, it is only required to store one of binary values (indicative of validity and invalidity, respectively, i.e. "1" and "0") as information of each pixel of each elementary object image, even if the designated gradation value is stored separately from information of each pixel, so that the memory capacity can be made smaller than when information of an n-valued gradation value (n=5 in this example) is stored for each pixel (on a pixel-by-pixel basis). Further, as described above, when the FIG. 11B gradation image, for instance, formed on a personal computer or the like already exists, the above elementary shape image may be formed based on (the input matrix of) the image and a designated gradation value may be extracted at the same time. Alternatively, when the user enters characters via a keyboard 3 of a word processor or the like, and designates a gradation value (gray tone or color designation) on a character-by-character basis for forming an image element, the elementary shape image may be formed separately from the designation of a gradation value from the beginning. As described above, the latter method is employed in the tape printing apparatus 1, since character can be entered via the keyboard 3.

As described above, in the tape printing apparatus 1, there is stored a dither mask in a two-valued (binary) matrix which is composed of matrix elements having predetermined two values and has a size identical to the size of a dither matrix. In other words, a matrix is stored as a dither mask, in which a validity-indicative value out of the two predetermined numerical values is assigned to each matrix element corresponding to one of the thresholds of the dither matrix, whose condition is satisfied by a designated gradation value, whereas an invalidity-indicative value out of the two predetermined numerical values is assigned to each matrix element corresponding to one of the thresholds of the dither matrix, whose condition is not satisfied by the designated gradation value.

More specifically, in the above examples illustrated in FIGS. 12A to 12C, as shown in FIG. 12D, five dither masks DM5(0) to DM5(4) are formed in advance for storage. The dither masks DM5(0) to DM5(4) in this case coincide with the matrices of pseudo-gradation images as images resulting from the binary dither process which is carried out by using the dither matrix DD5 on predetermined gradation images each having the same size (2 times 2 in these examples) as that of the dither matrix DD5 (the pseudo-gradation images produced by setting "1" to black and "0" to white are shown in parentheses under the respective dither masks DM5(0) to DM5(4)). The suffix h (=0 to 4) of the dither mask 5(h), coinciding with corresponding designated gradation values, represent types of the dither masks, and hence in the following description, it is referred to as the "mask number").

For instance, when a 2 times 2 gradation image has information of an n-valued gradation value (n=5 in this example) for each pixel, and at the same time the gradation value information for each pixel indicates e.g. the designated gradation value "0", if the gradation value "0" for each pixel of the gradation image is compared with each threshold of the dither matrix DD5, none of the gradation values satisfy the condition (gradation value<threshold) Hence, the values of all the elements of a 2 times 2 matrix is set to "0". That is, the dither mask DM5(0) shown in FIG. 12D coincides with a matrix resulting from the comparing operation carried out. Similarly, when the binary dither process by using the dither matrix DD5 is carried out on a 2 times 2 gradation image whose pixels all have the same designated gradation value of "1", out of the elements of a resulting matrix, an element satisfying the condition (gradation value≧threshold), that is, a matrix element set to "1" is one at a lower right location of the resulting matrix. Therefore, the dither mask DM5(1) shown in FIG. 12D coincides with a matrix resulting from the comparing operation carried out.

Similarly, the dither mask DM5(2) coincides with a matrix resulting from the binary dither process which is carried out by using the dither matrix DD5 on a 2 times 2 gradation image having all pixels thereof having the same designated gradation value "2". The dither mask DM5(3) coincides with a matrix resulting from the binary dither process which is carried out on a 2 times 2 gradation image having all pixels thereof having the same designated gradation value "3", and the dither mask DM5(4) coincides with a matrix resulting from the binary dither process which is carried out on a 2 times 2 gradation image having all pixels thereof having the same designated gradation value "4".

In the above case, since the dither masks DM5(0) to DM5(4) are stored in advance for respective possible designated gradation values 0 to 4, it is only required to read one of them out when it is employed. This makes it possible to omit computing time to thereby shorten time for carrying out the whole image processing operation. Of course, as described above, a dither mask may be newly produced for storage by carrying out comparison between a designated gradation value and each threshold of a dither matrix, after the designated gradation value is determined. In this case, the capacity of the memory device for storing the dither masks can be saved. In addition, the comparing operation is carried out between matrices having the size (2 times 2, in this example) of the dither matrix DD5, which enables processing time for the comparison to be made relatively short.

As described above, in the tape printing apparatus 1, a logical AND operation is performed between each matrix element of each of matrices of respective portions of an elementary shape image, each of the matrices having the same size as that of the dither mask, and a corresponding one (corresponding in matrix element location) of the matrix elements of the dither mask, such that a validity-indicative value is output only when both a matrix element of each of the matrices of the respective portions of the elementary shape image and a corresponding matrix element of the dither mask have a validity-indicative value. As a result of the logical AND operations, there is produced a dithered image element represented by a predetermined binary matrix having a size identical to that of the elementary shape image.

Figure 13A:
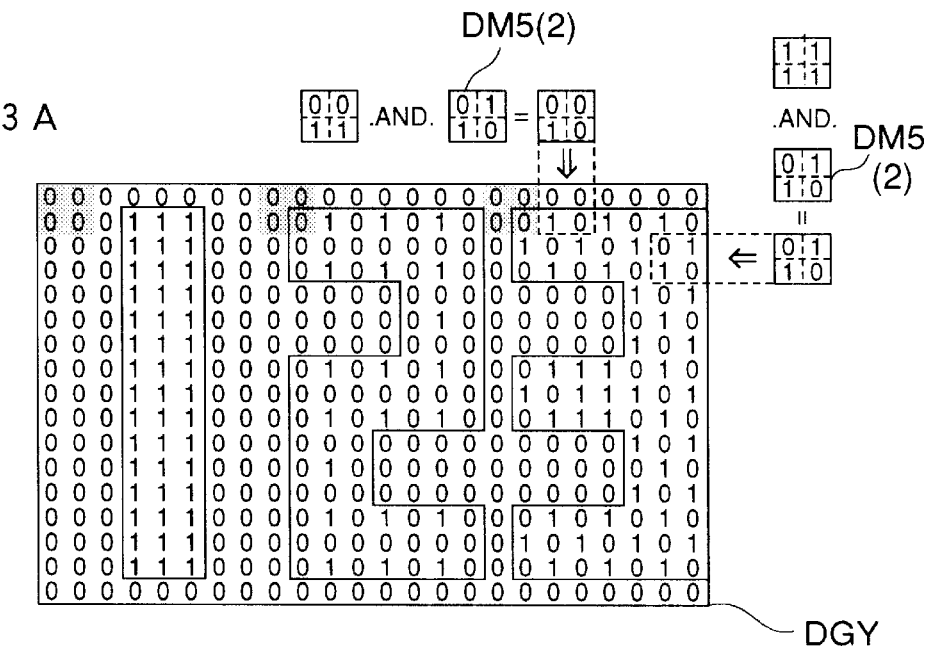
FIG. 13A is a diagram illustrating an example of a whole dithered image matrix for a monochrome image and a color Y of a color image.
Figure 13B:
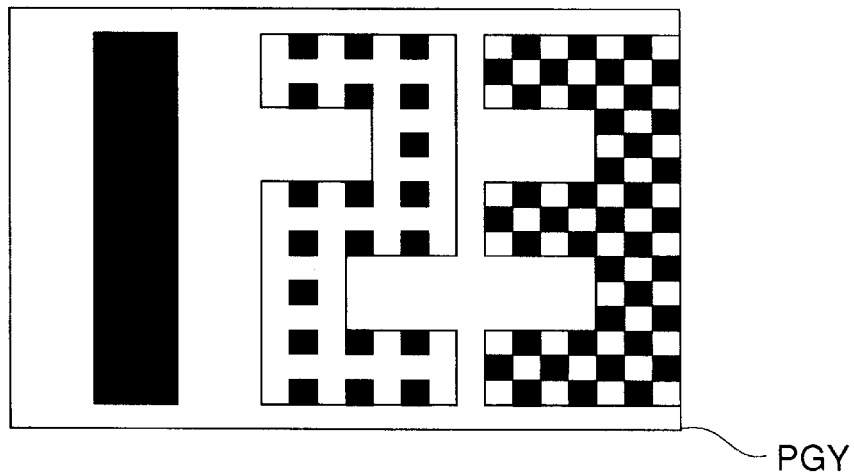
FIG. 13B is a diagram showing an example of a print image corresponding to the FIG. 13A whole dithered image matrix.

In the case of the above example, for instance, when a logical AND operation is performed between each matrix element of a 2 times 2 matrix of each of portions of the elementary shape image represented by the elementary shape image matrix SG1 and a corresponding one (corresponding in matrix element location) of the matrix elements of the dither mask DM5(4) having the designated gradation value "4", a dithered image element matrix representative of a resulting dithered image element is an 8 (horizontal) times 17 (vertical) matrix (representative of the character "1") at a left side portion of a FIG. 13A output matrix (hereinafter referred to as a "whole dithered image matrix") which represents a dithered image (hereinafter referred to as a "whole dithered image") of the character string image (whole image) of the character string "123". That is, there is obtained the left side portion (8×17 matrix) of the FIG. 13A whole dithered image matrix DGY of 24 (horizontal) times 17 (vertical) matrix elements.

Similarly, when a logical AND operation is carried out between each matrix element of a 2 times 2 matrix of each of portions of the elementary shape image represented by the elementary shape image matrix SG2 and a corresponding one of the matrix elements of the dither mask DM5(1) having the designated gradation value "1", a dithered image element matrix of 8 (horizontal) times 17 (vertical)

(representing the character "2") at a center of the 24 (horizontal) times 17 (vertical) whole dithered image matrix DGY in FIG. 13A is obtained. Further, when a logical AND operation is carried out between each matrix element of a 2 times 2 matrix of each of portions of the elementary shape image represented by the elementary shape image matrix SG3 and a corresponding one of the matrix elements of the dither mask DM5(2) having the designated gradation value "2", a dithered image element matrix of 8 (horizontal) times 17 (vertical) (representing the character "3") at a right side portion of the 24 (horizontal) times 17 (vertical) whole dithered image matrix DGY in FIG. 13A is obtained.

Conventionally, the gradation value of each pixel of each image element matrix having the same size as that of the dither matrix is compared with a corresponding one of the thresholds of the dither matrix, to thereby obtain a pseudo-gradation image. In the tape printing apparatus 1, as described above, to obtain the same advantageous effect, it is only required to perform a simple logical AND operation, whereby it is possible to enhance processing speed (shorten processing time) of the apparatus. Moreover, since the inputs (the dither mask and the elementary shape image matrix) and the output (dithered image element as a result) of the logical AND operation are represented by binary matrices, the capacity of the memory device can be saved. Further, when similar processing can be also carried out on the whole image itself, as described above, that is, when all the image elements can be divided into elementary object images and elementary background images, the above processing can be applied to the whole image, thereby making it possible to further save the capacity of the memory device as well as shorten processing time of the apparatus.

In the case of the conventional image-forming/printing process, an original n-valued designated gradation value is stored as gradation value information for each pixel, so that even if a multi-valued (e.g. 5-valued, described above) pseudo-gradation image is formed, information of the n-valued designated gradation value is lost. Further, when the pseudo-gradation image is binarized, even the multi-valued information of the pseudo-gradation image is lost. The same applies to the case of the binary dither process being carried out from the beginning, in which the n-valued information of the gradation value n is lost by binarization. In other words, to reconfirm a set (designated) gradation value on a display screen or the like, it is required to store an original gradation image, which necessitates an extra capacity of the memory. Further, even when an identical gradation value has been designated for all the pixels of the elementary object image of an image element, the settings of the gradation values can not be viewed collectively, so that it is required that the gradation values of all the pixels of the gradation image are displayed or printed for viewing pixel by pixel. In the tape printing apparatus 1, however, when an identical gradation value is designated for all the pixels of the elementary object image of an image element, the gradation value designated for the elementary object image is stored separately from information of each pixel, so that the capacity of the memory device can be saved, and at the same time the settings concerning the designated gradation value for the pixels can be collectively and directly confirmed from the numerical value (gradation value) (by displaying or printing the same, for instance).

For the above reason, in the tape printing apparatus 1, the dithering can be carried out on a whole image at least one image element of which has an elementary object image as a body or object whose pixels are distinguishable from the pixels of an elementary background image as the background of the elementary object image, with all the pixels of at least the elementary object image having an identical gradation value. Therefore, the image processing method makes it possible to save the capacity of the memory device as well as shorten processing time of the apparatus.

Although in the above examples, description is made of a case in which characters are entered via a keyboard and gradation values are designated (gray tone and color specification) for each of the characters to thereby form an image element, this is not limitative, but when gradation values can be designated (gray tone and color specification) for the background of each of the characters, the background is treated as an elementary object image, whereby it is possible to form a dithered image element of the background of the character. This method is suitable for forming reversed character images of characters. In addition, it can also be applied to obtaining a dithered image element which is formed by carrying out dithering on a dithered image element of a character as an elementary object image and a dithered image element of the background of the character as an elementary object image combined with (superimposed on) the dithered image element of the character.

Further, however complicated a plotted image is, if it is regarded as a synthesized image (whole image) formed by synthesizing image elements in each of which at least all the pixels of elementary object images thereof have an identical gradation value, the plotted image can be decomposed into image elements. Further, each image element can be decomposed into an elementary object image and an elementary background image other than the elementary object image, and the elementary object image and the elementary background image can be distinguished from each other. Therefore, by producing dithered image elements corresponding to respective image elements and combining them (superimposing corresponding matrix elements), it is also possible to obtain a dithered image element formed by carrying out the dithering on a complicated plotted image.

In the tape printing apparatus 1, since the two predetermined numerical values are 1 and 0, each pixel can be represented by one bit in one binary digit, so that the memory capacity can be made small. Additionally, the above logical AND operation is a logical AND operation performed by using AND elements arranged, one element per pixel, or by executing an equivalent program, and it is easy to carry out the AND operation on a matrix having a size equal to that of a dither matrix or a larger matrix including a plurality of matrices of the same size as the matrix, on a matrix by matrix basis, so that processing time of the apparatus can be further shortened. Moreover, as shown in the above examples, when image elements are monochrome images, gradation values indicating the gray tones of the images are stored as designated gradation values. Hence, the image elements can be applied to dithering on the gray tones of monochrome image elements.

It should be noted that the tape printing apparatus 1 is capable of treating not only monochrome images but also color images as images elements and a whole image, and the above image processing method can be applied to processing of color images. Therefore, in the following description, a case where the image processing method is applied to processing of color images, that is, a case where color dithering is carried out will be described. To carry out the color dithering, the dithering processing described above may be carried on the gradation value of each of the three primary colors R, G, B or C, M, Y, or each of the four basic colors C, M, Y and K, which is added to the primary colors, and then, combining the resulting dithered image elements for respective colors. Further, in this case, after dithered image elements for the respective colors C, M, and Y are obtained, by extracting a pixel (matrix element) having a validity-indicative value commonly to each of the dithered image elements, the dithered image element for a color K can be obtained.

Now, more specifically, particularly a case where the color dithering for color printing is carried out, that is, a case in which the color dithering is effected to produce a dithered image element or a whole dithered image as a print image will be described with reference to FIGS. 12A to 20. As described hereinabove, since the tape printing apparatus 1 is a printing apparatus of an ink jet type, a matrix element having a validity-indicative value "1" of a dithered image element formed as a print image, corresponds to a pixel for which an ink droplet should be ejected from the print head (ink jet head) 7 to a tape T (especially, printing tape T1: printing object). Further, three primary colors are set to C (cyan), M (magenta) and Y (yellow). Colors are represented by a so-called subtraction color-mixing method which is suitable for representing colors by using reflection when printing is effected by using an XY plotter, a printer or the like. Further, the four colors C, M, Y and K (black) which is a mixture of the three primary colors C, M, Y, are defined as the basic colors.

Figure 16:
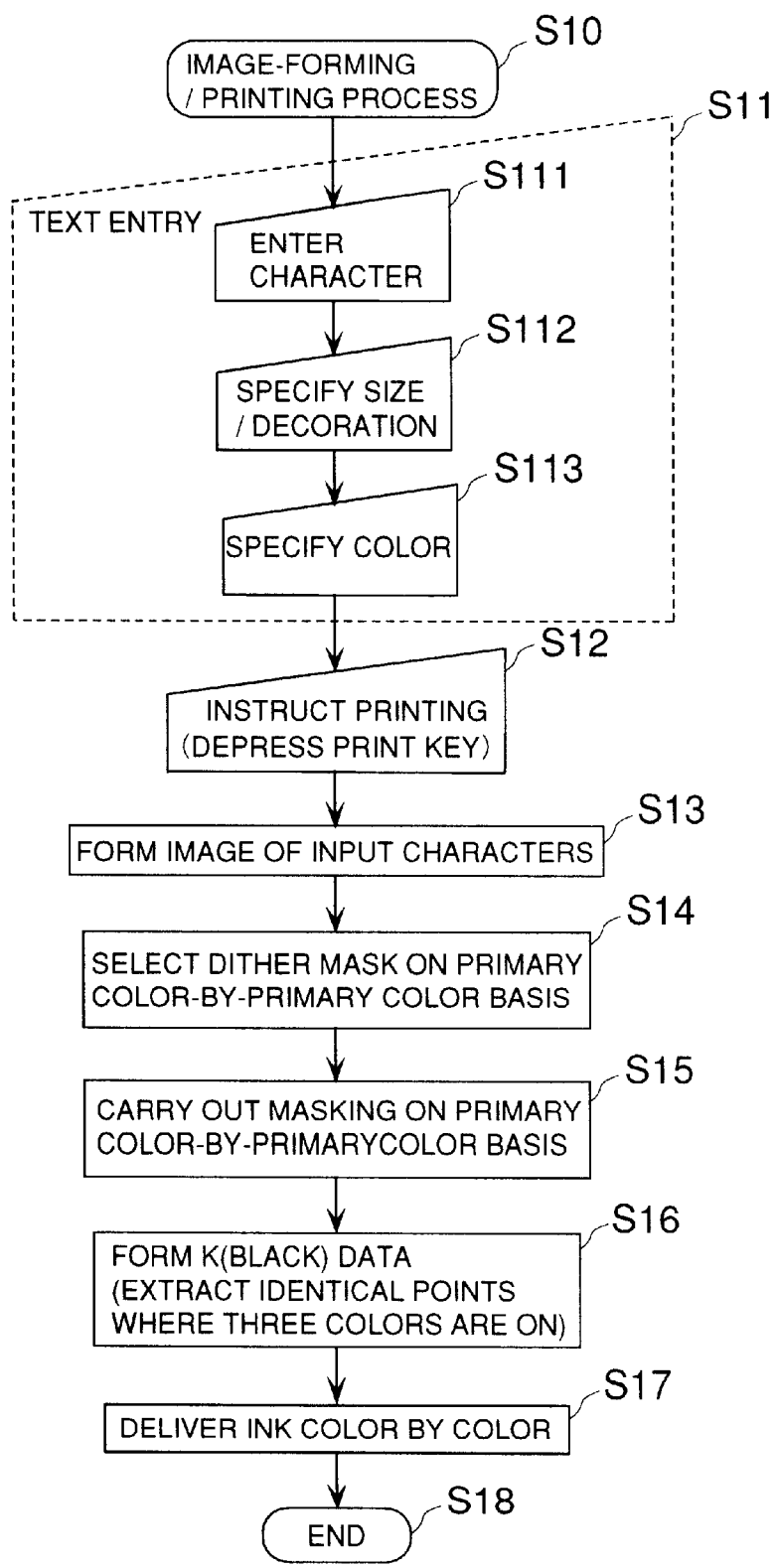
FIG. 16 is a flowchart showing an example of an image-forming/printing process according to a first embodiment of the invention.

FIG. 16 is a flowchart showing a typical image-forming/printing process in the tape printing apparatus 1. As shown in the figure, in this process performed at the step S10, first, character and the like are entered at step 11. More specifically, the user enters characters, such as the character string "123", via the keyboard 3 at step S111, designates the sizes and decoration of the characters at step S112 and then, specifies printing colors at step S113, while confirming or viewing results of the entry and designating operations on the display 4.

In the above process, when the size and decoration of each character is designated (S112), a selection screen is displayed by operating the form key 322, menu options are displayed in reverse video or highlighted by operating cursor keys 330, and the selection key 323 is depressed to finally determine or fix selection of one of the options for designation. Further, when printing colors are specified (S113), the color specification key 324 is operated, whereby the gradation values of C (cyan), M (magenta) and Y (yellow) are designated on the display screen 41 of the display 4, based on color information (hereinafter referred to as "color pallet information") defined in a color conversion table shown in FIG. 20, for instance. Then, colors of the characters and background colors are designated by operating the color-setting key 325 for setting the same. When only the color of a character is specified, in a process (for forming elementary shape images), described hereinbelow, the image of the character is treated as an elementary object image, while the image of the background is treated as an elementary background image. On the other hand, when only the color of the background of the image is specified, the image of the background is treated as an elementary object image, while the image of the character is treated as an elementary background image. If the color of the character and the background color are specified, both the character and the background are subjected to the color dithering and dithered image elements thereof are formed for superimposition. In the following description, however, for purposes of ease of understanding, an example in which only the color of a character is specified is described.

As shown in FIG. 12B, for instance (see FIG. 20 as well), black is specified for the character image (elementary object image) of the character "1" (No. 1 in the FIG. 20 table). That is, the gradation values of C, M, and Y are all designated to "4". Further, for the character image (elementary object image) of the character "2" is designated light a maranth (No. 19 in the same table). That is, as the designated gradation values (hereinafter referred to as a "primary color gradation values") of the three primary colors C, M, Y, a primary color gradation value "0" is designated for C, a primary color gradation value "2" is designated for M, and a primary color gradation value "1" is designated for Y. Similarly, for the character image (elementary object image) of the character "3" is designated light yellow (No. 17 in the table). That is, as the primary color gradation value of C is designated "0", as the primary color gradation value of M is designated "0", and as the primary color gradation value of Y is designated "2". The data (color pallet data) CP1, CP2 and CP3 of the above color pallet information is stored in the color pallet data area 247 of the RAM 240 as gradation values designated for the character images (elementary object images) of the characters "1", "2" and "3".

Referring to FIG. 16, after entry of the character string "123" has been completed (S11) and printing is instructed by operating the print key 321 (S12), each character of the character string "123" is formed based on an outline font stored in the CG-ROM 230 to form the elementary shape images of the character (image element) represented by elementary shape image matrices shown in FIG. 12A at step S13. Of course, in addition to characters formed based on the outline font, it is also possible to employ characters formed based on a dot map font, or registered nonstandard characters or registered images represented by dot maps, for instance. These characters are loaded into the character image-forming buffer (font color buffer) described above.

Referring to FIG. 16, after the elementary shape image of each character (image element) has been formed to complete the step S13 for forming images of input characters, a dither mask for use with each basic color is selected at step S14. For instance, when attention is paid to the character image (elementary shape image) of the character "1", the primary color gradation values of the colors C, M, and Y are all equal to "4", and hence if the dither mask DM5(4) having mask number "4" is available, the program can proceed to a next step S15 for carrying out a masking process. Although in the tape printing apparatus 1, possible designated gradation values (primary color gradation values, in this example) are all created for storage before hand, as described above, if only the character image (elementary shape image) of the character "1" is to be processed, it is only required to store the dither mask DM5(4) alone as a dither mask.

Similarly, when attention is paid to the character image (elementary shape image) of the character "2", the primary color gradation value of a color C is "0", that of a color M is "2", and that of the color Y is "1", so that if the dither masks DM5(0), DM5(2), and DM5(1) having mask numbers "0", "2", and "1" respectively are available, the program can proceed to the next masking process (S15). Similarly, when attention is paid to the character image (elementary shape image) of the character "3", the primary color gradation value of the color C is "0", that of the color M is "0", and that of the color Y is "2", so that if the dither masks DM5(0) and DM5(2) having mask numbers "0" and "2" respectively are available, the program can proceed to the next masking process (S15).

Referring to FIG. 16, after a dither mask for use with each basic color has been selected (S14), a masking process is carried out on basic color-by-basic color basis at step S15.

More specifically, a logical AND operation is performed between each matrix element of each of matrices of respective portions of an elementary shape image, each of the matrices (formed by dividing an elementary shape image matrix) having the same size as that of a dither mask, and a corresponding one of the matrix elements of the dither mask, such that a validity-indicative value is output only when both a matrix element of each of the matrices of the respective portions of the elementary shape image and a corresponding matrix element of the dither mask have a validity-indicative value. As a result of the logical AND operation, there is produced a dithered image element represented by a predetermined binary matrix (dithered image element matrix) having a size identical to that of (the elementary shape image matrix representative of) the elementary shape image.

Figure 14A:
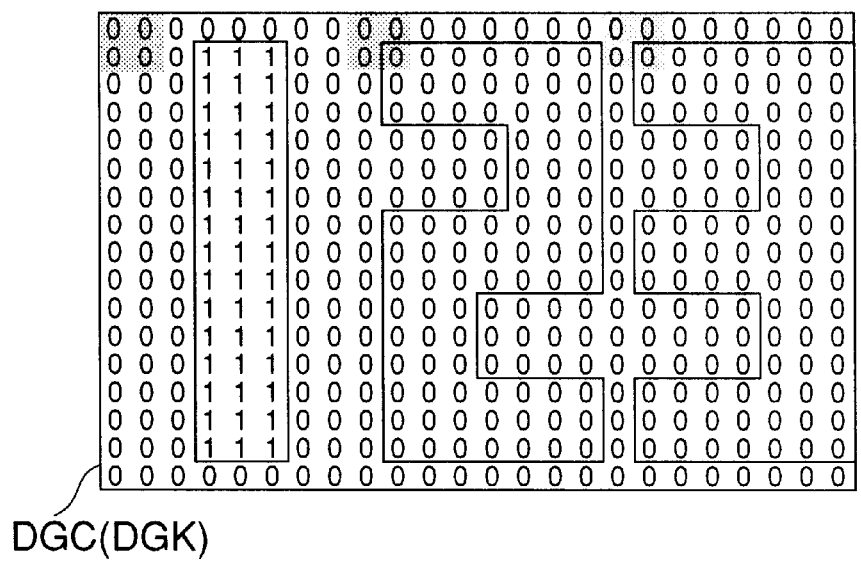
FIG. 14A is a diagram illustrating an example of a whole dithered image matrix for colors C, K of the color image.
Figure 14B:
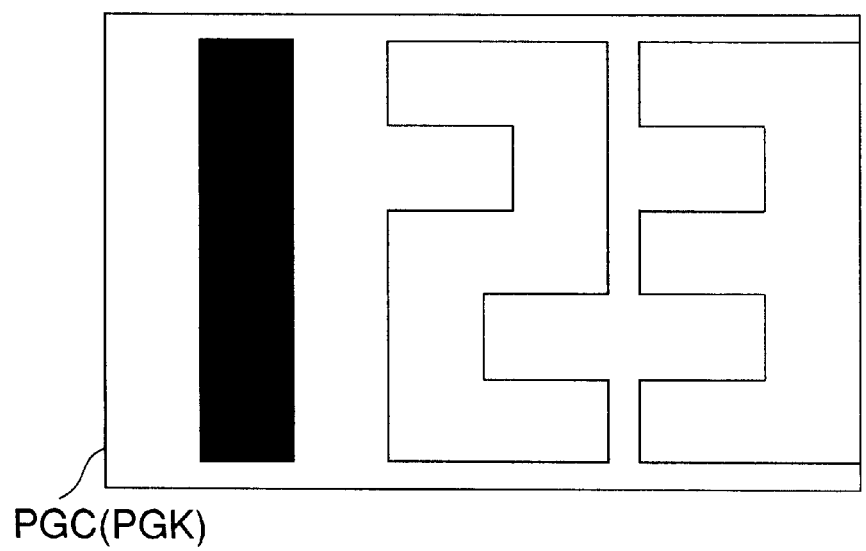
FIG. 14B is a diagram illustrating an example of a print image corresponding to the FIG. 14A whole dithered image matrix.
Figures 15A, 15B:
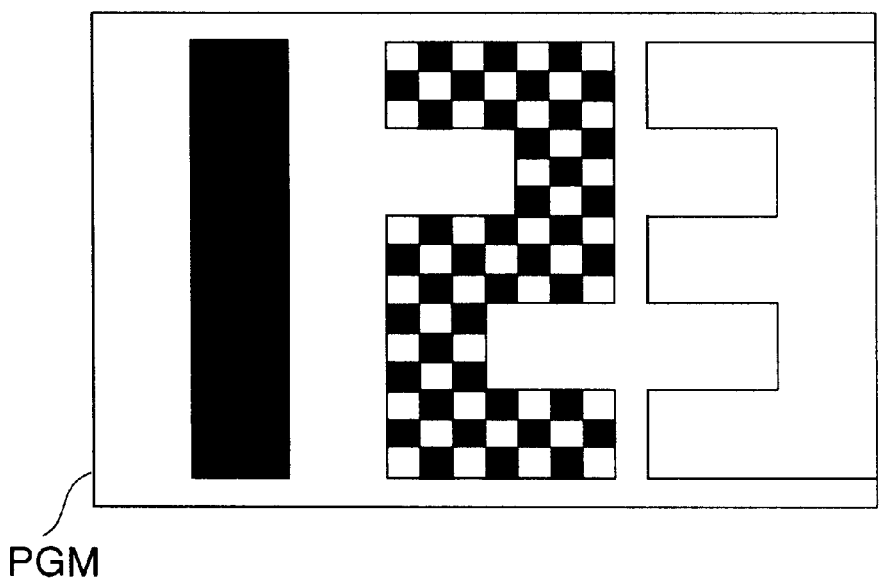
FIG. 15A is a diagram which illustrating an example of a whole dithered image matrix for a color M of the color image.
FIG. 15B is a diagram illustrating an example of a print image corresponding to the FIG. 15A whole dithered image matrix.

For instance, when attention is paid to the character image (elementary shape image) of the character "1", the primary color gradation values of the colors C, M, and Y are all equal to "4", and hence when a logical AND operation is performed between each matrix element of a 2 times 2 matrix of each of portions of the elementary shape image represented by the elementary shape image matrix SG1 and a corresponding one of the matrix elements of the dither mask DM5(4) provided for the case of a primary color gradation value (designated gradation value) "4", a dithered image element matrix representative of a resulting dithered image element is an 8 (horizontal) times 17 (vertical) dithered image element matrix (hereinafter, a dithered image element matrix for a primary color is referred to as a "primary color dithered image element matrix") which represents the character "1" and forms each left side portion of whole dithered image matrices (hereinafter, a whole dithered image matrix for use with a primary color is referred to as a "primary color whole dithered image matrix") shown in FIGS. 13A, 14A and 15A, each representing the whole dithered image of the character string image "123" as a whole image, that is, the left side portion of each of 24 (horizontal) times 17 (vertical) primary color whole dithered image matrices DGY, DGC, DGM, shown in the above figures.

Next, attention is paid to the character image (elementary shape image) of the character "2". When a logical AND operation is performed between each matrix element of a 2 times 2 matrix of each of portions of the elementary shape image represented by the elementary shape image matrix SG2 and a corresponding one of the matrix elements of the dither mask DM5(1) used for the primary color gradation value (designated gradation value) "1" of the color Y, an 8 (horizontal) times 17 (vertical) primary color dithered image element matrix which represents the character "2" and forms a central portion of the 24 (horizontal) times 17 (vertical) primary color whole dithered image matrix DGY in FIG. 13A is obtained. When a logical AND operation is performed between each matrix element of a 2 times 2 matrix of each of portions of the elementary shape image represented by the elementary shape image matrix SG2 and a corresponding one of the matrix elements of the dither mask DM5(2) used for the primary color gradation value (designated gradation value) "2" of the color M, an 8 (horizontal) times 17 (vertical) primary color dithered image element matrix which represents the character "2" and forms a central portion of the 24 (horizontal) times 17 (vertical) primary color whole dithered image matrix DGM in FIG. 15A is obtained.

Similarly, attention is paid to the character image (elementary shape image) of the character "3". When a logical AND operation is performed between each matrix element of a 2 times 2 matrix of each of portions of the elementary shape image represented by the elementary shape image matrix SG3 and a corresponding one of the matrix elements of the dither mask DM5(2) used for the primary color gradation value (designated gradation value) "2" of the color Y, an 8 (horizontal) times 17 (vertical) primary color dithered image element matrix which represents the character "3" and forms a right side portion of the 24 (horizontal) times 17 (vertical) primary color whole dithered image matrix DGY in FIG. 13A is obtained. When a logical AND operation is performed between each matrix element of a 2 times 2 matrix of each of portions of the elementary shape image and a corresponding one of the matrix elements of the dither mask DM5(0) used for the primary color gradation value (designated gradation value) "0" of the colors C and M, 8 (horizontal) times 17 (vertical) primary color dithered image element matrices which each represent the character "3" and form a right side portion of each of the 24 (horizontal) times 17 (vertical) primary color whole dithered image matrices DGC and DGM shown in FIGS. 14A and 15A, respectively, are obtained.

The primary color whole dithered image matrices DGY, DGC and DGM shown in FIGS. 13A, 14A and 15A are produced by arranging primary color dithered image element matrices for respective characters in color-by-color dithered image matrix-arranging buffers provided respectively for the basic colors Y, C and M. Further, as shown in FIG. 16, after the color-by-color masking process (S15) has been completed, a k (black) data-forming process is carried out at step S16. The CMY color printing can be also carried out by omitting this step (S16), and carrying a color-by-color ink delivery process at step S17. As shown in FIGS. 13B to 15B, in the present embodiment, print images (i.e. pseudo-gradation image) printed in colors Y, C and M are indicated by (pseudo-gradation image) PGY, PGC and PGM, respectively. Contour lines of the characters "2" and "3" are added for purposes of ease of understanding, and not printed in actual print images.

In the above case, as to the character "1", (the matrix of) a primary color dithered image element thereof may be formed in the work area by using the dither mask DM5(4) and copied to the three color-by-color dithered image matrix-arranging buffers for the colors Y, C and M for storage therein. Similarly, as to the character "3", (the matrix of) a primary color dithered image element thereof may be created by using the dither mask DM5(2) and (the matrix of) a primary color dithered image element thereof may be created by using the dither mask DM5(0), with latter being copied to the color-by-color dithered image matrix-arranging buffers for the colors C and M.

As described above, in the tape printing apparatus 1, when an image element is a color image, the primary color gradation value of each of the three primary colors is stored as a type of designated gradation value, primary color dither masks corresponding to at least two primary color gradation values different from each other are each stored as a type of dither mask, and primary color dithered image elements corresponding to primary color dither masks are each formed as a kind of dithered image elements. That is, when all the primary color gradation values of the three primary colors are identical to each other, at least one primary color dithered image element is formed, and when two of the primary color gradation values of the three primary colors are identical to each other, at least two primary color dithered image elements are formed. Further, when the three primary color gradation values are all different from each other, at least three primary color dithered image elements are formed. In this case, when all the primary color gradation values are identical to each other, one primary color dithered image element is made duplicate use of for the three primary colors, and when two of the primary color gradation values are identical to each other, two primary color dithered image elements are made duplicate use of for the two primary colors. In short, primary color dithered image elements for the three primary colors can be obtained.

In the above case, a primary color dither mask for each of possible primary color gradation values may be stored in advance as a dither mask. Alternatively, a primary color dither mask may be newly formed for storage by comparing a primary color gradation value with each threshold in a dither matrix, after the primary color gradation value is determined. Further, when dither masks corresponding to possible designated gradation values are stored beforehand, after primary color gradation values are determined, a suitable one may be selected from the dither masks and stored as a primary color dither mask again. In the case of the above example, five dither masks DM5(0) to DM5(4) corresponding to five possible designated gradation values 0 to 4 are stored and used as primary color dither masks corresponding to primary color gradation values as they are. Hence, the above example is an equivalent to the case where primary color dither masks corresponding to respective possible primary color gradation values are stored in advance as dither masks.

As shown in FIG. 16, after the color-by-color masking process (S15) has been completed, the k (black) data-forming process (process of extracting three colors at an identical point) is carried out at the step S16. According to the tape printing apparatus 1, in the K data-forming process (S16), first, a mixed color dithered image element is created a new type of dithered image element. More specifically, in the tape printing apparatus 1, when an image element is a color image, matrix elements having a validity-indicative value common to all primary color dithered image elements formed are extracted and then, by assigning the validity-indicative value only to the matrix elements extracted, a mixed color dithered image element is formed as a new type of dithered image element. In this case, it is possible to obtain not only primary color dithered image elements for the three primary colors but also a mixed color dithered image element for a mixture of the three primary colors. This mixed color dithered image element is produced, for instance, as a result of a logical AND operation which is performed between corresponding matrix elements of the formed primary color dithered image elements, such that the validity-indicative value is output only when all the matrix elements have the validity-indicative values. In short, the mixed color dithered image element can be created simply by carrying out the logical AND operation, which is relatively simple.

In the case of the above example, as clearly shown by color pallet data CP2 and CP3 appearing in FIG. 12B, the primary color gradation values (corresponding to mask numbers, in this example) of the character images of the letters "2" and "3" include "0's", so that a logical AND operation is performed between each matrix element of each of matrices of respective portions of the elementary shape image and a corresponding one of the matrix elements of the FIG. 12D dither mask DM5(0) used for the primary color gradation values, whereby the characters "2" and "3" are determined to have primary color dithered image element matrices in which all the matrix elements thereof have the invalidity-indicative value "0" (portions of the characters "2" and "3" in FIG. 14A, portion of the character "3" in FIG. 15A), and hence there are no matrix elements corresponding between all the primary color dithered image elements and commonly have the validity-indicative value On the other hand, as shown by the FIG. 12B color pallet data CP1 and the primary color dithered image elements in FIGS. 13A to 15A, in the character "1" specifying black, all the matrix elements of portions corresponding to elementary object images of the primary color dithered image element matrices for respective C, M, and Y have the validity-indicative values "1". Accordingly, a mixed color dithered image element formed by extracting matrix elements which correspond between all the primary color dithered image elements and each commonly have the validity-indicative value "1" coincides with an elementary shape image. That is, a mixed color dithered image element is obtained which is represented by a dithered image element matrix (hereinafter, a dithered image element matrix for a mixed color is referred to as a "mixed color dithered image element matrix") having the same values as those of the FIG. 12A elementary shape image matrix SG1.

Similarly to the case of a primary color whole dithered image matrix which is formed by arranging primary color dithered image element matrices, a mixed color whole dithered image is obtained which is represented by a whole dithered image matrix for a mixed color (color K in this example) (hereinafter a whole dithered image matrix for a mixed color is referred to as a "mixed color whole dithered image matrix"), by arranging mixed color dithered image element matrices for characters). In the case of the above example, a mixed color whole dithered image matrix DGK and a print image (pseudo-gradation image) PGK created by printing the matrix DGK as it is become identical to the primary color whole dithered image matrix DGC and the print image PGC for the color C, described above with reference to FIGS. 14A and 14B, respectively.

Although in the case of the above example, black, that is, the color K itself is a designated color, this is not limitative, but as shown in FIG. 20, not only for K (black) (see the column of "K" designated by No. 1) but also for shades of gray (achromatic color) (see the column of "K" at No. 3 to No. 5) and chromatic colors changed in brightness (see the column of "K" at No. 24 to No. 25), matrix elements corresponding between all primary color dithered image elements formed and commonly having the validity-indicative value "1" can be extracted and then, by assigning the validity-indicative value "1" only to the matrix elements extracted, a mixed color dithered image element can be obtained. Further, if the same process is applied to a whole image, a mixed color whole dithered image can be obtained.

In the above example, since K is designated, a mixed color dithered image element matrix for the character "1" comes to be the same as a dithered image element matrix provided for the mask number "4", that is, comes to have the same values as those of the elementary shape image matrix SG1 (see the column of "K" at No. 1). However, if gray (see the column of "K" at No. 4: mask number "2") is designated, for instance, matrix elements corresponding between all primary color dithered image elements and commonly having the validity-indicative value "1" coincide with matrix elements having the validity-indicative value 1" of a dithered image element matrix obtained by carrying out a logical AND operation between each matrix element of a 2 times 2 matrix of each of portions of the elementary shape image represented by the elementary shape image matrix SG1 and a corresponding one of the matrix elements of the dither mask DM5(2) used for mask number "2". That is, the mixed color dithered image element in the above case is identical to a dithered image element formed based on the elementary shape image by using the dither mask 5(2) of the mask number "2".

In the FIG. 16 K data-forming process (S16), after the above mixed color dithered image element has been produced, the following mixed color valid matrix element-deleting process is carried out. Further, after the K (black) data-forming process (S16), (the matrix of) each whole dithered image arranged in each color-by-color dithered image matrix-arranging buffer is transferred to a print buffer, and ink droplets are ejected color by color, whereby a print image formed as a pseudo-gradation image is printed at step S17, followed by terminating the image-forming/printing process (S10). Although in the above description, for purposes of ease of understanding, each whole dithered image is first arranged in each color-by-color dithered image matrix-arranging buffer for forming the same, and then transferred to the print buffer, this is not limitative, but the whole dithered image may be directly arranged in a color-by-color arranging area in the print buffer.

As described hereinabove, in the tape printing apparatus 1, the mixed color valid matrix element-deleting process is carried out in the K (black) data-forming process (S16). More specifically, the mixed color valid matrix element-deleting process is carried out, in which out of matrix elements of each of the primary color dithered image elements formed, having the validity-indicative value "1", each matrix element corresponding to each matrix element of the mixed color dither mask, having the validity-indicative value "1", has its validity-indicative value converted to the invalidity-indicative value "0". By carrying out this deleting process, out of matrix elements of each of the primary color dithered image elements for the three primary colors, having the validity-indicative value "1", each matrix element corresponding in matrix element location to each matrix element of the mixed color dithered image element, having the validity-indicative value "1", has its validity-indicative value canceled.

When primary color dithered image elements for the three primary colors and a mixed color dithered image element for a mixed color of the primary colors are combined with each other (superimposed one upon the other), a matrix element of the mixed color dithered image element having the validity-indicative value and matrix elements of the three primary colors each corresponding to the matrix element of the mixed color dithered image element having the validity-indicative value comes to have the validity-indicative value redundantly. As a result, mixture of colors through the primary color dithered image elements for the three primary colors and mixture of colors through the mixed color dithered image element are made redundant. In the tape printing apparatus 1, however, this color redundancy can be avoided by the above cancellation of redundant validity. Further, when the above-mentioned four colors of C, M, Y, and K are used, for instance, more attractive black can be obtained in general by printing K (black) by itself than by printing K (black) through actually mixing C (cyan), M (magenta) and Y (yellow), so that as described above, a beautiful image printed by using the four colors can be obtained, if the value indicating validity of the corresponding matrix elements of primary color dithered image elements for the three primary colors is canceled.

In the mixed color valid matrix element-deleting process, for instance, a logical NOT operation for inverting the validity-indicative value and the invalidity-indicative value is carried out on the mixed color dithered image element, to thereby form a inverted dithered mixed color image element. Then, a logical AND operation is performed between each matrix element of each primary color dithered image element and a corresponding one (corresponding in matrix element location) of the matrix elements of the inverted dithered mixed color image element, such that the validity-indicative value is output only when both the matrix elements have the validity-indicative value. Dithered image elements resulting from the logical AND operation become new primary color dithered image elements. In other words, in this process, by carrying out a relatively simple logical NOT operation and logical AND operation, out of matrix elements having the validity-indicative value of each of the primary color dithered image elements for the three primary colors, a matrix element having the validity-indicative value, which corresponds in location to a matrix element of the mixed color dithered image element having the validity-indicative value, has its validity-indicative value canceled.

Now, the above cancellation process will be described based on the examples described above with reference to FIGS. 12A, 13A, 14A and 15A showing the primary color whole dithered images having primary color dithered image elements arranged therein and the mixed color whole dithered image having the mixed color dithered image elements arranged therein. First, all the corresponding matrix elements, which commonly have the validity-indicative value "1", of the FIG. 13A primary color whole dithered image matrix DGY for the color Y, the FIG. 14A primary color whole dithered image matrix DGC for the color C, and the FIG. 15A primary color whole dithered image matrix DGM for the color M, are extracted, whereby the mixed color whole dithered image matrix DGK for the color K (mixed color) is obtained, which in the illustrated example has the same values as those of the FIG. 14A primary color whole dithered image DGC for the color C.

If matrix elements of the primary color whole dithered image matrices DGY, DGC and DGM in FIGS. 13A, 14A and 15A, corresponding in matrix element location and having the validity-indicative value "1" redundantly with a corresponding matrix element of the mixed color dithered image element having the validity-indicative value "1, is newly assigned the invalidity-indicative value "0", that is, if the redundant validity-indicative value "1" of such matrix elements of the primary color whole dithered image matrices is canceled, the validity-indicative values "1's" of the primary color dithered image element matrices of the character "1" in each of the primary color whole dithered image matrices DGY, DGC and DGM are all converted to the invalidity-indicative values "0's". As a result of the conversion, the primary color whole dithered image matrices DGY, DGC and DGM are changed to primary color whole dithered image matrices DGY2, DGC2 and DGM2 shown in FIGS. 17A, 18A and 19A, respectively.

Figure 17A:
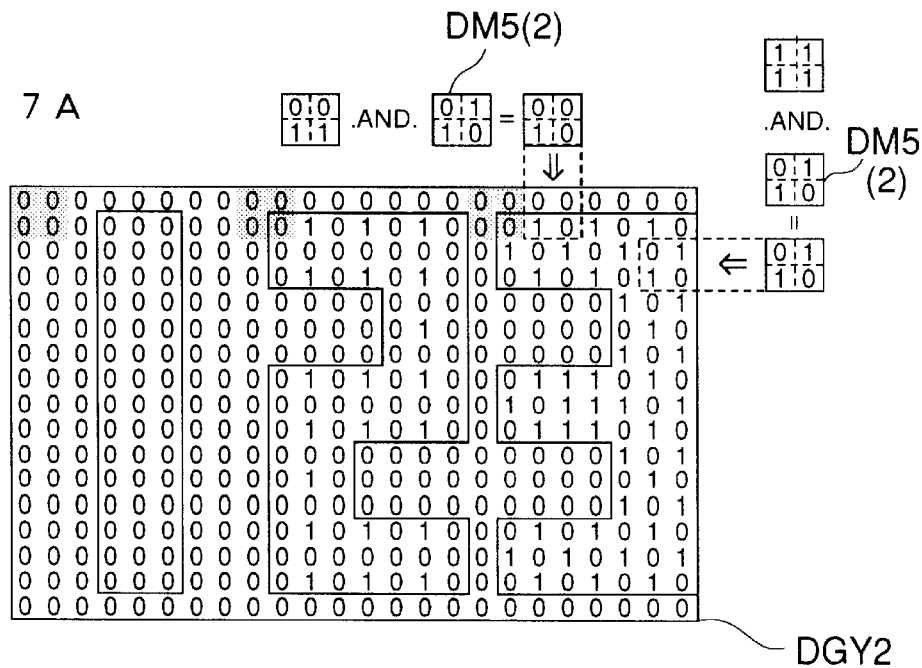
FIG. 17A is a diagram illustrating a whole dithered image matrix in which gradation values for the color K in the FIG. 14A matrix are canceled from the FIG. 13A matrix for the color Y.
Figure 17B:
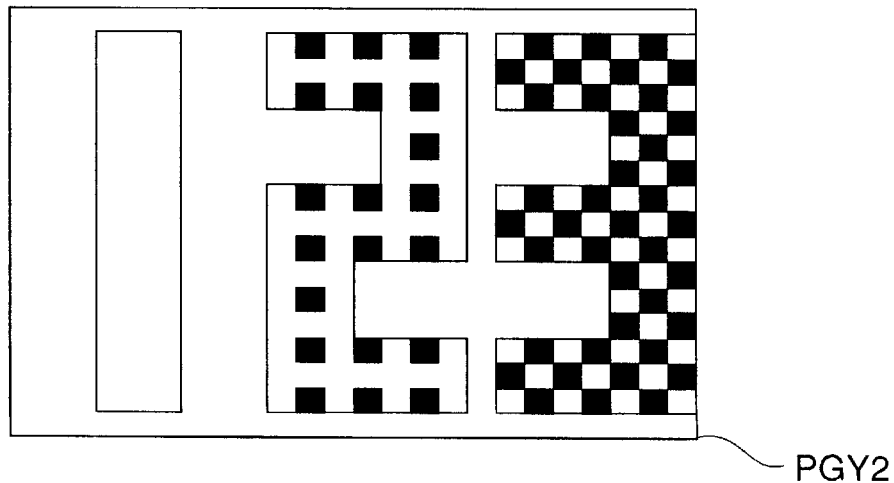
FIG. 17B is a diagram illustrating an example of a print image corresponding to the FIG. 17A whole dithered image matrix.
Figure 18A:
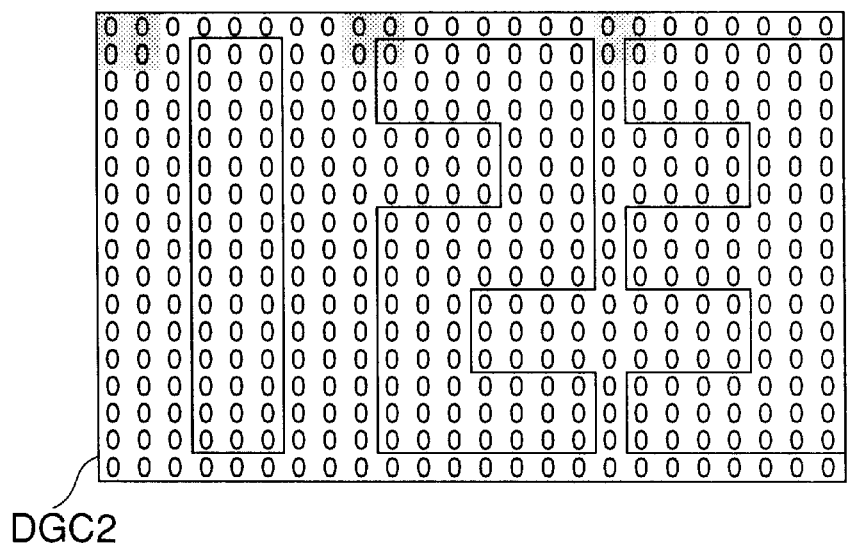
FIG. 18A is a diagram illustrating a whole dithered image matrix in which gradation values for the color K in the FIG. 14A matrix are canceled from the FIG. 14A matrix for the color C.
Figure 18B:
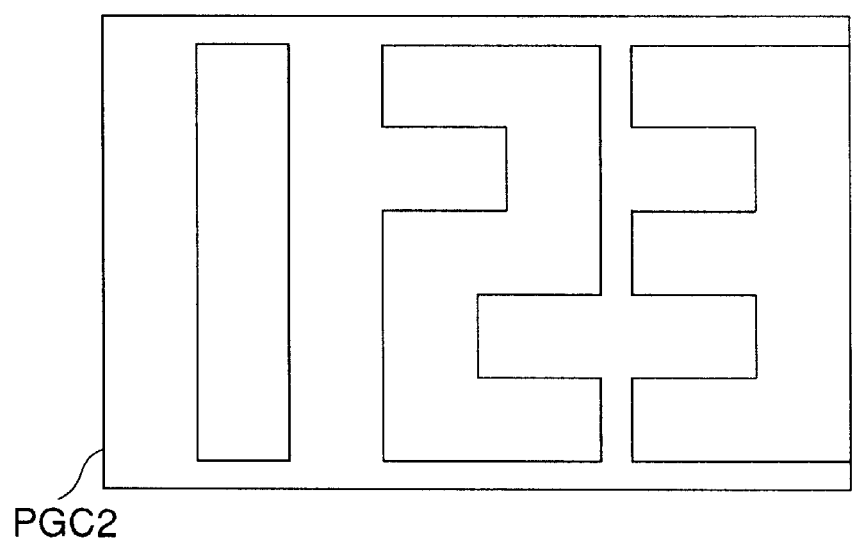
FIG. 18B is a diagram illustrating a print image corresponding to the FIG. 18A whole dithered image matrix.
Figures 19A, 19B:
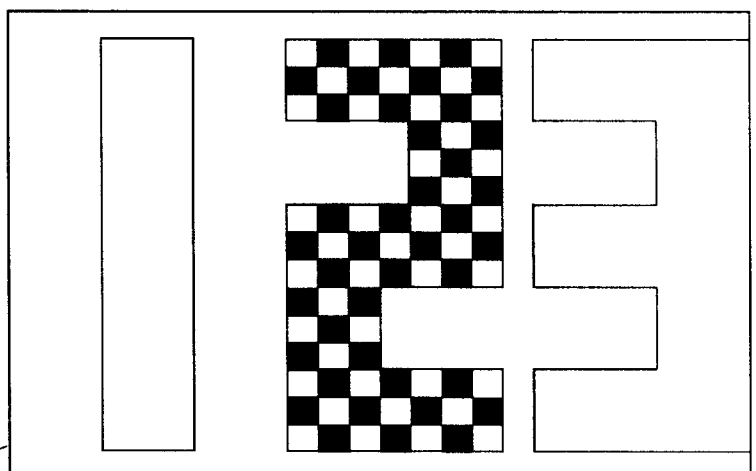
FIG. 19A is a diagram illustrating a whole dithered image matrix in which gradation values for the color K in the FIG. 14A matrix are canceled from the FIG. 15A matrix for the color M.
FIG. 19B is a diagram illustrating a print image corresponding to the FIG. 19A whole dithered image matrix.

As a result, when the color-by-color ink delivery process (17) described above with reference to FIG. 16 is carried out, that is, when printing is effected, printing of the color K is performed based on the mixed color whole dithered image matrix DGK for the color K (mixed color) appearing in FIG. 14A, printing of the color Y based on the primary color whole dithered image matrix DGY2 shown in FIG. 17A, printing of the color C based on the primary color whole dithered image matrix DGC2 shown in FIG. 18A, and printing of the color M based on the primary color whole dithered image matrix DGM2 shown in FIG. 19A. This makes it possible to print the whole color image, which is subjected to the color dithering, by employing the four colors C, M, Y, and K as basic colors therefor.

In the above example, that is, in the example of the FIG. 16 process (S10), primary color dithered image elements and primary color whole dithered image elements each having corresponding ones of the primary color dithered image elements arranged therein rare produced in the color-by-color masking process (S15) and then, mixed color dithered image elements and a mixed color whole dithered image element having the mixed color dithered image elements arranged therein are formed in the K data-forming process (S16). Thereafter, each primary color dithered image element or each primary color whole dithered image element are modified according to results of the K data-forming process (S16). However, not only dither masks (hereinafter referred to as "primary color dither masks") for the respective three primary colors but also dither masks (hereinafter referred to as "mixed color dither masks") for the color K can be prepared or made available before the color-by-color masking process (S15) is carried out, and the color-by-color masking process (S15) may be carried out on each of the four colors C, M, Y, and K as the basic colors, whereby it is also possible to omit the K data-forming process (S16). In the following, such a case will be described as a second embodiment.

According to the tape printing apparatus of a second embodiment, when an image element is a color image, provisional primary color dither masks corresponding to at least primary color gradation values of the image element different from each other are each stored as a type of a dither mask, and a mixed color dither mask is stored, which is obtained by assigning the validity-indicative value only to each matrix element corresponding in matrix element location to matrix elements of all the provisional primary color dither masks, which commonly have the validity-indicative value. Further, out of matrix elements of each provisional primary color dither mask, which have the validity-indicative value, each matrix element corresponding in matrix element location to a matrix element of the mixed color dither mask, which has the validity-indicative value, has its validity-indicative value converted to the invalidity-indicative value, and each provisional primary color dither mask thus processed is stored as a primary color dither mask. Thereafter, logical AND operations are performed by using the mixed color dither mask and each primary color dither mask, respectively, whereby a mixed color dithered image element and each primary color dithered image element corresponding respectively to the mixed color dither mask and each of the primary color dither masks are created as kinds of dithered image elements.

As described hereinabove with reference to FIG. 16, after the elementary shape image of each character (image element) has been formed to complete the step S13 for forming images of input characters, dither masks for the basic colors are selected at step S14. In the example described above with reference to FIG. 12A, for instance, when attention is paid to the character image (elementary shape image) of the character "1", the primary color gradation values of the colors C, M, and Y are all equal to "4".

Hence, although the provisional primary color dither masks have to correspond to at least primary color gradation values different from each other, it is only required that the dither mask DM5(4) having mask number "4" can be made use of, so that the dither mask DM5(4) is stored in the dither mask area 246 as a provisional primary color dither mask corresponding to the primary color gradation value "4" common to the colors C, M, and Y of the character image (elementary shape image) of the character "1".

Similarly, when attention is paid to the character image (elementary shape image) of the character "2", the primary color gradation value of the color C is "0", that of the color M is "2", and that of the color Y is "1", so that the dither masks DM5(0), DM5(2), and DM5(1) having mask numbers "0", "2", and "1" respectively are stored in the dither mask area 246 as provisional primary color dither masks corresponding to the primary color gradation value "0" of the color C, the primary color gradation value "2" of the color M, and the primary color gradation value "1" of the color Y of the character image (elementary shape image) of the character "2", respectively. Similarly, when attention is paid to the character image (elementary shape image) of the character "3", the primary color gradation value of the color C is "0", that of the color M is "0", and that of the color Y is "2". Accordingly, the dither masks DM5(0) having mask number "0" is stored in the dither mask area 246 as a provisional primary color dither mask corresponding to the primary color gradation value "0" of the colors C, M of the character image (elementary shape image) of the character "3", and the dither masks DM5(2) having mask number "2" is stored as a provisional primary color dither mask corresponding to the primary color gradation value "2" of the color Y of the same.

Next, the mixed color dither mask is stored, which is obtained by assigning the validity-indicative value only to each matrix element corresponding in matrix element location to matrix elements of all the provisional primary color dither masks, which commonly have the validity-indicative value. In this case, for instance, a logical AND operation is performed between corresponding matrix elements of the provisional primary color dither masks such that the validity-indicative value is output only when all the corresponding matrix elements have the validity-indicative value. This makes it possible to directly obtain each matrix element corresponding in matrix element locations to matrix elements of all the provisional primary color dither masks, which commonly have the validity-indicative value common, to thereby form a mixed color dither mask. In this case, the mixed color dither mask can be obtained irrespective of whether the provisional primary color dither masks are formed based on dither matrices different from each other or ones identical to each other. On the other hand, as described above by way of example with reference to FIG. 12C, when the provisional primary color dither masks are formed based on dither matrices identical to each other (dither matrix DD5, in this example), it is possible to obtain a mixed color dither mask without performing the above logical AND operation. In the following, a method of obtaining a mixed color dither mask by the latter method will be described.

That is, a provisional primary color dither mask, which has the smallest number of matrix elements having the validity-indicative value "1", is stored as a mixed color dither mask. Now, when all the provisional primary color dither masks are formed based on an identical dither matrix, each matrix element having the validity-indicative value in a provisional primary color dither mask having the smallest number of matrix elements having the validity-indicative value, corresponds to matrix elements of the other provisional primary color dither masks, also having the validity-indicative value. In this case, irrespective of how many types (1 to 3 types) of provisional primary color dither masks are provided in a manner corresponding to the three primary colors, each matrix element having the validity-indicative value in the provisional primary color dither mask having the smallest number of matrix elements having the validity-indicative value, becomes a matrix element common to all the provisional primary color dither mask and having the validity-indicative value. Therefore, the provisional primary color dither mask which has the smallest number of matrix elements having the validity-indicative value can be used as a mixed color dither mask for the mixed color of the three primary colors.

Further, in the above case, if a primary color gradation value satisfying conditions of the smallest number of thresholds in the dither matrix is selected from the gradation values of the three primary colors, the mixed color dither mask can be obtained similarly to the case of the provisional primary color dither mask corresponding to a selected primary color gradation value. More specifically, by selecting a primary color gradation value, a provisional primary color dither mask can be selected which has the smallest number of matrix elements having the validity-indicative value, thereby obtaining a mixed color dither mask with ease.

Further, as shown in the examples appearing in FIGS. 12A to 12D or the like, in a case where if a primary color gradation value is equal to or larger than a threshold (primary color gradation value≧threshold), a condition designated by the threshold is satisfied, and a matrix element of the dither mask corresponding to the threshold has the validity-indicative value, a provisional primary color dither mask which has the smallest number of matrix elements having the validity-indicative value can be selected simply by selecting the smallest primary color gradation value, thereby permitting a mixed color dither mask to be easily obtained. Of course, for instance, even in a case where if a primary color gradation value is larger than a threshold (primary color gradation value≧threshold), a condition designated by the threshold is satisfied, it is only required to select the largest primary color gradation value. Inversely, for instance, in a case where if a primary color gradation value is equal to or smaller than a threshold (primary color gradation value≦threshold), or if a primary color gradation value is smaller than a threshold (primary color gradation value<threshold), a condition designated by the threshold is satisfied, a mixed color dither mask can be similarly easily obtained by selecting the smallest primary color gradation value.

More specifically, in the case of the examples illustrated in FIGS. 12A to 12D or the like, only the dither mask DM5(4) having mask number "4" is stored as a provisional primary color dither mask for the character image (elementary shape image) of the character "1", so that the dither mask DM5(4) is stored as a mixed color dither mask for the character image (elementary shape image) of the character "1". Further, provisional primary color dither masks for the character image (elementary shape image) of the character "2" are the dither masks DM5(0), DM5(2), and DM5(1) having mask numbers "0", "2", and "1" respectively, so that the provisional primary color dither mask, which has the smallest number of matrix elements having the validity-indicative value "1", that is, the dither masks DM5(0) having mask number "0" is stored as a mixed color dither mask for the character image (elementary shape image) of the character "2". Similarly, provisional primary color dither masks for the character image (elementary shape image) of the character "3" are the dither masks DM5(0) and DM5(2) having mask numbers "0" and "2" respectively, so that the dither masks DM5(0) having mask number "0", which has the smallest number of matrix elements having the validity-indicative value "1" is stored as a mixed color dither mask for the character image (elementary shape image) of the character "3".

Next, out of the matrix elements of each provisional primary color dither mask, having the validity-indicative value "1", each matrix element corresponding to each matrix element of the mixed color dither mask, having the validity-indicative value "1", has its validity-indicative value converted to the invalidity-indicative value "0" and each provisional primary color dither mask thus processed is stored as a primary color dither mask. In the case of the above example, only the dither mask DM5(4) having mask number "4" is stored as a provisional primary color dither mask for the character image (elementary shape image) of the character "1", and the mixed color dither mask for the same is the dither mask DM5(4). Hence, if, out of the matrix elements of each provisional primary color dither mask, having the validity-indicative value "1", each matrix element corresponding to each matrix element of the mixed color dither mask, having the validity-indicative value "1", has its validity-indicative value converted to the invalidity-indicative value "0", all the matrix elements of the provisional primary color dither mask, having the validity-indicative value "1", have their validity-indicative value "1" converted to the invalidity-indicative values "0". In other words, each primary color dither mask for a corresponding one of the colors C, M, and Y in the character image (elementary shape image) of the character "1" becomes the same as the dither mask DM5(0) comprised of matrix elements having the invalidity-indicative value "0".

On the other hand, the dither masks DM5(0), DM5(2), and DM5(1) having mask numbers "0", "2", and "1", respectively, are stored as provisional primary color dither masks for the character image (elementary shape image) of the character "2". In this case, the mixed color dither mask is the dither mask DM5(0) having mask number "0", and there is not a matrix element having the validity-indicative value "1", so that even when out of the matrix elements, having the validity-indicative value "1", of each provisional primary color dither mask, each matrix element corresponding in matrix element location to a matrix element, having the validity-indicative value "1", of the mixed color dither mask is to have its validity-indicative value converted to the invalidity-indicative value "0", there is no matrix element to be converted, and hence each provisional primary color dither mask is used as a primary color dither mask as it is. Similarly, as to the character image (elementary shape image) of the character "3" as well, the mixed color dither mask is the dither mask DM5(0) having mask number "0", and there is no matrix element having the validity-indicative value "1". Hence, each provisional primary color dither mask is used as a primary color dither mask as it is.

As described above, as to the character image (elementary shape image) of the character "1", the mixed color dither mask becomes the same as the dither mask DM5(4), while each primary color dither mask for the colors C, M, and Y becomes the same as the dither mask DM5(0). Further, as to the character image (elementary shape image) of the character "2", the mixed color dither mask becomes the same as the dither mask DM5(0), while primary color dither masks for the colors C, M, and Y are made identical to provisional primary color dither masks, that is, the dither masks DM5(0), DM5(2), and DM5(1), respectively. As to the character image (elementary shape image) of the character "3", the mixed color dither mask becomes the same as the dither mask DM5(0), while primary color dither masks for the colors C, M, and Y are made identical to the dither mask DM5(0), DM5(0), and DM5(2) of the provisional primary color dither mask, respectively.

Next, logical AND operations are performed by using the mixed color dither mask and each primary color dither mask, respectively, whereby a mixed color dithered image element corresponding to the mixed color dither mask and each primary color dithered image element corresponding to each of the primary color dither masks are created as kinds of dithered image elements. That is, the color-by-color masking process (S15) is effected on each of the four colors C, M, Y, and K as the basic colors, whereby it is possible to omit the K data-forming process (S16).

For instance, attention is paid to the character image (elementary shape image) of the character "1". When a logical AND operation is performed between each matrix element of a 2 times 2 matrix of each of portions of the elementary shape image represented by the FIG. 12 elementary shape image matrix SG1 and a corresponding one of the matrix elements of the dither mask DM5(4) as a mixed color dither mask for the color K, a dithered image element matrix representative of a resulting dithered image element is an 8 (horizontal) times 17 (vertical) primary color dithered image element matrix (representing the character "1") at the left side portion of the 24 (horizontal) times 17 (vertical) primary color whole dithered image matrix DGK in FIG. 14A. When a logical AND operation is performed between each matrix element of a 2 times 2 matrix of each of portions of the elementary shape image and a corresponding one of the matrix elements of the dither mask DM5(0) as a primary color dither mask for the colors Y, C, and M, there are produced 8 (horizontal) times 17 (vertical) primary color dithered image element matrices of matrix elements having invalidity-indicative values "0" and representing the character "1" at left side portions of the respective 24 (horizontal) times 17 (vertical) primary color whole dithered image matrices DGY2, DGC2 and DGM2 appearing in FIGS. 17A, 18A and 19A. In the case of the character images (elementary shape images) of the characters "2" and "3", the mixed color dither mask for the color K (mixed color) is the dither mask DM5(0). Primary color dither masks for the colors C, M, and Y are the same as the dither masks described above with reference to FIGS. 13A, 14A, and 15A. Since they are the same dither masks as shown in FIGS. 17A, 18A and 19A, description thereof is omitted.

That is, in this case, the color-by-color masking process (S15) is carried out on each of the four colors C, M, Y, and K as the basic colors, whereby the FIG. 14A mixed color whole dithered image matrix DGK, a FIG. 17A primary color whole dithered image matrix DGY2 for the color Y, a FIG. 18A primary color whole dithered image matrix DGC2 for the color C, and a FIG. 19A primary color whole dithered image matrix DGC2 for the color M can be obtained, thereby enabling the K data-forming process (S16) to be omitted.

As described hereinabove, according to the tape printing apparatus 1 of the second embodiment, similarly to the tape printing apparatus 1 of the above-mentioned embodiment (first embodiment), when the image element is a color image, if all the primary color gradation values of the three primary colors are identical to each other, at least one primary color dithered image element is formed, and when two of the primary color gradation values are identical to each other, at least two primary color dithered image elements are formed. Further, when the three primary color gradation values are all different from each other, at least three primary color dithered image elements are formed.

For instance, as to the above character image (elementary shape image) of the character "1", at least one primary color dithered image element is formed by using the dither mask DM5(0) as a primary color dither mask. Further, as to the above character image (elementary shape image) of the character "2", at least three primary color dithered image elements are formed by using the dither masks DM5(0), DM5(2), and DM5(1) as primary color dither masks. Furthermore, in the case of the above character image (elementary shape image) of the character "3", at least two primary color dithered image elements are formed by using the dither masks DM5(0) and DM5(2) as primary color dither masks.

In short, primary color dithered image elements for the three primary colors, including duplicate use of one of them as one for a different color, can be obtained by the method according to the present embodiment, so that the method can be applied to dithering of the gradation values of three primary colors in a color image element. Further, in this case as well, provisional primary color dither masks for respective possible primary color gradation values may be stored in advance as dither masks. Alternatively, a provisional primary color dither mask may be newly formed for storage by comparing a primary color gradation value with each threshold in a dither matrix, after the primary color gradation value is determined. Further, when dither masks corresponding to possible designated gradation values are stored beforehand, after primary color gradation values are determined, a suitable one may be selected from the dither masks and stored as a primary color dither mask again. In the above case, five dither masks DM5(0) to DM5(4) corresponding to five possible designated gradation values 0 to 4 are stored, and hence the above example is an equivalent to the case where any of the dither masks is selected and stored again as a primary color dither mask.

In the tape printing apparatus 1 of the second embodiment, a mixed color dither mask, which is obtained by assigning the validity-indicative value only to each matrix element corresponding in matrix element location to matrix elements of all the provisional primary color dither masks which commonly have the validity-indicative value, is employed to carry out a logical AND operation, whereby a mixed color dithered image element corresponding to the mixed color dither mask is formed. Therefore, it is possible to obtain a mixed color dithered image element for use a mixed color of the three primary colors, in addition to the above primary color dithered image elements of the three primary colors. In short, dithering of a mixed color can be effected.

In the above case, each primary color dither mask is a modification of the corresponding provisional primary color dither mask in which out of matrix elements having the validity-indicative value, each matrix element corresponding to each matrix element of the mixed color dither mask, having the validity-indicative value, has its validity-indicative value converted to the invalidity-indicative value, that is, the validity-indicative value of each matrix element corresponding in matrix element location to each matrix element of the mixed color dithered image element, having the validity-indicative value, is canceled. Therefore, similarly to the case of the tape printing apparatus 1 of the first embodiment, in each primary color dithered image element formed by using a corresponding primary color dither mask, the redundant validity-indicative value of each matrix element corresponding to each matrix element of the mixed color dithered image element, having the validity-indicative value, is canceled, whereby image processing can be carried out to obtain a beautiful image, also when the four colors C, M, Y, and K, for instance, are used as the basic colors.

In the examples shown in FIGS. 12A to 12D, the dither mask for the color K (mixed color) is the dither mask DM5(0) (i.e. dither mask comprised of only invalidity-indicative values "0") (for the characters "2" and "3") or although the dither mask for the color K is any dither mask other than the dither mask DM5(0), each primary color dither mask is the dither mask DM5(0) instead. In these cases, although out of the matrix elements of each provisional primary color dither mask, having the validity-indicative value, each matrix element corresponding in matrix element location to each matrix element of the mixed color dither mask, having the validity-indicative value, can have its validity-indicative value converted to the invalidity-indicative value, to thereby cancel the validity-indicative value, each provisional primary color dither mask may be directly used as a primary color dither mask as it is, if the mixed color dither mask is the dither mask DM5(0), and if it is not, the dither mask DM5(0) may be used as each primary color dither mask.

For instance, FIG. 20 shows an example of a color conversion table made by using the same dither matrix DD5 and dither masks DM5(0) to DM5(4) with mask numbers 0 to 4, as viewed in FIGS. 12C and 12D, respectively. As shown in FIG. 20, each color for specification or designation is indicated by its color name in a corresponding field of the column of "NAME OF COLOR", with primary color gradation values for the respective primary colors C, Y and M of the color for specification, that is, mask numbers of respective provisional primary color dither masks are indicated by corresponding numerical values in the respective columns C, M and Y. Further, in this figure, each numerical value in column K indicates the gradation value of a corresponding color K (mixed color), that is, the mask number of the mixed color dither mask, while numerical values in respective columns C2, M2 and Y2 show mask numbers of primary color dither masks for the colors C, Y and M, respectively.

As clearly shown in FIG. 20, when any of colors from color No. 1 to color No. 23 is designated, the above method of determining primary color dither masks may be applied. That is, if a mixed color dither mask for a color is the dither mask DM5(0), each provisional primary color dither mask therefor may be used as a corresponding primary color dither mask as it is, whereas if it is not, the dither mask DM5(0) may be used as primary color dither masks for the primary colors. The primary color dither masks thus selected produces the same results as described above in which out of matrix elements of each primary color dither mask, having the validity-indicative value, each matrix element corresponding in matrix element location to each matrix element of the mixed color dither mask, having the validity-indicative value, has its validity-indicative value converted to the invalidity-indicative value, to thereby cancel the redundant validity-indicative value of each matrix element corresponding in location to the matrix element of the mixed color dithered image element, having the validity-indicative value.

However, a primary color dither mask different from not only the dither mask DM5(0) (i.e. dither mask composed of only matrix elements having the invalidity-indicative values "0") but also the provisional primary color dither masks can be required, as in a case where a color specified or designated is a chromatic color changed in brightness, or the like, such as "dark red" and "dark orange", indicated by color No. 24 and color No. 25, respectively.

To meet this requirement, in the tape printing apparatus 1, each primary color dither mask is created in the following manner: First, a logical NOT operation for inverting the validity-indicative value and the invalidity-indicative value is carried out on the mixed color dither mask, to thereby form an inverted mixed color dither mask. Then, a logical AND operation is performed between each matrix element of each provisional primary color dither mask and a corresponding one of the matrix elements of the inverted mixed color dither mask, such that the validity-indicative value is output only when both matrix elements have the validity-indicative value. As a result of the logical AND operation, each primary color dither mask is produced.

For instance, assuming that the color K (black) is designated as described above (see color No. 1 in FIG. 20), if a logical NOT operation for inverting the validity-indicative value "1" and the invalidity-indicative value "0" to "0" and "1", respectively, is carried out on the dither mask GM5(4) as a mixed color dither mask (see column K), the same dither mask as the dither mask DM5(0) is formed. That is, the inverted mixed color dither mask identical to the dither mask DM5(0) is produced, so that primary color dither masks (column C2, M2, and Y2) resulting from the logical AND operation with the inverted mixed color dither mask become identical to the dither mask DM5(0), regardless of the settings of the provisional primary color dither masks (see columns C, M and Y).

Further, in a case where dark gray is designated (see color No. 3 in FIG. 20), a logical NOT operation (hereinafter represented by "NOT.") for inverting the validity-indicative value "1" and the invalidity-indicative value "0" is carried out on the dither mask GM5(3) as a mixed color dither mask (see column K). Then, since the dither mask DM5(3) is a matrix in which only an element at a lower right portion thereof has the invalidity-indicative value "0" and the other element shave the validity-indicative values "1" (see FIG. 12D), the resulting inverted mixed color dither mask becomes a matrix in which only the matrix element at the lower right portion thereof has the validity-indicative value "1", and the other matrix elements have the invalidity-indicative value "0" (for instance, a dither mask formed by inverting the dither mask DM5(3) is referred to as a "dither mask DM5N(3)", hereinafter). That is, DM5N(3)=NOT. DM5(3) holds. The same applies to other mask numbers). In this case, each provisional primary color dither mask for dark gray (see columns C, M and Y) is identical to the dither mask DM5(3), and hence when a logical AND operation (hereinafter represented by ". AND.") is carried out between the dither mask DM5N(3) and the dither mask DM5(3), each primary color dither mask (see columns C2, M2 and Y2) becomes the same as the dither mask DM5(0) (that is, DM5N(3). AND. DM5(3)=DM5(0)).

Similarly, if white (see color No. 2 in FIG. 20), gray (see color No. 4 in the same figure), or light gray (see color No. 5 in the same figure) is designated, a logical NOT operation (DM5N(0)=NOT. DM5(0)=DM5(4), DM5N(2)=NOT. DM5 (2), or DM5N(1)=NOT. DM5(1)) is carried out on a corresponding mixed color dither mask (see column K) to obtain an inverted mixed color dither mask, and logical AND operations (DM5N(0). AND. DM5(0)=DM5(0), DM5N(2). AND. DM5(2)=DM5(0), and DM5N(1). AND. DM5(1)= DM5(0)) are carried out between provisional primary color dither masks (see columns C, M and Y) and the inverted mixed color dither mask, whereby it is possible to obtain primary color dither masks (see columns C2, M2 and Y2: mask numbers are all equal to "0").

Further, for instance, if red (see color No. 6 in FIG. 20) is designated, when a logical NOT operation (DM5N(0)=NOT. DM5(0)=DM5(4)) is performed on a corresponding mixed color dither mask (see column K), the inverted mixed color dither mask is formed which is identical to the dither mask DM5(4) composed of matrix elements each having the validity-indicative value "1", so that when logical AND operations (DM5N(0). AND. DM5(0)=DM5(4) AND. DM5 (0)=DM5(0), DM5N(0). AND. DM5(4)=DM5(4). AND. DM5(4)=DM5(4), DM5N(0). AND. DM5(4)=DM5(4). AND. DM5(4)=DM5(4)) are carried out between each provisional primary color dither mask for red (see columns C, M and Y) and the inverted mixed color dither mask, each primary color dither mask for red (see columns C2, M2 and Y2) becomes the same as each provisional primary color dither mask for red (see columns C, M and Y).

Similarly, if colors from color No. 7 to color No. 23 are designated, when a logical NOT operation (DM5N(0) NOT. DM5(0)=DM5(4)) is carried out on a mixed color dither mask (see column K) for each of the colors, the inverted mixed color dither mask is formed which is identical to the dither mask DM5(4) composed of matrix elements each having the validity-indicative value "1", so that when a logical AND operation is carried out between the inverted mixed color dither mask and each provisional primary color dither mask (see columns C, M and Y) for a specified color, primary color dither masks (see columns C2, M2 and Y2) identical to respective provisional primary color dither masks (see columns C, M and Y) can be obtained.

Next, when dark red (see color No. 24 in FIG. 20) is designated, provisional primary color dither masks (see columns C, M and Y) therefor are dither masks DM5(2), DM5(4), DM5(4), respectively, so that a mixed color dither mask (see column K) obtained by assigning the validity-indicative value only to each matrix element corresponding in matrix element location to matrix elements of all the provisional primary color dither masks which commonly have the validity-indicative value, becomes the same as the dither mask DM5(2) (see FIG. 12B).

In this case, out of matrix elements of the dither mask DM5(2) as a provisional primary color dither mask for the color C (see column C), for instance, each matrix element corresponding in matrix element location to each matrix element of the dither mask DM5(2) as the mixed color dither mask, having the validity-indicative value "1", has its validity-indicative value converted to the invalidity-indicative value "0", that is, each matrix element corresponding having the validity-indicative value "1" redundantly with each corresponding matrix element of the mixed color dither mask has the invalidity-indicative value "1" assigned thereto, to there by cancel the redundant validity-indicative value "1". The resulting primary color dither mask for the color C (see column C2) is the dither mask DM5(0). The primary color dither mask for the color C can be created in the following manner: First, a logical NOT operation (DM5N(2)=NOT. DM5(2)) is carried out on the dither mask DM5(2) as a mixed color dither mask for the color C, to thereby form the inverted mixed color dither mask. Then, a logical AND operation (DM5N(2). AND. DM5(2)=DM5(0)) is performed between each matrix element of the dither mask DM5(2) as a provisional primary color dither mask for the color C and a corresponding one of the matrix elements of the inverted mixed color dither mask. As a result of the logical AND operation, the primary color dither mask for the color C is produced.

Figure 21A:
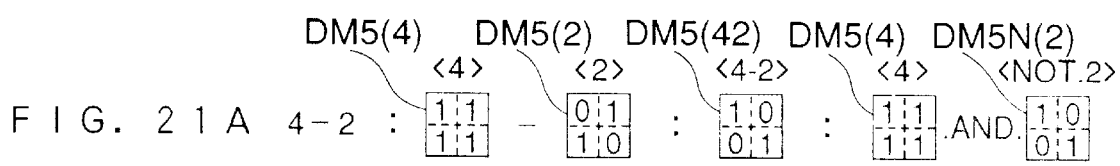
FIGS. 21A to 21C are diagrams showing examples of dither masks which are useful in explaining the principle of obtaining a primary color dither mask from a temporary primary color dither mask and a mixed color dither mask, which is employed by a second embodiment of the invention.

Further, out of matrix elements of the dither mask DM5(4) as a provisional primary color dither mask for the colors M and Y (see columns M and Y), for instance, each matrix element corresponding in matrix element location to each matrix element of the dither mask DM5(2) as the mixed color dither mask, having the validity-indicative value "1", has its validity-indicative value converted to the invalidity-indicative value "0", that is, each matrix element corresponding having the validity-indicative value "1" redundantly with each corresponding matrix element of the mixed color dither mask has the invalidity-indicative value "0" assigned thereto, to there by cancel the redundant validity-indicative value "1". The result primary color dither mask for the colors M and Y, is a dither mask DM5(42) shown in FIG. 21A. As shown in the figure, this dither mask DM5(42) has an image of a figure formed by subtracting the dither mask DM5(2) from the dither mask DM5(4), so that in FIG. 20, "4-2" is shown as the mask number of primary color dither masks (see columns M2 and Y2) for the colors M and Y (similarly, "2-1" and "3-1", described hereinafter, are also the mask numbers). In this case as well, the primary color dither mask for the colors M and Y can be produced as a result of a logical AND operation (DM5N(2). AND. DM5 (4)=DM5(42)) between each matrix element of the dither mask DM5(4) as a provisional primary color dither mask for the colors M and Y, and a corresponding one of the matrix elements of the inverted mixed color dither mask as a result of a logical NOT operation (DM5N(2)=NOT. DM5(2)) on the dither mask DM5(2) as a mixed color dither mask (see FIG. 21A).

Next, when dark orange (see color No. 25 in FIG. 20) is designated, provisional primary color dither masks (see columns C, M and Y) are dither masks DM5(1), DM5(2), AND DM5(3), respectively. Hence, a mixed color dither mask (see column K) obtained by assigning the validity-indicative value "1" only to each matrix element corresponding in matrix element location to matrix elements of all the provisional primary color dither masks which commonly have the validity-indicative value becomes the same as the dither mask DM5(1) (see FIG. 12B).

In the above case, when the validity-indicative value "1" of each matrix element of the dither mask DM5(2) as a provisional primary color dither mask for the color C (see column C), which corresponds in matrix element location to each matrix element of the mixed color dither mask, having the validity-indicative value, is canceled, a primary color dither mask for the color C (see column C2) becomes the dither mask DM5(0). In this case, the primary color dither mask for the color C can be produced as a result of a logical AND operation (DM5N(1). AND. DM5(1)=DM5(0)) between each matrix element of the dither mask DM5(1) as the provisional primary color dither mask for the color C, and a corresponding one of the matrix elements of the inverted mixed color dither mask as a result of a logical NOT operation (DM5N(2)=NOT. DM5(2)) performed on the dither mask DM5(1) as the mixed color dither mask for the color C.

Figure 21B:
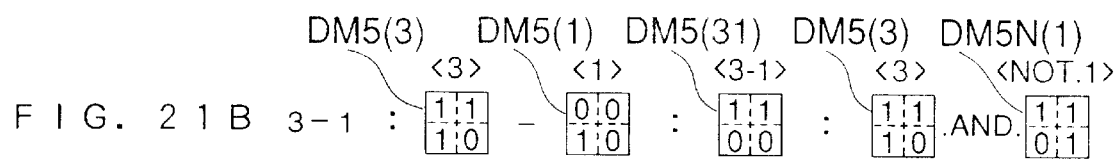
Figure 21C:
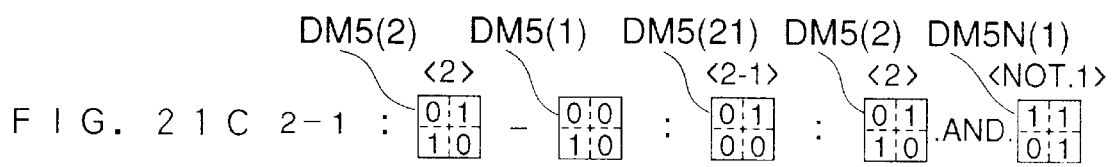

Further, when the validity-indicative value of each matrix element of the dither mask DM5(2) as a provisional primary color dither mask for the color M (see column M), which corresponds to each matrix element of the mixed color dither mask, having the validity-indicative value, is canceled, a primary color dither mask for the color M (see column C2) becomes the dither mask DM5(21) (DM5(21)=DM5(2)−DM5(1)), as shown in FIG. 21C. In this case as well, the primary color dither mask for the color M can be produced as a result of a logical AND operation (DM5(2). AND. DM5N(1)=DM5(21)) between a matrix element of the dither mask DM5(2) as the provisional primary color dither mask for the color M, and a corresponding one of the matrix elements of the inverted mixed color dither mask as a result of a logical NOT operation (DM5N(1)=NOT. DM5(1)) performed on the dither mask DM5(1) as the mixed color dither mask for the color M. Similarly, when the validity-indicative value on a side of the dither mask DM5(3) as a provisional primary color dither mask for the color Y (see column Y), which is also the validity-indicative value on a side of the mixed color dither mask, is canceled, a primary color dither mask for the color Y (see column Y2) becomes the dither mask DM5(31), as viewed in FIG. 21B. This primary color dither mask for the color Y can be produced as a result of a logical AND operation between a matrix element of the provisional primary color dither mask for the color Y, and a corresponding one of the matrix elements of the inverted mixed color dither mask as a result of a logical NOT operation performed on the mixed color dither mask for the color Y (DM5(31)=DM5(3)–DM5(1)=DM5(3). AND. DM5N(1)).

As described above, in the tape printing apparatus 1, each primary color dither mask is created in the following manner: First, a logical NOT operation for inverting the validity-indicative value and the invalidity-indicative value is carried out on the mixed color dither mask, to thereby form the inverted mixed color dither mask. Then, a logical AND operation is performed between each matrix element of each provisional primary color dither mask and a corresponding one of the matrix elements of the inverted mixed color dither mask , such that the validity-indicative value is output only when both matrix elements have the validity-indicative value. As a result of the logical AND operation, each primary color dither mask is produced. That is, in this case, simply by carrying out a relatively simple logical NOT operation and logical AND operation, it is possible to form a primary color dither mask in which out of matrix elements of each provisional primary color dither mask, having the validity-indicative value, each matrix element corresponding in matrix element location to each matrix element of the mixed color dither mask, having the validity-indicative value, has its validity-indicative value canceled.

It should be noted that in the following, diagrams or figures are briefly described, since the tape printing apparatus 1 according to the first and second embodiments have been described based on examples of. As described hereinbefore, in the tape printing apparatus 1, it is possible to register figures and the like as registered nonstandard characters or registered images represented by dot maps. Among them, so-called nonstandard characters can be treated similarly to the above-mentioned characters or the like, and if simple, figures can be handled similarly to the characters by providing the same as fonts or nonstandard characters. Hence, in the following, description is made of registered figures which normally can not be treated similarly to characters.

For instance, a selection screen is displayed by operating the form key 322 to switch the same to a screen for registering image data and then, similarly to the case of so-called nonstandard characters being registered, the cursor key 330 is operated in a state of the shift key 327 being depressed, whereby values (the validity-indicative value "1", the invalidity-indicative value "0" and the like) assigned to pixels (dots) on a cursor path are reversed, or alternatively, for instance, the selection key 323 is operated in a state of the sift key 327 being depressed, thereby designating a starting point and an ending point, and changing values of pixels in a rectangular area having a diagonal line connecting the dot of the starting point and the dot of the ending point. A figure or diagram is drawn in such a manner by using a dot image, and registered (stored with a registration number) in the registered image data area 245 in the RAM 240.

Here, description will be made assuming that a figure registered in the immediately preceding occasion or a figure registered before and now read out again from the RAM is a figure of a no-smoking mark appearing in FIG. 22A. This figure of the no-smoking mark can be decomposed into image elements shown in FIG. 22B, for instance. Further, if a portion displayed in the shaded manner in each figure is regarded as an elementary object image and the other portion as an elementary background image, each image element can be decomposed into the elementary object image and the elementary background image, and they can be distinguished from each other on matrix data. That is, the validity-indicative value "1" can be assigned to the pixels (dots) of the elementary object image of each image element, while the invalidity-indicative value "0" is assigned to the pixels (dots) of the elementary background image of the same, whereby each image element can be formed into an elementary shape image represented by an elementary shape image matrix.

Similarly to the case of character colors being specified, as described above, red, for instance, is specified, that is, the primary color gradation value "0" of the color C, the primary color gradation value "4" of the color M, and the primary color gradation value "4" of the color Y are designated (see color No. 6 in FIG. 20), for a portion of the elementary object image (the shaded portion) of the elementary shape image, represented by an elementary shape image matrix SG4 in FIG. 22B. Further, slightly light blue, for instance, is specified, that is, the primary color gradation value "3" of the color C, the primary color gradation value "3" of the color M, and the primary color gradation value "0" of the color Y are designated (see color No. 7 and color No. 13 in FIG. 20: slightly light blue is a neutral color of color No. 7 (blue) and color No. 13 (light blue)), for a portion of the elementary object image of the elementary shape image, represented by an elementary shape image matrix SG5 shown in FIG. 22B. Furthermore, light gray, for instance, is specified, that is, the primary color gradation value "1" of each color C, M, and Y is designated (see color No. 5 in FIG. 20), for a portion of the elementary object image of the elementary shape image, represented by an elementary shape image matrix SG6 in FIG. 22B. Color pallet data CP4, CP5, and CP6 shown in FIG. 22C is stored in the color pallet data area 247 of the RAM 240 as gradation values (primary color gradation values) of the respective elementary object images.

The above operations up to the color specification are executed in response to the FIG. 16 text entry via the keyboard (S11). At the time point of completion of the FIG. 16 text entry in the first embodiment, data as provided for the character images of characters "1", "2" and "3", that is, elementary shape image matrices and color pallet data for the respective characters are already made available by the above operations. Hence, the step S12 for instructing printing and steps subsequent thereto can be carried out in the same manner. Further, since the FIG. 16 text entry (S11) in the second embodiment is carried out in the same manner as carried out in the first embodiment, the dithering described in the second embodiment can be carried out in the same manner.

Although a relatively simple figure, such as a "no-smoking mark", was used as the figure described above with reference to FIG. 22A due to limited space of the drawing sheet (for purposes of efficiency of illustration and description), as described hereinbefore, however complicated a plotted image is, if it is regarded as a synthesized image (whole image) formed by synthesizing image elements in which at least all the pixels of elementary object images thereof have an identical gradation value, the plotted image can be decomposed into image elements, and each image element into an elementary object image and an elementary background image other than the elementary object image. Since the elementary object image and the elementary background image can be distinguished from each other, dithered image elements corresponding to respective image elements can be produced and combined (by superimposing corresponding matrix elements), whereby it is possible to obtain even a dithered image element formed by carrying out the dithering on a complicated plotted image.

Next, difference between the gradation values of an elementary object image and those of an elementary background image will be considered. More specifically, even if the elementary object image and elementary background image of a single image element can be distinguished from each other, as described above, if the difference in gradation value (in density, gray tone and the like) between the same is small, for instance, when the density of the elementary background image is low with respect to that of the elementary background image, a boundary (contour line or the like) between the images becomes unclear when the image element is displayed or printed, thereby causing so-called blur to be produced. However, if the gradation values of the elementary object image, for instance, are corrected in a manner such that the density of the elementary object image is uniformly increased, irrespective of the original (designated) gradation values thereof, there is no difference between the present case and a case where gradation values close to maximum density are designated from the beginning, which prevents reflection of the user's intention. Particularly when color images are corrected in such a fashion, relationship among three or four basic colors is made unbalanced, thereby producing different colors from the user's intention.

Further, when the difference in density is uniformly increased (e.g. the density of the elementary object image is increased), so-called collapse of dots or the like is caused. The same inconvenience occurs in a whole image as well, which causes the relationship between the image elements to be made unbalanced or collapse of dots in high-density portion (to form a solid black area) through interference between the same. Particularly when an image is output to the printing apparatus, that is, when a print image is formed by carrying out the dithering, if the gradation values of an elementary object image, for instance, are corrected in a manner such that the density of the elementary object image is uniformly increased, the printing apparatus suffers from the problem that the amount of ink droplets to be ejected onto a unit area of a printing object exceeds a limit of the amount of ink which can be absorbed by the unit area (hereinafter referred to as an "ejection amount-limiting value").

To cope with the problem, in the following description, dithering which makes it possible not only to save the memory capacity and shorten processing time of the apparatus but also to reflect the user's intention as well as prevent formation of blur or collapse of dots, that is, image processing (dithering) to be carried out when there is a possibility of occurrence of problems as described above will be described as a third embodiment of the invention.

In the tape printing apparatus 1 of the third embodiment, similarly to the above-mentioned first and second embodiments, first, as to at least one image element which has an elementary object image as a body or object thereof having pixels distinguishable from the pixels of an elementary background image as the background of the elementary object image, elementary shape images represented by binary matrices are produced by assigning the validity-indicative value to the pixels of the elementary object image and the invalidity-indicative values to the pixels of the elementary background image. On the other hand, one of n gradation values is stored for all the pixels of the elementary object image as an identical designated gradation value.

Figure 26:
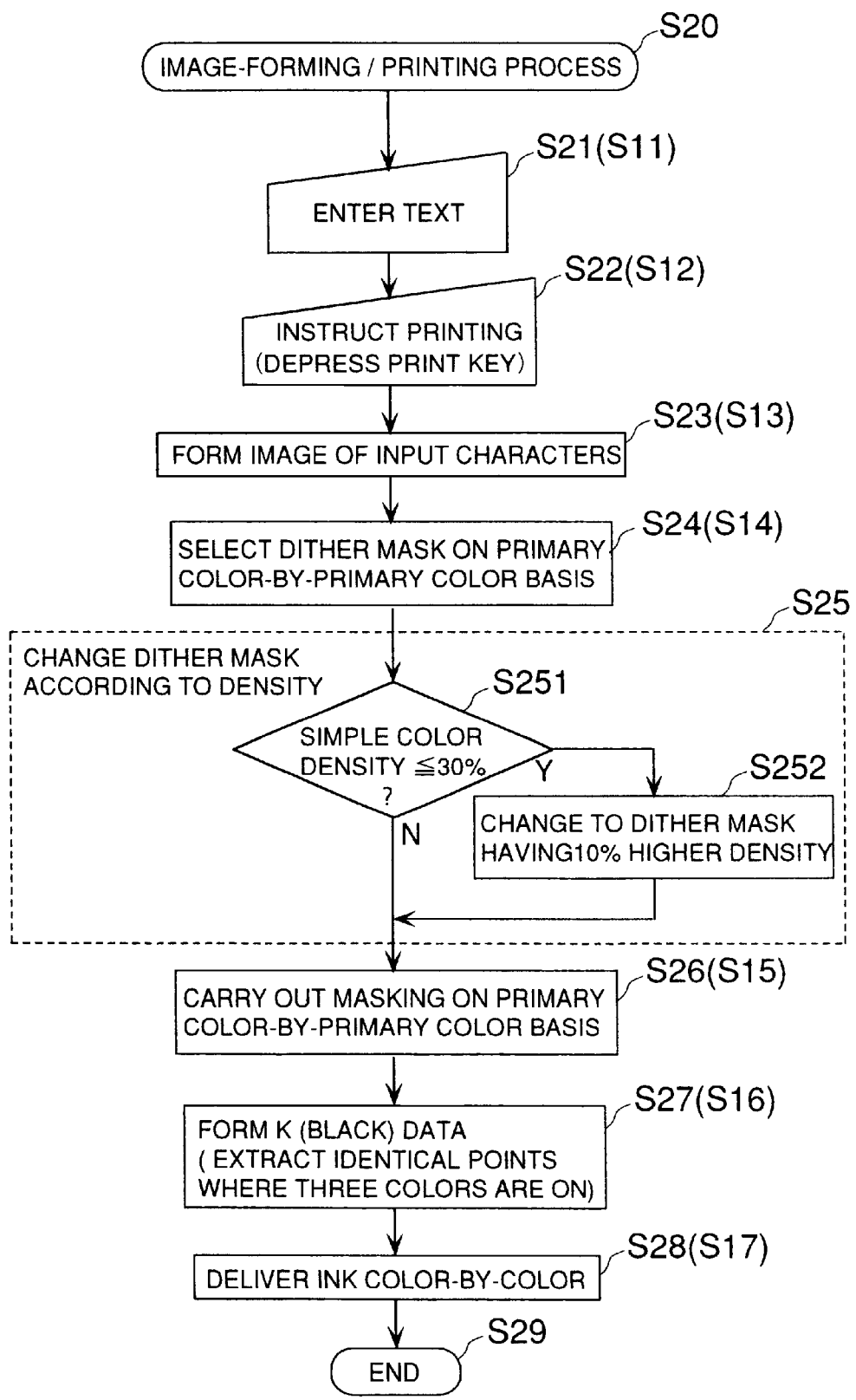
FIG. 26 is a flowchart showing an example of an image-forming/printing process carried out according to the third embodiment.

More specifically, similarly to the case described above with reference to FIG. 16 and the like, for instance, as shown in FIG. 26, first, after characters are entered, that is, in the example described above with reference to FIG. 12A, after characters, such as the character string "123", are entered, and the sizes and decoration thereof are designated and color specification is completed at step S21 (the same step as the above S11), printing is instructed by operating the print key 321 at step S22 (the same step as S12), and the images of the respective characters of the character string "123" are formed. Then, the elementary shape images of the respective characters (image elements) represented by elementary shape image matrices SG1, SG2, SG3 appearing in FIG. 12A are formed at step S23 (the same step as S13). On the other hand, color pallet data items CP1, CP2 and CP3 are stored in the color pallet data area 247 of the RAM 240 as the designated gradation values of the character images (elementary object images) of the characters "1", "2" and "3".

At this time point, in the tape printing apparatus 1 of the third embodiment, next, a corrected gradation value (primary color corrected gradation value) is determined based on each designated gradation value (primary color gradation value in the case of color printing), and a dithered image element (primary color dithered image element) is produced by using a dither mask corresponding to the corrected gradation value. In this case, since the user's intention reflects on the designated gradation value, it is possible to cause the user's intention to reflect on the corrected gradation value produced based on the designated gradation value. Further, since the dithered image element is formed by using a dither mask corresponding to this corrected gradation value, it is also possible to cause the user's intention to reflect on the dithered image element. On the other hand, the dither mask used in this process corresponds to the designated gradation value not directly but via the corrected gradation value, so that by contriving methods of causing corrected gradation values to correspond to designated gradation values, images can be corrected in various manners according to designated gradation values. This makes it possible not only to save the memory capacity and shorten processing time of the apparatus but also to reflect the user's intention as well as correct gradation values, to thereby prevent formation of blur and collapse of dots.

In correcting gradation values, the following method can be considered. That is, e.g. when gradation values designated for image elements of a whole image are concentrated within a narrow area in a value range of n gradation levels to thereby make a very slight difference between the designated gradation values, the very slight difference is enlarged to disperse the gradation values and gradation values corrected are determined, whereby correction is performed such that a contrast between the image elements is amplified for emphasis on the user's intention (making a difference between designated gradation values). Further, only when the difference in density between the elementary object image and the elementary background image of each image element is small (for instance, when the density of the elementary background image is low with respect to that of the elementary background image), the difference in density is enlarged (to increase the density), whereas when the difference in density is large, corrected gradation values are made identical to designated gradation values, whereby it is possible to prevent formation of blur as well as generation of collapse of dots through value-correcting operations. In the above cases, a program for correcting processing may be branched according to the designated gradation values for determination of corrected gradation values, or alternatively, a table correlating designated gradation values with corrected gradation values may be provided to determine corrected gradation values with reference to the table.

To this end, in the following, it is determined whether or not a designated gradation value is within a predetermined correcting range, and if it is within the predetermined range, the designated gradation value is adjusted to set a corrected gradation value, whereas if it is out of the predetermined range, the designated gradation value is determined as a corrected gradation value as it is. That is, by determining whether or not a designated gradation value is within a predetermined range of correction, the designated gradation value to be corrected can be limited within the correcting range, whereby it is possible to reduce generation of problems (collapse of dots and the like) in comparison with uniform correction of designated gradation values.

In the above case, as described above, a dither mask for each of possible corrected gradation values may be stored in advance. Alternatively, a dither mask may be newly formed for storage by comparing a corrected gradation value with each threshold in a dither matrix, after the corrected gradation value is determined. In the former case, after the corrected gradation value is determined, a dither mask corresponding to the same may be selected, or a dither mask, which is selected before hand based on a designated gradation value (identical to a corrected gradation value when a designated gradation value is out of a correcting range), may be selected (changed) based on a corrected gradation value, only when the designated gradation value is determined to be within a correcting range. Therefore, in the following, an example will be described in which a dither mask, selected before hand based on a designated gradation value, is selected (changed) based on a corrected gradation value, only when the designated gradation value is determined to be within the correcting range.

Referring to FIG. 26, after the elementary shape image of each character (each image element) has been formed to complete the step (S23) for forming images of input characters, dither masks for the basic colors are selected at step S24 (the same as S14). As described above, in the examples illustrated in FIGS. 12A to 12D, the character image (elementary shape image) of the letter "1", for instance, has the colors C, M, and Y having primary color gradation values all equal to "4", so that the dither mask DM5(4) having mask number "4" is selected. In the case of the character image (elementary shape image) of the letter "2", the primary color gradation value of the color C is "0", that of the color M is "2", and that of the color Y is "1", so that the dither masks DM5(0), DM5(2), and DM5(1) having mask numbers "0", "2", and "1", respectively, are selected.

Similarly, as to the character image (elementary shape image) of the character "3", the primary color gradation value of the color C is "0", that of the color M is "0", and that of the color Y is "2", so that the dither masks DM5(0) and DM5(2) having mask numbers "0" and "2" respectively are selected.

Referring to FIG. 26, in the tape printing apparatus 1, after selection of dither masks for the basic colors has been completed (S24), the dither masks are changed at step S25 in a manner corresponding to density (gradation value) (of the elementary object image and elementary background image of a image element). That is, for instance, as shown in the figure, it is determined at step S251 whether or not the degree of the density of the simple color is equal to or smaller than 30% (i.e. within the correcting range). Here, it is assumed that the density of a simple color (primary color gradation value, in this example) reaches 100% when the same is at its maximum value (in the examples illustrated in FIGS. 12B to 12C, the maximum density is obtained when a primary color gradation value is the maximum value "4"). If it is determined that the density of the simple color is equal to or smaller than 30% (Yes to S251), next, the gradation value is raised such that density is increased by 10% (gradation value 10% higher than the above example), that is, the dither mask is changed to one having a higher density by 10%, followed by the program proceeding to the next color-by-color masking process (S26: the same as S15). The step S26 and steps subsequent thereto are the same as the steps 15 and steps subsequent thereto in the first embodiment, and hence description thereof is omitted.

In the case described above with reference to FIG. 12B to 12D, for convenience of description, the gradation values are set to a range of 0 to 4, and hence the maximum value thereof is "4". A gradation value equal to or smaller than 30% of "4" (1.2) is equal to or smaller than "1". Further, even if such a gradation value is raised by 10% of the maximum value (0.4), the resulting or corrected gradation value falls short of "2", which does not provide a suitable example. In such a case, however, the correcting range can be defined as a range of gradation values equal to or smaller than the gradation value "1", for instance, and assuming that a gradation value is within the correcting range, the gradation value is enhanced by "1" (that is, gradation value is made equal to "2").

Figure 23A:
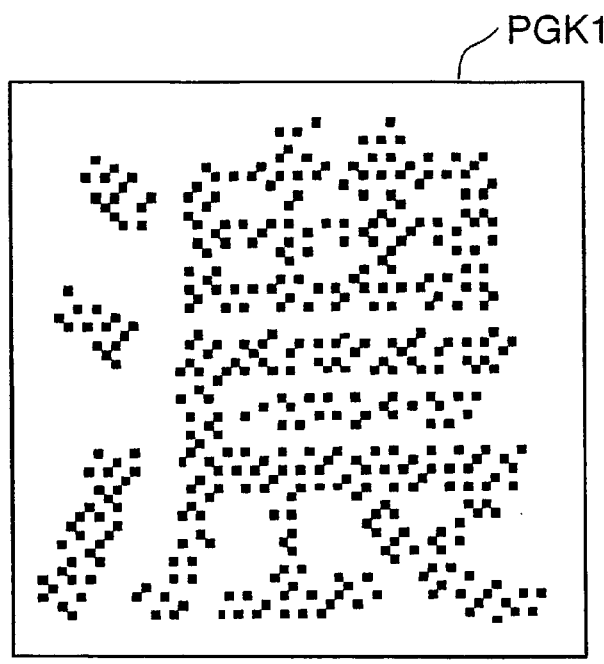
FIGS. 23A to 23C are diagrams illustrating examples of print images which are useful in explaining a case where gradation values are corrected based on a designated gradation value employed in a third embodiment of the invention in comparison with a case where gradation values are not corrected based on the designated gradation value.
Figure 23B:
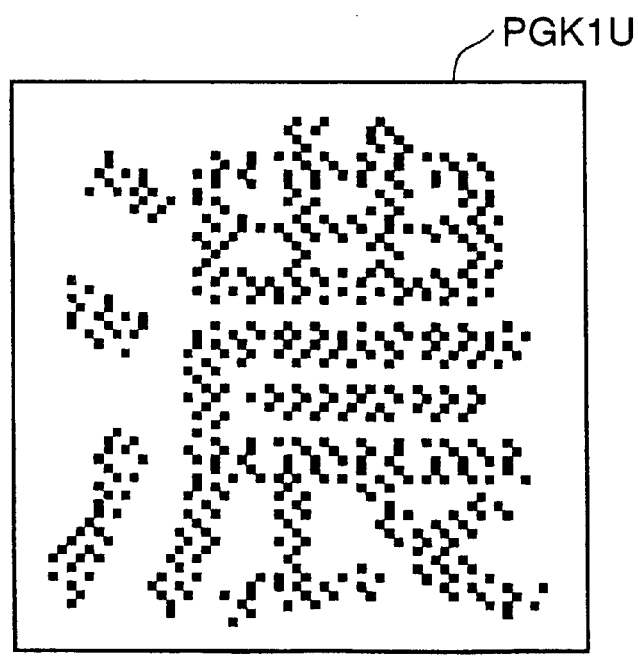
Figure 23C:
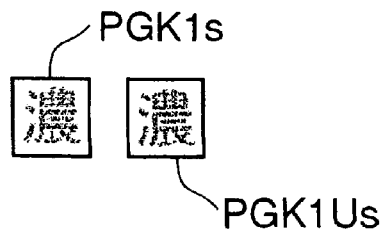
Figure 24:
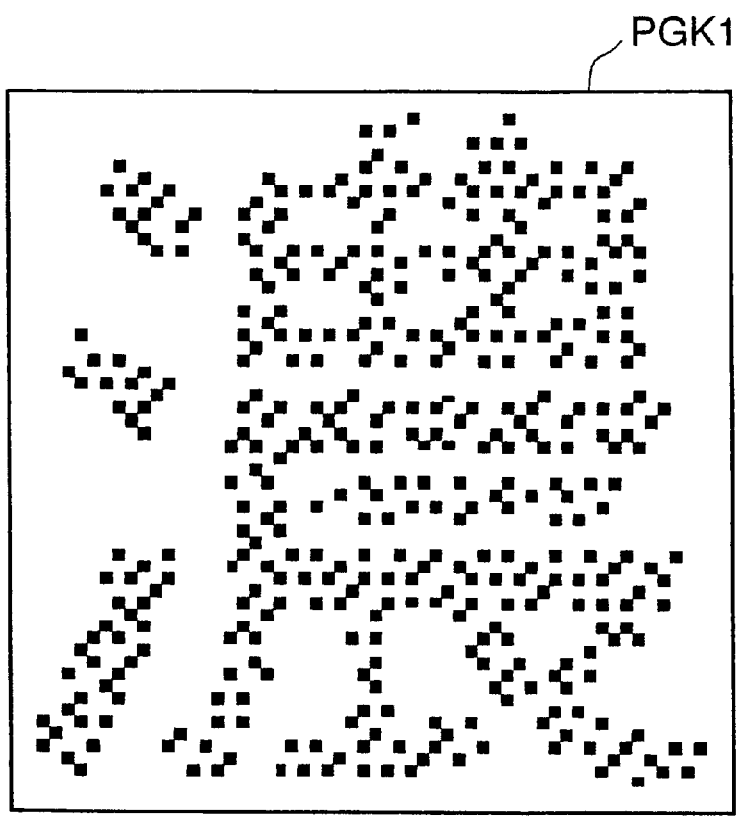
FIG. 24 is a diagram showing the FIG. 23 A print image in which gradation values are not corrected base on the designated gradation, on enlarged scale.
Figure 25:
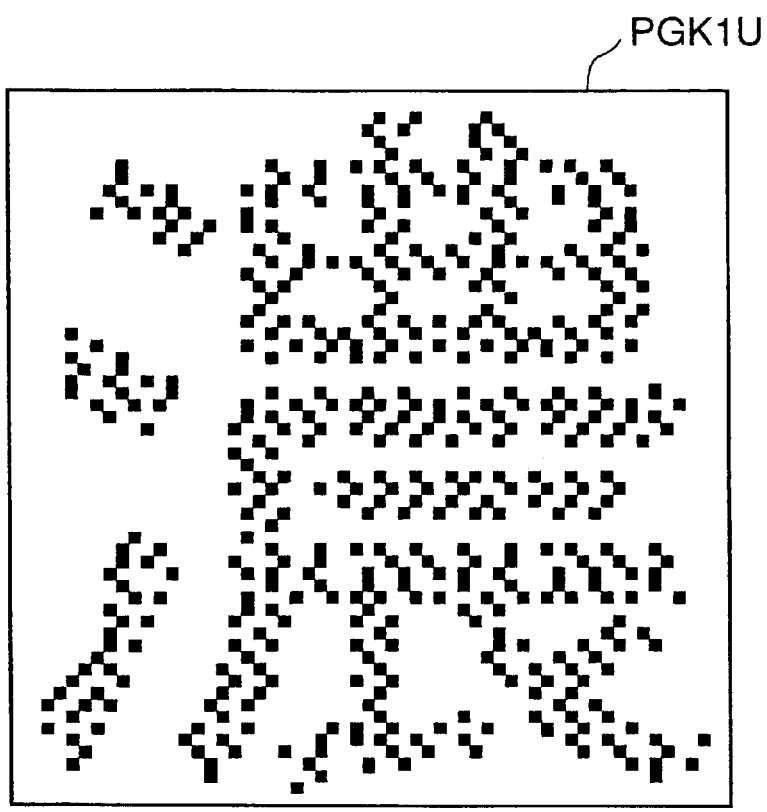
FIG. 25 is a diagram showing the FIG. 23B print image in which gradation values are corrected based on the designated gradation value, on enlarged scale.

Further, a more preferred example is shown hereinbelow. For instance, a print image PGK1 representing a kanji character 濃 viewed in FIGS. 23A and 24, is an example of a print image which has a gradation value equal to or smaller than 30% of the value of 256 gradation values 0 to 256, that is, a gradation value "76". a print image PGK1U 21 representative of the character 濃 as shown in FIGS. 23B and 25, is an example of a print image having a gradation value "102", which is formed by enhancing the density (gradation value) by 10%, (i.e. a gradation value equal to 40% of the maximum). If the former print image PGK1 in FIG. 23A and the latter print image PGK1U in FIG. 23B are compared with each other, or if a print image PGKLs (formed by reducing the former print image PGK1 in size) on a left-hand side in FIG. 23C and a print image PGK1Us (formed by reducing the latter print image PGK1U in size) on a right-hand side in the figure are compared with each other, it is shown that formation of blur or the like is prevented through correction of density (gradation value).

In other words, in this case, according to the tape printing apparatus 1, a predetermined correcting range is determined as a range corresponding to density equal to or lower than a predetermined reference level, whereby a designated gradation value to be corrected can be limited within a range corresponding to the density equal to or lower than the predetermined reference level of density. This makes it possible to exclude a designated gradation value corresponding to high density (density exceeding the predetermined reference level) from a range of gradation values to be corrected. As a result, a designated gradation value can be easily corrected such that formation of blur is prevented and at the same time collapse of dots due to a correction operation is also prevented. Especially when an image is output to the printing apparatus, more specifically, when a dithered image element for a print image is formed by carrying out dithering thereon, if the image is caused to have a corrected gradation value which is further increased in density based on a designated gradation value corresponding to high density, there is a fear that the amount of ink droplets to be ejected onto a unit area of a printing object exceeds the ejection amount-limiting value, as described above. In the above case, however, the predetermined correcting range is a range corresponding to density equal to or lower than a predetermined reference level, which causes almost no problems, even if correction operation of uniformly increasing the density of a gradation value in the correcting range, for instance, is carried out with out much attention. This enables correction processing to be carried out with ease.

Further, in the above case, the predetermined correcting range is defined based on a ratio, that is, based on percentage, for instance, of density corresponding to a designated gradation value to the maximum density. This makes it easy to grasp an image of the range of density to be corrected. Further, since the image of the range of density can be easily recognized, it becomes easy to define and change the range of density. Additionally, in the above description, the maximum density is set to the gradation value "255", and in the example of a print image which has a gradation value equal to or smaller than 30% of the gradation value 256, the gradation value thereof is set to "76", while in the example of a print image which has a gradation value equal to 40% of the maximum value, the gradation value thereof is set to "102". As described above, if a predetermined correcting range is defined as a range of gradation values, the correcting range can be directly determined from a designated gradation value, which makes it easy to determine and define the correcting range.

Further, it is also possible to define a predetermined correcting range as the range of the number of the matrix elements of a dither matrix, having the validity-indicative value assigned thereto, assuming that a designated gradation value is used as an adjustment value for correction as it is. Density does not necessarily have a predetermined (e.g. linear) relationship with a change in a gradation value, depending on a manner of defining the dither matrix, so that in such a case, a desired correcting range can be more easily defined in association with density, if the correcting range is defined by the number of matrix elements of a dither matrix having a predetermined relationship with density, which have the validity-indicative value assigned thereto. In this case, although the number of the matrix elements of the dither mask, having the validity-indicative value assigned thereto, may be directly counted, this is not limitative, but it is convenient if a table correlating the numbers of the matrix elements with designated gradation values and a table correlating the numbers of the matrix elements with corrected gradation values are separately provided for reference, or alternatively, if a table correlating designated gradation values, the numbers of matrix elements of the dither mask, having the validity-indicative value assigned thereto, and corrected gradation values are provided for reference.

In the third embodiment, similarly to the first and second embodiments, figures or diagrams registered as registered images can be treated as characters, in addition to so-called characters, such as letters and symbols as well as figures and symbols as registered nonstandard characters, which can be treated character by character. Further, when not a graphic (figure), such as the above no-smoking mark, but a more picturesque drawing (landscape picture) is processed, it is possible to contrive a method of eliminating such a picturesque drawing from objects to be corrected. More specifically, since blurs or the like sometimes create a kind of taste or natural feelings in this kind of plotted image (picturesque drawing), by handling such a plotted image not as an object to be corrected but as one image element (designated gradation value=corrected gradation value), and neatly and clearly representing image elements, such as characters, (as elements for correction) in contrast with such a plotted image. By combining these two kinds of image elements, a whole image more elaborately designed can be formed.

In other resects than the above, it is clear that by using a corrected gradation value in place of a designated gradation value, the same advantageous effects as obtained by the first and second embodiments can be obtained. Hence, description thereof is omitted.

Next, clarity or contrast of an elementary object image is considered. That is, even when the elementary object image and the elementary background image of a single image element can be distinguished from each other, as described above, if so-called thinning of gradation values is carried out during dithering, irregularities in thickness are produced at a boundary (contour line of the elementary object image, or the like, for instance) between the images seen from a microscopic point of view, which makes the boundary (contour line or the like) unclear. Especially when the elementary object image is small in size or has a contour line with a narrow portion, if a concave part is laid out on (gradation values are thinned from) the narrow portion, there are formed so-called blurs or broken lines in the contour line, thereby making the boundary unclear. Further, in a case where a print image, formed by carrying out dithering, is delivered to the printing apparatus, ink is exuded during printing, thereby making the boundary more and more unclear.

To eliminate the above inconvenience, in the following, dithering which makes it possible not only to save the memory capacity and shorten processing time of the apparatus but also to prevent formation of the blurs or broken lines in an elementary object image, that is, an image processing method (dithering) carried out when there is a fear of occurrence of the above problem, will be described as a fourth embodiment.

In the tape printing apparatus 1 of the fourth embodiment, similarly to the above-mentioned first to third embodiments, as to at least one image element which has an elementary object image as a body or object thereof having pixels distinguishable from the pixels of an elementary background image as a background of the elementary object image, elementary shape images represented by binary matrices are produced by assigning the validity-indicative value to the elementary object image and the invalidity-indicative value to the elementary background image. On the other hand, one of n gradation values is stored for each pixel of the elementary object image as an identical designated gradation value.

Figure 30:
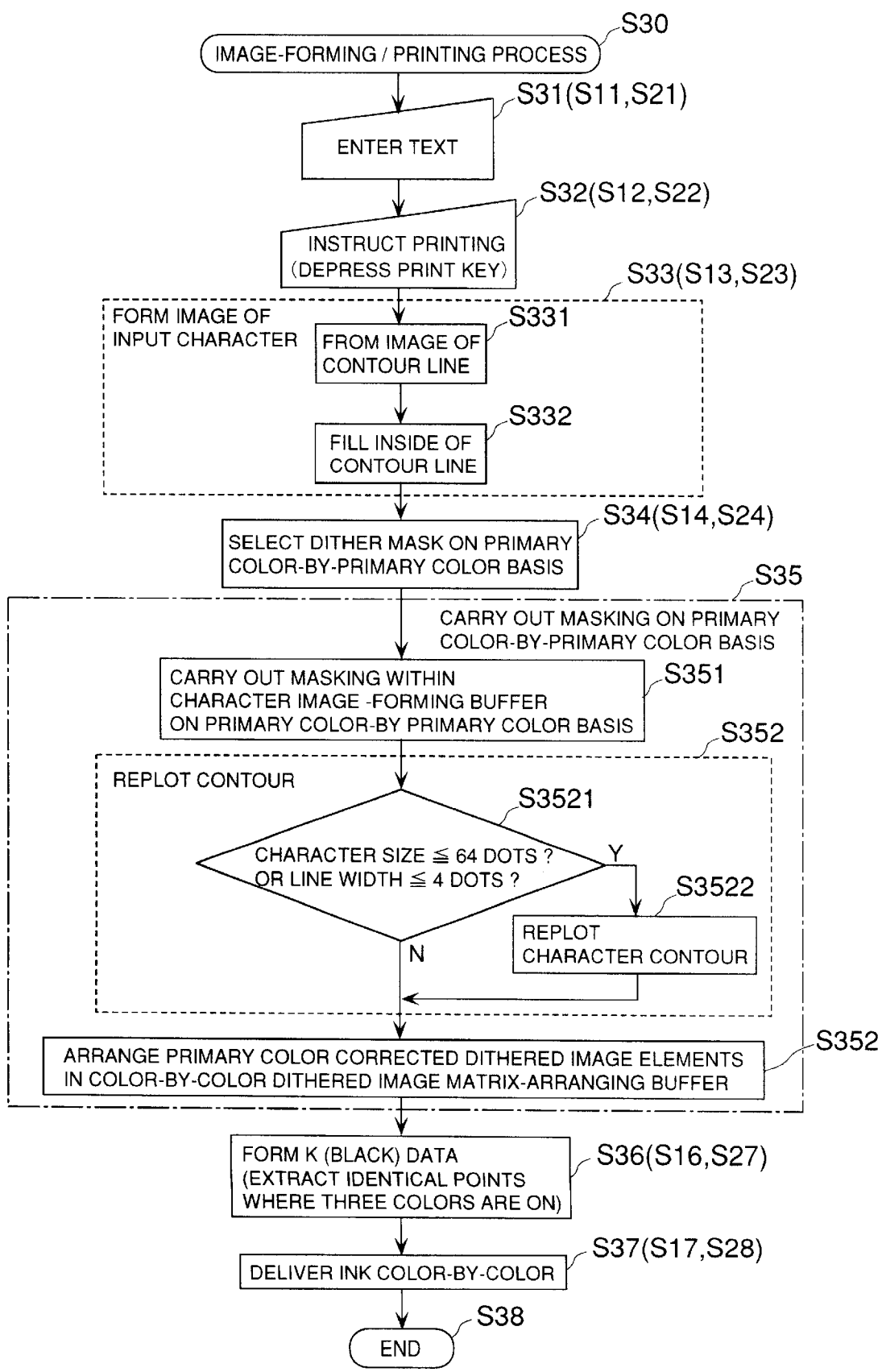
FIG. 30 is a flowchart showing an example of an image-forming/printing process carried out according to the fourth embodiment.

More specifically, similarly to the case described above with reference to FIG. 16 and the like, for instance, as shown in FIG. 30, first, after characters are entered, that is, in the example described above with reference to FIGS. 12A to 12D, after characters, such as the character string "123", are entered, and the sizes and decoration thereof are designated and color specification is completed at step S31 (the same step as the above S11), printing is instructed by operating the print key 321 at step S32 (the same step as S12), and the images of there spective characters of the character string "123" are formed based on the outline font stored in the CG-ROM 230. Then, the elementary shape images of the respective characters (image elements) represented by elementary shape image matrices SG1, SG2, and SG3 in FIG. 12A are formed at step S33 (the same step as S13). On the other hand, color pallet data items CP1, CP2 and CP3 are stored in the color pallet data area 247 of the RAM 240 as the designated gradation values of the character images (elementary object images) of the characters "1", "2" and "3".

Although in this case as well, in addition to characters images of which are formed based on the outline font, it is also possible to employ characters images of which are formed based on the dot map font, or alternatively, registered nonstandard characters or registered images represented by dot maps, for instance, the fourth embodiment is particularly useful when characters developed based on the out line font are employed. Therefore, in the following, description is made of an example in which characters images of which are formed based on the outline font are used.

More specifically, in the tape printing apparatus 1, at the step S13 for forming images of input characters, first, the validity-indicative value "1" out of the two predetermined values ("1" and "0" in this example) is assigned only to each matrix element forming the contour line of the elementary object image based on a predetermined outline font, while the invalidity-indicative value "0" out of the two predetermined values is assigned to each of the other matrix elements, whereby a character (elementary object image) contour image represented by a predetermined binary matrix (hereinafter referred to as a "elementary object contour image matrix") is produced at step S331. Then, out of the matrix elements of the character (elementary object) contour image, having the invalidity-indicative values "0" assigned thereto, matrix elements surrounded by matrix elements forming the contour line of the character (elementary object) image have the validity-indicative values "1" assigned thereto, whereby an elementary shape image represented by an elementary shape image matrix is created at step S332.

Since the outline font is defined by coordinates of the contour line and attributes thereof, the process of forming an image based on the outline font (S33) is generally executed by carrying out a contour-plotting process (contour line image-forming process: process of assigning the validity-indicative value to matrix elements forming the contour line: S331) and a so-called filling process (process of filling the inside of a contour line: process of assigning the validity-indicative value to all the matrix elements inside the contour line: S332) for filling a portion inside the contour line plotted. In short, in the above case, the elementary shape image can be easily formed by a general image-forming method carried out based on an outline font.

As shown in FIG. 30, after the elementary shape image of each character (each image element) has been formed to complete the step (S33) for forming images of input characters, dither masks for the respective basic colors are selected at step S34 (the same as S14). Since this process (S34) has been already described in the first embodiment, the description thereof is omitted. Referring to FIG. 30, in the tape printing apparatus 1, after selection of dither masks for the basic colors has been completed (S24), a color-by-color masking process (S35) is carried out.

In the color-by-color masking process (S35), according to the tape printing apparatus 1 of the fourth embodiment, a corrected dithered image element formed by correcting a dithered image element based on the contour line of the elementary object image is formed.

For instance, in the above elementary shape image, the validity-indicative value "1" is assigned to the matrix elements representative of the pixels of the elementary object image, while the invalidity-indicative value "0" is assigned to the matrix elements representative of the pixels of the elementary background image, so that the boundary (contour line of the elementary object image) between the images is clearly shown. However, as a result of a logical AND operation, matrix elements having the validity-indicative value "1" and matrix elements having the invalidity-indicative values "0" are mixed in matrix elements corresponding to the pixels of the elementary object image in the dithered image element, and hence matrix elements having the validity-indicative value "1" and matrix elements having the invalidity-indicative value "0" can be mixed also in matrix elements corresponding to the contour line of the elementary object image. In such a case, the boundary between the elementary object image and the elementary background image, that is, a portion corresponding to the contour line of the elementary object image is made unclear. To overcome this problem, the dithered image element is corrected based on the elementary object image, whereby it is possible to make clear the portion of the dithered image element, corresponding to the contour line of the elementary object image. Therefore, in the corrected dithered image element as a result of the correction, it becomes possible to prevent formation of the blurs or broken lines in the elementary object image, in addition to the above advantageous effects of the dithered image element.

More specifically, as shown in FIG. 30, in the color-by-color masking process (S35), at step S351, primary color dithered image elements for respective colors are formed in the character image-forming buffer by carrying out the same masking process as described above with reference to the first embodiment. Then, after the contour line is plotted again, primary color dithered images (hereinafter referred to as "primary color corrected dithered image elements") as results of the correction are produced at step S352. Thereafter, each primary color corrected dithered image element is arranged in each of the color-by-color dithered image matrix-arranging buffer at step S353. After the above steps are carried out, whole dithered images for the respective basic colors, as described above with reference to FIGS. 13A, 14A, and 15A and FIGS. 17A, 18A, 19A, are formed. That is, in the color-by-color masking process (S35), since the steps other than the step (S352) for replotting the contour line are similar to the steps described with reference to the first embodiment, description thereof is omitted. In the following, the contour-replotting process (S352) will be described.

First, correction of each dithered image element (primary color dithered image element, in this example) is carried out by assigning the validity-indicative value "1" out of the two predetermined values "1" and "0" to each of the matrix elements corresponding to the contour line of the elementary object image. This makes it possible to make clear a portion of the dithered image element, corresponding to the contour line of the elementary object image as well as prevent formation of the blurs or broken lines in the elementary object image in the corrected dithered image element as a result of the correction.

Figure 27A:
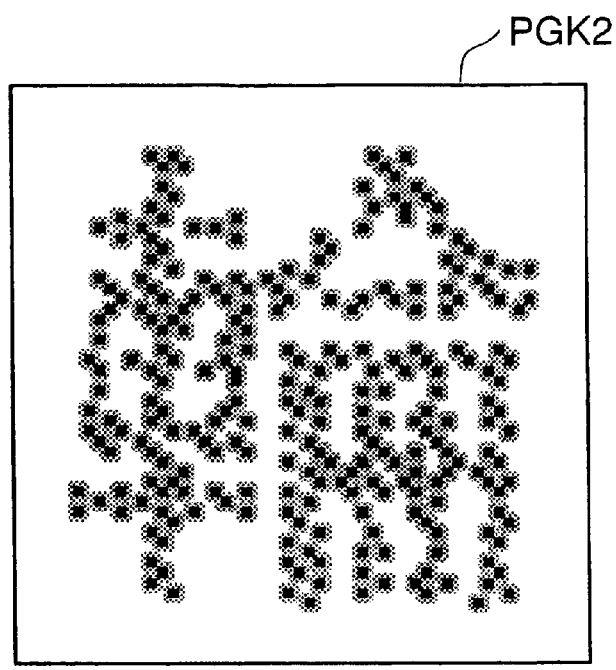
FIGS. 27A to 27C are diagrams illustrating examples of print images which are useful in explaining a case where a dithered image element is corrected according to a fourth embodiment of the invention in comparison with a case where the dithered image element is not corrected.
Figure 27B:
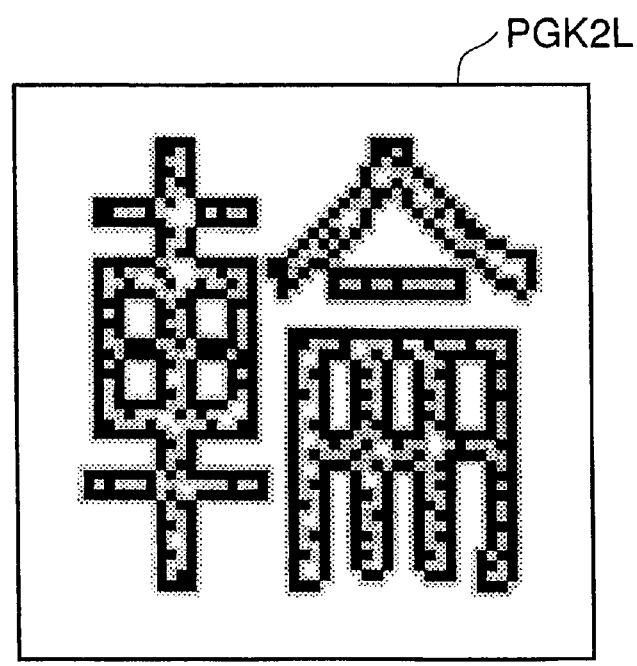
Figure 27C:
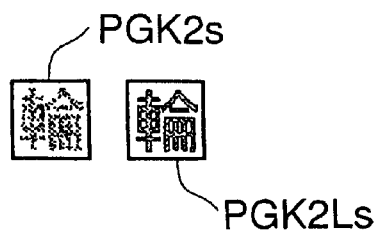
Figure 28:
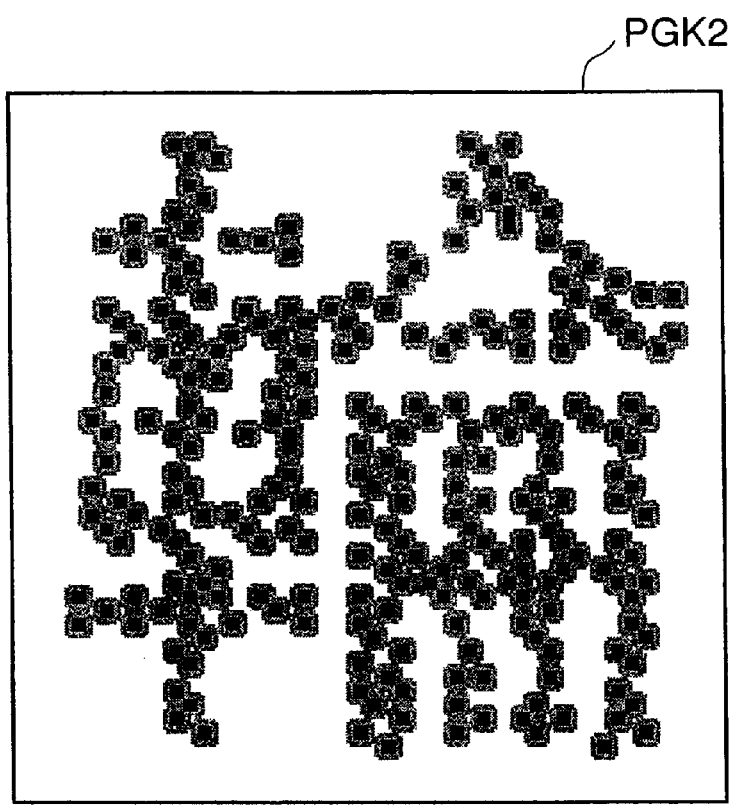
FIG. 28 is a diagram showing the FIG. 27A print image in which the dithered image element is not corrected, on enlarged scale.
Figure 29:
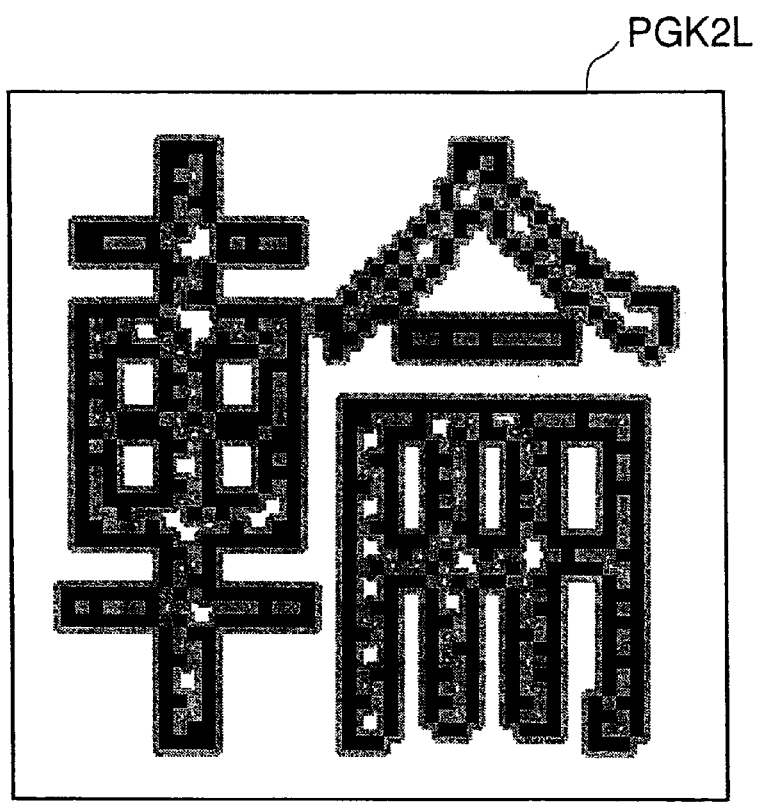
FIG. 29 is a diagram showing the FIG. 27B print image in which the dithered image element is corrected, on enlarged scale.

For instance, when a print image (dithered image element) PGK2 representative of a kanji character 輪 appearing in FIGS. 27A and 28, is corrected so as to reinforce the contour line thereof, a print image (corrected dithered image element) PGK2L representative of the character 輪 shown in FIGS. 27B and 29 is obtained. If these print images PGK2 and PGK2L are compared with each other, or if a print image (dithered image element) PGK2s (formed by reducing the print image PGK2 in size) on a left-hand side in FIG. 27C and a print image (corrected dithered image element) PGK2Ls (formed by reducing the print image PGK2L in size) on a right-hand side in the same figure are compared with each other, it is shown that formation of blur or broken line is prevented through correction of the contour line.

That is, in the tape printing apparatus 1, for instance, in a case where a print image, formed by carrying out dithering, is output to the printing apparatus, even if ink is exuded during printing, the print image can be prevented from being made unclear, by the reinforced contour line. Further, as described above, the printing apparatus has the ejection amount-limiting value dependent on a printing object. Therefore, if the dithered image element is corrected in a manner such that the density thereof is uniformly increased, the printing apparatus sometimes suffers from the problem that the amount of ink droplets to be ejected onto a unit area of a printing object exceeds the ejection amount-limiting value, as described above. However, in this example, it is only required to reinforce the contour line and further, the outside of the contour line is an area free of ink (area to which invalidity-indicative values are assigned). Accordingly, a problem of the above-mentioned kind is prevented from occurring.

More specifically, for instance, as shown in FIG. 30, in the contour-replotting process (S352), first, it is determined at step S3521 whether or not the elementary object mage has predetermined characteristics, that is, in this example, whether or not either of a condition that a character size is equal to or smaller than 64 dots and a condition that a line width is equal to or smaller than 4 dots is satisfied. If it is determined that the elementary object mage has the predetermined characteristics (Yes to S3521), a character contour-replotting process is carried out at step S3522.

The character contour-replotting process (S3522) is similar to the contour line image-forming process (S331) in the input character image-forming process (S33). More specifically, in the tape printing apparatus 1, a process similar to the contour-plotting process (contour line image-forming process: S331) in the input character image-forming process (elementary shape image-forming process: S33) is carried out on the dithered image element (that is, a character (elementary object) contour-replotting process for replotting the contour line is executed on the dithered image element: S3522), so that it is possible to easily assign validity-indicative value to matrix elements corresponding to the contour line of the elementary object image of the dithered image element, without additionally providing a new function.

It should be noted that during the input character image-forming process (S33), the elementary object contour image, formed in the contour line image-forming process (S331) and used in the next process of filling the inside of the contour line, can be stored as it is, thereby employing the same in the character (elementary object) contour-replotting process (S3522). In this case, a logical OR operation is performed between each matrix element of each dithered image element matrix and a corresponding one of the matrix elements of the elementary object contour image matrix, such that a resulting matrix element has the validity-indicative value "1" when either of the matrix elements has the validity-indicative value "1". That is, in the character (elementary object) contour image matrix, the validity-indicative value "1" is assigned only to matrix elements constituting the contour line of the character (elementary object) image. Hence, a logical OR operation is carried out between the character (elementary object) contour image matrix and the dithered image element matrix, whereby the validity-indicative values "1" can be easily assigned to matrix elements corresponding to the contour line of the elementary object image of the dithered image element matrix. Further, since it is only required to perform a logical OR operation, processing time of the apparatus can be shortened.

Further, in the tape printing apparatus 1, during the contour-replotting process (corrected dithered image element-forming process: S352), it is determined (S3521) whether or not the elementary object mage has predetermined characteristics. If it is determined that the elementary object mage has the predetermined characteristics (Yes to S3521), the dithered image element is corrected to a corrected dithered image element (character contour-replotting process: S3522). If it is determined that the elementary object mage does not have the predetermined characteristics (No to S3521), the dithered image element is used as a corrected dithered image element. That is, by determining whether or not the elementary object mage has the predetermined characteristics, a dithered image element to be corrected can be restricted, and when there are a plurality of dithered image elements, it is possible to shorten whole processing time of the apparatus in comparison with a case where the plurality of dithered image elements are uniformly corrected.

In the above case, the predetermined characteristics include a characteristic as to the size of the elementary object image. Clarity of a result of dithering, particularly clarity of a result of so-called thinning depends on the size of the elementary object image, and if attention is paid to one of various sizes which is liable to influence clarity of a result of dithering, a dithered image element to be corrected can be limited, thereby enabling efficient correction of dithered images. Further, in the above case, the determination is effected based on general dot sizes, which makes it easy to carry out dithering.

More specifically, as described above, the predetermined characteristics include a condition that the whole size of the elementary object image is smaller than a predetermined size (64 dots, in this example). That is, when the whole size of the elementary object image is small, if irregularities in thickness are produced at portions of the contour line or the like by so-called thinning operation, the irregularities become more conspicuous as the whole size of the elementary object image becomes small, which makes it difficult to grasp the original shape of the elementary object image. Therefore, when the whole size of the elementary object image is smaller than the predetermined size (64 dots), it is possible to enhance clarity of the image and prevent formation of blur or the like by correcting the dithered image element created.

Further, for instance, even character images having the same size are different in line width (i.e. thickness of a line forming a character or the like) depending on type faces thereof. Therefore, in the above case, it is sometimes impossible to determine whether or not the elementary object mage has predetermined characteristics, if the determination is dependent only on the whole size of the elementary object image. Further, although the whole shape of the elementary object image can be grasped, if the elementary object image has a contour line having a narrow portion, there is a fear of formation of broken lines at the portion. Hence, in the above case, the predetermined characteristics include a condition that the elementary object image has a line width smaller than a predetermined size (4 dots, in this example). That is, when the elementary object image has a line width smaller than a predetermined size (4 dots), it is possible to enhance clarity of the image and prevent formation of blur or the like by correcting the dithered image element created. Further, when an underline drawn under a character, a cancel line, a ruled line frame, an outer frame and the like are contained in the elementary object image, there is a fear that blur and broken lines are produced due to a narrow line width thereof, so that it is preferred that determination is carried as to the above underlines and the like and that they are corrected in the contour-replotting process.

In other resects, the same processes are carried out as executed in the first to third embodiments, and it is clear that the same advantageous effects as obtained in the first to third embodiments are obtained. Hence, description thereof is omitted.

Although in the above embodiment, image processing for printing, that is, for creating print images in the tape printing apparatus 1 is taken as an example, the image processing method and device according to the invention can be applied to image processing for forming display images to be displayed on the display 4. Further, although in the above printing operation, C, M, and Y are used as three primary colors and C, M, and Y and K are employed as the four basic colors, it is preferred that for purposes of display, R (red), G (green) and B (blue) are used as three primary colors to effect image processing (dithering) by employing the three primary colors as the basic colors. Since colors can be represented by so-called additive color mixture, the image processing in this case is suitable for a case where illuminants, such as CRTs, liquid crystal displays, and plasma displays, emit light for representation of colors. In addition, in this case, the mixture (mixed color) of the colors R, G, B results in white.

Although in the above embodiments of the present invention, a printing apparatus of an ink jet type is employed by way of example, this is not limitative, but the invention can be applicable to a thermal type, a laser type and the like. Further, so long as a whole image is processed, at least one image element of the whole image has an elementary object image as a body or object having pixels distinguishable from pixels of an elementary background image as the background of the elementary object image, and all the pixels of at least the elementary object image has an identical gradation, the invention can be applied to any device, such as a printing apparatus and a display device, both of a general type, and to image processing for forming images for any possible purposes.

It is further understood by those skilled in the art that the foregoing is a preferred embodiment of the invention, and that various changes and modifications may be made without departing from the spirit and scope thereof.

What is claimed is:

1. A method of carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values, the method comprising the steps of:
forming and storing an elementary shape image, represented by a first two-valued matrix of predetermined two values, for each of at least one selected image element of a whole image having at least one image element including said at least one selected image element, said at least one selected image element each having pixels which can be divided into pixels forming an elementary object image and pixels forming an elementary background image as a background of said elementary object image, by assigning a validity-indicative one of said two predetermined values to all of said pixels forming said elementary object image, and an invalidity-indicative one of said two predetermined values to all of said pixels forming said elementary background image;
storing, for each corresponding one of said at least one selected image element, one of said n possible numerical values as a designated gradation value commonly applied to said all of said pixels forming said elementary object image;
storing a dither mask represented by a second two-valued matrix of said two predetermined values identical in size to said dither matrix, said second two-valued matrix formed by assigning said validity indicative one of said predetermined two values to matrix elements of said dither mask corresponding in matrix position to respective ones of said thresholds of said dither matrix with reference to which said designated gradation value satisfies a validity condition, and assigning said invalidity-indicative one of said predetermined two value values to remaining matrix elements of said dither mask corresponding in matrix position to respective ones of said thresholds of said dither matrix with reference to which said designated gradation value does not satisfy said validity condition; and
forming a dithered image element represented by a third two-valued matrix of said predetermined two values, said dithered image element being identical in size to said dither mask, by carrying out a logical AND operation between each of matrix elements of each of matrices forming said elementary shape image, said each of said matrices being identical in size to said dither mask, and a corresponding one of said matrix elements and said remaining matrix elements of said dither mask, on a matrix element-by-matrix element basis, such that said logical AND operation outputs said validity-indicative value only when said each of said matrix elements and said corresponding one both have said validity-indicative value.

2. A method according to claim 1, wherein said predetermined two values are 1 and 0.

3. A method according to claim 2, wherein if said each of said at least one selected image element is a monochrome image, the step of storing said one of said n possible numerical values as said designated gradation value comprises the step of storing a gradation value indicative of a shading of said monochrome image as said designated gradation value.

4. A method according to claim 1, wherein if said each of said at least one selected image element is a color image, the step of storing said one of said n possible numerical values as said designated gradation value comprises the step of storing primary color gradation values of respective three primary colors of said color image each as a kind of said designated gradation value;

the step of storing said dither mask comprises the step of storing at least one primary color dither mask each as a kind of said dither mask, such that a single primary color dither mask corresponds to ones of said primary colors identical in said primary color gradation value; and the step of forming said dithered image element comprises the step of forming three dithered primary color image elements each as a kind of said dithered image element by carrying out said logical AND operation by using a corresponding one of said at least one primary color dither mask as an operand.

5. A method according to claim 4, including the step of forming, as an additional kind of said dithered image element, a dithered mixed color image element in which said validity-indicative value is assigned to only matrix elements each corresponding in matrix position to matrix elements of said three dithered primary color image elements all of which are commonly assigned said validity-indicative value.

6. A method according to claim 5, wherein said dithered mixed color image element is formed by carrying out a logical AND operation of matrix elements, corresponding in location, of said three dithered primary color image elements, such that said logical AND operation outputs said validity-indicative value only when said matrix elements of said three dithered primary color image elements all have said validity-indicative value.

7. A method according to claim 5, further including the step of converting values of matrix elements of said three dithered primary color image elements corresponding in matrix position to said only matrix elements of said dithered mixed color image element which are assigned said validity-indicative value, to said invalidity-indicative value.

8. A method according to claim 7, wherein the step of converting said values of said matrix elements includes the steps of:

forming an inverted dithered mixed color image element by carrying out a logical NOT operation on matrix elements of said dithered mixed color image element, such that said logical NOT operation outputs inverted values of said validity-indicative value and said invalidity-indicative value; and forming updated three dithered primary color image elements by carrying out said logical AND operation between each matrix element of each of said three dithered primary color matrix elements and a corresponding matrix element of said dithered mixed color image element, such that said logical AND operation outputs said validity-indicative value only when said each matrix element and said corresponding matrix element both have said validity-indicative value.

9. A method according to claim 1, wherein if said each of said at least one selected image element is a color image, the step of storing said one of said n possible numerical values as said designated gradation value comprises the step of storing primary color gradation values of respective three primary colors of said color image each as a kind of said designated gradation value;

the step of storing said dither mask comprises the steps of:

storing at least one provisional primary color dither mask each as a kind of said dither mask, such that a single primary color dither mask corresponds to ones of said primary colors identical in said primary color gradation value;

storing a mixed color dither mask in which said validity-indicative value is assigned to only matrix elements each corresponding in matrix position to matrix elements of said at least one provisional primary color dither mask all of which are commonly assigned said validity-indicative value; and converting, out of matrix elements of each of said at lest one provisional primary color dither mask which have said validity indicative value, values of matrix elements corresponding in matrix position to matrix elements of said mixed color dither mask which have said validity-indicative value to said invalidity-indicative value, to thereby form at least one primary color dither mask, respectively, and storing said at least one primary color dither mask; and the step of forming said dithered image element comprises the step of forming a dithered mixed color image element corresponding to said mixed color dither mask and three dithered primary color image elements corresponding to said at least one primary color dither mask each as a kind of said dithered image element by carrying out said logical AND operation by using a corresponding one of said mixed color dither mask and said at least one primary color dither mask as an operand.

10. A method according to claim 9, wherein if all of said at least one provisional primary color dither mask are formed based on an identical dither matrix, one of said at least one primary color dither mask which contains a minimum number of matrix elements which have said validity-indicative value is stored as said mixed color dither mask.

11. A method according to claim 10, wherein said mixed color dither mask is one of said at least one provisional primary color dither mask corresponding to one of said primary color gradation values of said three primary colors selected such that said one of said primary color gradation values satisfies said validity condition with respect to a smallest number of thresholds of said dither matrix.

12. A method according to claim 11, wherein each of said primary color gradation values satisfies said validity condition when said each of said primary color graduation values is equal to or higher than a corresponding one of said thresholds of said dither matrix, and wherein said one of said primary color gradation values of said three primary colors is selected by selecting a smallest one of said primary color graduation values.

13. A method according to claim 11, wherein each of said primary color gradation values satisfies said validity condition when said each of said primary color graduation values is equal to or lower than a corresponding one of said thresholds of said dither matrix, and wherein said one of said primary color gradation values of said three primary colors is selected by selecting a largest one of said primary color graduation values.

14. A method according to claim 9, wherein said mixed color dither mask is formed by carrying out said logical AND operation on corresponding matrix elements of said at least one provisional primary color dither mask, such that said logical AND operation outputs said validity-indicative value only when all of said corresponding matrix elements have said validity-indicative value.

15. A method according to claim 9, wherein each of said at least one primary color dither mask is formed by carrying out said logical NOT operation on matrix elements of said colored dither, such that said logical NOT operation outputs inverted values of said validity indicative value and said invalidity-indicative value, to form an inverted mixed color dither mask, and carrying out said logical AND operation between said inverted mixed color dither mask and each of said at least one provisional primary color dither mask such that said logical AND operation outputs said validity-indicative value only when corresponding matrix elements between said inverted mixed color dither mask and each of said at least one provisional primary color dither mask both have said validity-indicative value.

16. A method according to claim 4, wherein said three primary colors are cyan, magenta, and yellow.

17. A method according to claim 1, wherein said dithered image element is formed as a print image for being printed on a print material.

18. A method according to claim 17, wherein matrix elements of said dithered image element which have said validity-indicative value correspond to pixels for which ink is to be ejected from an ink jet head.

19. A method according to claim 17, wherein said print material is a tape.

20. A method according to claim 4, wherein said three primary colors are red, green, and blue.

21. A method according to claim 1, wherein said dithered image element is formed as a display image for being displayed on a display screen.

22. A method according to claim 1, further including the step of forming a corrected dithered image element by correcting said dithered image element based on said elementary object image.

23. A method according to claim 22, wherein the step of forming said corrected dithered image element includes the step of assigning said validity-indicative value of said predetermined two values to matrix elements of said dithered image element which correspond to a contour line of said elementary object image.

24. A method according to claim 23, wherein the step of forming and storing said elementary shape image includes the steps of:
  forming an elementary object contour image represented by a two-valued matrix, based on a predetermined outline font, by assigning said validity-indicative value to only matrix elements forming a contour of said elementary object image, and assigning said invalidity-indicative value to the other matrix elements, and storing said elementary object contour image; and
  forming said elementary shape image by assigning said validity-indicative value to ones of the other matrix elements which are assigned said invalidity-indicative value, said ones being enclosed by said matrix elements forming said contour of said elementary object image.

25. A method according to claim 24, wherein the step of forming said elementary object contour image includes the step of drawing a contour line of said elementary object image based on said predetermined outline font again onto said dithered image element.

26. A method according to claim 25, wherein the step of forming said elementary object contour image includes the step of carrying out said logical OR operation on each matrix element of said dithered image element and a corresponding matrix element of said elementary object contour image such that said logical OR operation causes a corresponding matrix element of said elementary object contour image to have said validity-indicative value when said each matrix element or said corresponding matrix element has said validity-indicative value.

27. A method according to claim 22, wherein the step of forming said corrected dithered image element includes the step of determining whether or not said elementary object image has a predetermined characteristic, and when it is determined that said elementary object image has said predetermined characteristic, said dithered image element is corrected to set the result image to said corrected dithered image element, and when it is determined that said elementary object image does not have said predetermined characteristic, said dithered image element is directly set to said corrected dithered image element without any correction.

28. A method according to claim 27, wherein said predetermined characteristic includes a characteristic concerning a size of said elementary object image, and whether or not said elementary object image has said predetermined characteristic is determined based on a dot size.

29. A method according to claim 27, wherein said predetermined characteristic includes a property that a whole shape of said elementary object image has a size smaller than a predetermined size.

30. A method according to claim 27, wherein said predetermined characteristic includes a property that a line width of said elementary object image is smaller than a predetermined size.

31. An image processing device for carrying out dithering based on a dither matrix in which m-valued thresholds (m is an integer which is equal to or larger than 2) each defined by any one of m possible numerical values, are arranged as matrix elements for comparison with n-valued gradation values (n is an integer which is equal to or larger than 3, and at the same time $n \geq m$) each assigned to a pixel and having any one of n possible numerical values,
  the image processing device comprising:
    elementary shape image-forming means for forming and storing an elementary shape image represented by a first two-valued matrix of predetermined two values, for each of at least one selected image element of a whole image having at least one image element including said at least one selected image element, said at least one selected image element each having pixels which can be divided into pixels forming an elementary object image and pixels forming an elementary background image as a background of said elementary object image, by assigning a validity-indicative one of said two predetermined values to all of said pixels forming said elementary object image, and an invalidity-indicative one of said two predetermined values to all of said pixels forming said elementary background image;
    designated gradation value storage means for storing, for each corresponding one of said at least one selected image element, one of said n possible numerical values as a designated gradation value commonly applied to said all of said pixels forming said elementary object image;
    dither mask storage means far storing a dither mask represented by a second two-valued matrix of said two predetermined values identical in size to said dither matrix, said second two-valued matrix formed by assigning said validity-indicative one of said predetermined two values to matrix elements of said dither mask corresponding in matrix position to respective ones of said thresholds of said dither matrix with reference to which said designated gradation value satisfies a validity condition, and assigning said invalidity-indicative one of said predetermined two values to remaining matrix elements of said dither mask corresponding in matrix position to respective ones of said thresholds of said dither matrix with reference to which said designated gradation value does not satisfy said validity condition; and dithered image element-forming means for forming a dithered image element represented by a third two-valued matrix of said predetermined two values, said dithered image element being identical in size to said dither mask, by carrying out a logical AND operation between each of matrix elements of each of matrices forming said elementary shape image, said each of said matrices being identical in size to said dither mask, and a corresponding one of said matrix elements and said remaining matrix elements of said dither mask, on a matrix element-by-matrix element basis, such that said logical AND operation outputs said validity-indicative value only when said each of said matrix elements and said corresponding one both have said validity-indicative value.

32. An image processing device according to claim 31, wherein said predetermined two values are 1 and 0.

33. An image processing device according to claim 31, wherein if said each of said at least one selected image element is a monochrome image, said designated gradation value storage means stores a gradation value indicative of a shading of said monochrome image as said designated gradation value.

34. An image processing device according to claim 31, wherein if said each of said at least one selected image element is a color image, said designated gradation value storage means stores primary color gradation values of respective three primary colors of said color image each as a kind of said designated gradation value;

said dither mask storage means stores at least one primary color dither mask each as a kind of said dither mask, such that a single primary color dither mask corresponds to ones of said primary colors identical in said primary color gradation value; and said dithered image element-forming means forms three dithered primary color image elements each as a kind of said dithered image element by carrying out said logical AND operation by using a corresponding one of said at least one primary color dither mask as an operand.

35. An image processing device according to claim 34, including dithered mixed color image element-forming means for forming, as an additional kind of said dithered image element, a dithered mixed color image element in which said validity-indicative value is assigned to only matrix elements each corresponding in matrix position to matrix elements of said three dithered primary color image elements all of which are commonly assigned said validity-indicative value.

36. An image processing device according to claim 35, wherein said dithered mixed color image element is formed by carrying out a logical AND operation of matrix elements, corresponding in location, of said three dithered primary color image elements, such that said logical AND operation outputs said validity-indicative value only when said matrix elements of said three dithered primary color image elements all have said validity-indicative value.

37. An image processing device according to claim 35, further including mixed-color valid matrix elements-deleting means for converting values of matrix elements of said three dithered primary color image elements corresponding in matrix position to said only matrix elements of said dithered mixed color image element which are assigned said validity-indicative value, to said invalidity-indicative value.

38. An image processing g device according to claim 37, wherein said mixed-color valid matrix elements-deleting means includes:

inverted dithered mixed color image element-forming means for forming an inverted dithered mixed color image element by carrying out a logical NOT operation on matrix elements of said dithered mixed color image element, such that said logical NOT operation outputs inverted values of said validity-indicative value and said invalidity-indicative value; and updated dithered primary color image element-forming means for forming updated three dithered primary color image elements by carrying out said logical AND operation between each matrix element of each of said three dithered primary color matrix elements and a corresponding matrix element of said dithered mixed color image element, such that said logical AND operation outputs said validity-indicative value only when said each matrix element and said corresponding matrix element both have said validity-indicative value.

39. An image processing device according to claim 31, wherein if said each of said at least one selected image element is a color image, said designated gradation value storage means stores primary color gradation values of respective three primary colors of said color image each as a kind of said designated gradation value;

said dither mask storage means comprises:

provisional primary color dither mask storage means for storing at least one provisional primary color dither mask each as a kind of said dither mask, such that a single primary color dither mask corresponds to ones of said primary colors identical in said primary color gradation value;

mixed color dither mask storage means for storing a mixed color dither mask in which said validity-indicative value is assigned to only matrix elements each corresponding in matrix position to matrix elements of said at least one provisional primary color dither mask all of which are commonly assigned said validity-indicative value; and primary color dither mask storage means for converting, out of matrix elements of each of said at lest one provisional primary color dither mask which have said validity-indicative value, values of matrix elements corresponding in matrix position to matrix elements of said mixed color dither mask which have said validity-indicative value to said invalidity-indicative value, to thereby form at least one primary color dither mask, respectively, and storing said at least one primary color dither mask; and said dithered image element-forming means forms a dithered mixed color image element corresponding to said mixed color dither mask and three dithered primary color image elements corresponding to said at least one primary color dither mask each as a kind of said dithered image element by carrying out said logical AND operation by using a corresponding one of said mixed color dither mask and said at least one primary color dither mask as an operand.

40. An image processing device according to claim 39, wherein if all of said at least one provisional primary color dither mask are formed based on an identical dither matrix, one of said at least one primary color dither mask which contains a minimum number of matrix elements which have said validity-indicative value is stored as said mixed color dither mask.

41. An image processing device according to claim 40, wherein said mixed color dither mask is one of said at least one provisional primary color dither mask corresponding to one of said primary color gradation values of said three primary colors selected such that said one of said primary color gradation values satisfies said validity condition with respect to a smallest number of thresholds of said dither matrix.

42. An image processing device according to claim 41, wherein each of said primary color gradation values satisfies said validity condition when said each of said primary color graduation values is equal to or higher than a corresponding one of said thresholds of said dither matrix, and wherein said one of said primary color gradation values of said three primary colors is selected by selecting a smallest one of said primary color graduation values.

43. An image processing device according to claim 41, wherein each of said primary color gradation values satisfies said validity condition when said each of said primary color graduation values is equal to or lower than a corresponding one of said thresholds of said dither matrix, and wherein said one of said primary color gradation values of said three primary colors is selected by selecting a largest one of said primary color graduation values.

44. An image processing device according to claim 39, wherein said mixed color dither mask is formed by carrying out said logical AND operation on corresponding matrix elements of said at least on e provisional primary color dither mask, such that said logical AND operation outputs said validity-indicative value only when all of said corresponding matrix elements have said validity-indicative value.

45. An image processing device according to claim 39, wherein each of said at least one primary color dither mask is formed by carrying out said logical NOT operation on matrix elements of said colored dither, such that said logical NOT operation outputs inverted values of said validity-indicative value and said invalidity-indicative value, to form an inverted mixed color dither mask, and carrying out said logical AND operation between said inverted mixed color dither mask and each of said at least one provisional primary color dither mask such that said logical AND operation outputs said validity-indicative value only when corresponding matrix elements between said inverted mixed color dither mask and each of said at least one provisional primary color dither mask both have said validity-indicative value.

46. An image processing device according to claim 34, wherein said three primary colors are cyan, magenta, and yellow.

47. An image processing device according to claim 31, wherein said dithered image element is formed as a print image for being printed on a print material.

48. An image processing device according to claim 47, wherein matrix elements of said dithered image element which have said validity-indicative value correspond to pixels for which ink is to be ejected from an ink jet head.

49. An image processing device according to claim 47, wherein said print material is a tape.

50. An image processing device according to claim 34, wherein said three primary colors are red, green, and blue.

51. An image processing device according to claim 31, wherein said dithered image element is formed as a display image for being displayed on a display screen.

52. An image processing device according to claim 31, further including corrected dithered image element-forming means for forming corrected dithered image element by correcting said dithered image element based on said elementary object image.

53. An image processing device according to claim 52, wherein said corrected dithered image element-forming means includes contour line-redrawing means for assigning said validity-indicative value of said predetermined two values to matrix elements of said dithered image element which correspond to a contour line of said elementary object image.

54. An image processing device according to claim 53, wherein said elementary shape image-forming means includes:
  elementary object contour image-forming means for forming an elementary object contour image represented by a two-valued matrix, based on a predetermined outline font, by assigning said validity-indicative value to only matrix elements forming a contour of said elementary object image, and assigning said invalidity indicative value to the other matrix elements, and storing said elementary object contour image; and
  elementary object contour-filling means for forming said elementary shape image by assigning said validity-indicative value to ones of the other matrix elements which are assigned said invalidity-indicative value, said ones being enclosed by said matrix elements forming said contour of said elementary object image.

55. An image processing device according to claim 54, wherein said contour line-redrawing means includes elementary object contour line-redrawing means for drawing a contour line of said elementary object image based on said predetermined outline font again onto said dithered image element.

56. An image processing device according to claim 54, wherein said contour line-redrawing means includes logical OR operation means for carrying out said logical OR operation on each matrix element of said dithered image element and a corresponding matrix element of said elementary object contour image such that said logical OR operation causes a corresponding matrix element of said elementary object contour image to have said validity-indicative value when said each matrix element or said corresponding matrix element has said validity-indicative value.

57. An image processing device according to claim 52, wherein said corrected dithered image element-forming means includes elementary object image characteristic-determining means for determining whether or not said elementary object image has a predetermined characteristic, and when it is determined that said elementary object image has said predetermined characteristic, said dithered image element is corrected to set the result image to said corrected dithered image element, and when it is determined that said elementary object image does not have said predetermined characteristic, said dithered image element is directly set to said corrected dithered image element without any correction.

58. An image processing device according to claim 57, wherein said predetermined characteristic includes a characteristic concerning a size of said elementary object image, and whether or not said elementary object image has said predetermined characteristic is determined based on a dot size.

59. An image processing device according to claim 57, wherein said predetermined characteristic includes a property that a whole shape of said elementary object image has a size smaller than a predetermined size.

60. An image processing device according to claim 57, wherein said predetermined characteristic includes a property that a line width of said elementary object image is smaller than a predetermined size.

61. A method of carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time n≧m) each assigned to a pixel and having any one of n possible numerical values, the method comprising the steps of:

forming and storing an elementary shape image represented by a first two-valued matrix of predetermined two values, for each of at least one selected image element of a whole image having at least one image element including said at least one selected image element, said at least one selected image element each having pixels which can be divided into pixels forming an elementary object image and pixels forming an elementary background image as a background of said elementary object image, by assigning a validity-indicative one of said two predetermined values to all of said pixels forming said elementary object image, and an invalidity-indicative one of said two predetermined values to all of said pixels forming said elementary background image;

storing, for each corresponding one of said at least one selected image element, one of said n possible numerical values as a designated gradation value commonly applied to said all of said pixels forming said elementary object image;

determining a corrected gradation value determining means for determining a corrected gradation value based on said designated gradation value;

storing a dither mask represented by a second two-valued matrix of said two predetermined values identical in size to said dither matrix, said second two-valued matrix formed by assigning said validity-indicative one of said predetermined two values to matrix elements of said dither mask corresponding in matrix position to respective ones of said thresholds of said dither matrix with reference to which said corrected gradation value satisfies a validity condition, and assigning said invalidity-indicative one of said predetermined two values to remaining matrix elements of said dither mask corresponding in matrix position to respective ones of said thresholds of said dither matrix with reference to which said designated gradation value does not satisfy said validity condition; and forming a dithered image element represented by a third two-valued matrix of said predetermined two values, said dithered image element being identical in size to said dither mask, by carrying out a logical AND operation between each of matrix elements of each of matrices forming said elementary shape image, said each of said matrices being identical in size to said dither mask, and a corresponding one of said matrix elements and said remaining matrix elements of said dither mask, on a matrix element-by-matrix element basis, such that said logical AND operation outputs said validity-indicative value only when said each of said matrix elements and said corresponding one both have said validity-indicative value.

62. A method according to claim 61, wherein the step of determining said corrected gradation value includes determining whether said designated gradation value is within a predetermined range for correction, and correcting said designated gradation value to said corrected gradation value when it is determined that said designated gradation value is within said predetermined range for correction, or setting said designated gradation value directly to said corrected gradation value without correction.

63. A method according to claim 62, wherein said predetermined range for correction is a range corresponding to a range of color density lower than a predetermined value.

64. A method according to claim 62, wherein said predetermined range for correction is defined based on a ratio of a color density corresponding to said designated gradation value to a maximum color density.

65. A method according to claim 62, wherein said predetermined range for correction is defined as a range of gradation values.

66. A method according to claim 62, wherein said predetermined range for correction is defined as a range of numbers of matrix elements of said dither mask to which said validity-indicative value is assigned assuming that said designated gradation value is directly set to said corrected gradation value without correction.

67. A method according to claim 61, wherein said predetermined two values are 1 and 0.

68. A method according to claim 61, wherein if said each of said at least one selected image element is a monochrome image, the step of storing said one of said n possible numerical values as said designated gradation value comprises the step of storing a gradation value indicative of a shading of said monochrome image as said designated gradation value.

69. A method according to claim 61, wherein if said each of said at least one selected image element is a color image, the step of storing said one of said n possible numerical values as said designated gradation value comprises the step of storing primary color gradation values of respective three primary colors of said color image each as a kind of said designated gradation value;

the step of determining said corrected gradation value comprises the step of determining a corrected primary color gradation value for each of said primary colors based on a corresponding one of said primary color gradation values, as a kind of said corrected gradation value;

the step of storing said dither mask comprises the step of storing at least one primary color dither mask each as a kind of said dither mask, such that a single primary color dither mask corresponds to ones of said primary colors identical in said corrected primary color gradation value; and the step of forming said dithered image element comprises the step of forming three dithered primary color image elements each as a kind of said dithered image element by carrying out said logical AND operation by using a corresponding one of said at least one primary color dither mask as an operand.

70. A method according to claim 69, including the step of forming, as an additional kind of said dithered image element, a dithered mixed color image element in which said validity-indicative value is assigned to only matrix elements each corresponding in matrix position to matrix elements of said three dithered primary color image elements all of which are commonly assigned said validity-indicative value.

71. A method according to claim 70, wherein said dithered mixed color image element is formed by carrying out a logical AND operation of matrix elements, corresponding in location, of said three dithered primary color image elements, such that said logical AND operation outputs said validity-indicative value only when said matrix elements of said three dithered primary color image elements all have said validity-indicative value.

72. A method according to claim 70, further including the step of converting values of matrix elements of said three dithered primary color image elements corresponding in matrix position to said only matrix elements of said dithered mixed color image element which are assigned said validity-indicative value, to said invalidity-indicative value.

73. A method according to claim 72, wherein the step of converting said values of said matrix elements includes the steps of:

forming an inverted dithered mixed color image element by carrying out a logical NOT operation on matrix elements of said dithered mixed color image element, such that said logical NOT operation outputs inverted values of said validity-indicative value and said invalidity-indicative value; and forming updated three dithered primary color image elements by carrying out said logical AND operation between each matrix element of each of said three dithered primary color matrix elements and a corresponding matrix element of said dithered mixed color image element, such that said logical AND operation outputs said validity-indicative value only when said each matrix element and said corresponding matrix element both have said validity-indicative value.

74. A method according to claim 61, wherein if said each of said at least one selected image element is a color image, the step of storing said one of said n possible numerical values as said designated gradation value comprises the step of storing primary color gradation values of respective three primary colors of said color image each as a kind of said designated gradation value;

the step of determining said corrected gradation value comprises the step of determining a corrected primary color gradation value for each of said primary colors based on a corresponding one of said primary color gradation values, as a kind of said corrected gradation value;

the step of storing said dither mask comprises the steps of:
storing at least one provisional primary color dither mask each as a kind of said dither mask, such that a single primary color dither mask corresponds to ones of said primary colors identical in said corrected primary color gradation value;

storing a mixed color dither mask in which said validity-indicative value is assigned to only matrix elements each corresponding in matrix position to matrix elements of said at least one provisional primary color dither mask all of which are commonly assigned said validity-indicative value; and converting, out of matrix elements of each of said at least one provisional primary color dither mask which have said validity-indicative value, values of matrix elements corresponding in matrix position to matrix elements of said mixed color dither mask which have said validity-indicative value to said invalidity-indicative value, to thereby form at least one primary color dither mask, respectively, and storing said at least one primary color dither mask; and the step of forming said dithered image element comprises the step of forming a dithered mixed color image element corresponding to said mixed color dither mask and three dithered primary color image elements corresponding to said at least one primary color dither mask each as a kind of said dithered image element by carrying out said logical AND operation by using a corresponding one of said mixed color dither mask and said at least one primary color dither mask as an operand.

75. A method according to claim 74, wherein if all of said at least one provisional primary color dither mask are formed based on an identical dither matrix, one of said at least one primary color dither mask which contains a minimum number of matrix elements which have said validity-indicative value is stored as said mixed color dither mask.

76. A method according to claim 75, wherein said mixed color dither mask is one of said at least one provisional primary color dither mask corresponding to one of said corrected primary color gradation values of said three primary colors selected such that said one of said corrected primary color gradation values satisfies said validity condition with respect to a smallest number of thresholds of said dither matrix.

77. A method according to claim 76, wherein each of said corrected primary color gradation values satisfies said validity condition when said each of said corrected primary color graduation values is equal to or higher than a corresponding one of said thresholds of said dither matrix, and wherein said one of said corrected primary color gradation values of said three primary colors is selected by selecting a smallest one of said corrected primary color graduation values.

78. A method according to claim 76, wherein each of said primary color gradation values satisfies said validity condition when said each of said corrected primary color graduation values is equal to or lower than a corresponding one of said thresholds of said dither matrix, and wherein said one of said corrected primary color gradation values of said three primary colors is selected by selecting a largest one of said corrected primary color graduation values.

79. A method according to claim 74, wherein said mixed color dither mask is formed by carrying out said logical AND operation on corresponding matrix elements of said at least one provisional primary color dither mask, such that said logical AND operation outputs said validity-indicative value only when all of said corresponding matrix elements have said validity-indicative value.

80. A method according to claim 74, wherein each of said at least one primary color dither mask is formed by carrying out said logical NOT operation on matrix elements of said colored dither, such that said logical NOT operation outputs inverted values of said validity-indicative value and said invalidity-indicative value, to form an inverted mixed color dither mask, and carrying out said logical AND operation between said inverted mixed color dither mask and each of said at least one provisional primary color dither mask such that said logical AND operation outputs said validity-indicative value only when corresponding matrix elements between said inverted mixed color dither mask and each of said at least one provisional primary color dither mask both have said validity-indicative value.

81. A method according to claim 69, wherein said three primary colors are cyan, magenta, and yellow.

82. A method according to claim 61, wherein said dithered image element is formed as a print image for being printed on a print material.

83. A method according to claim 82, wherein matrix elements of said dithered image element which have said validity-indicative value correspond to pixels for which ink is to be ejected from an ink jet head.

84. A method according to claim 82, wherein said print material is a tape.

85. A method according to claim 69, wherein said three primary colors are red, green, and blue.

86. A method according to claim 61, wherein said dithered image element is formed as a display image for being displayed on a display screen.

87. A method according to claim 61, further including the step of entering a character including a letter, a numeral, a symbol, and a figure, as text data,
wherein said elementary shape image is formed by creating a character image corresponding to said text data of said entered character, based on predetermined font data.

88. An image processing device for carrying out dithering based on a dither matrix in which m-valued thresholds (m is an integer which is equal to or larger than 2) each defined by any one of m possible numerical values are arranged as matrix elements for comparison with n-valued gradation values (n is an integer which is equal to or larger than 3, and at the same time $n \geq m$) each assigned to a pixel and having any one of n possible numerical values,
the image processing device comprising:
elementary shape image-forming means for forming and storing an elementary shape image represented by a first two-valued matrix of predetermined two values, for each of at least one selected image element of a whole image having at least one image element including said at least one selected image element, said at least one selected image element each having pixels which can be divided into pixels forming an elementary object image and pixels forming an elementary background image as a background of said elementary object image, by assigning a validity-indicative one of said two predetermined values to all of said pixels forming said elementary object image, and an invalidity-indicative one of said two predetermined values to all of said pixels forming said elementary background image;
designated gradation value storage means for storing, for each corresponding one of said at least one selected image element, one of said n possible numerical values as a designated gradation value commonly applied to said all of said pixels forming said elementary object image;
corrected gradation value-determining means, for determining a corrected gradation value based on said designated gradation value;
dither mask storage means for storing a dither mask represented by a second two-valued matrix of said two predetermined values identical in size to said dither matrix, said second two-valued matrix formed by assigning said validity-indicative one of said predetermined two values to matrix elements of said dither mask corresponding in matrix position to respective ones of said thresholds of said dither matrix with reference to which said corrected gradation value satisfies a validity condition, and assigning said invalidity-indicative one of said predetermined two values to remaining matrix elements of said dither mask corresponding in matrix position to respective ones of said thresholds of said dither matrix with reference to which said designated gradation value does not satisfy said validity condition; and
dithered image element-forming means for forming a dithered image element represented by a third two-valued matrix of said predetermined two values, said dithered image element being identical in size to said dither mask, by carrying out a logical AND operation between each of matrix elements of each of matrices forming said elementary shape image, said each of said matrices being identical in size to said dither mask, and a corresponding one of said matrix elements and said remaining matrix elements of said dither mask, on a matrix element-by-matrix element basis, such that said logical AND operation outputs said validity-indicative value only when said each of said matrix elements and said corresponding one both have said validity-indicative value.

89. An image processing device according to claim 88, wherein said corrected gradation value-determining means determines whether said designated gradation value is within a predetermined range for correction, and corrects said designated gradation value to said corrected gradation value when it is determined that said designated gradation value is within said predetermined range for correction, or sets said designated gradation value directly to said corrected gradation value without correction.

90. An image processing device according to claim 89, wherein said predetermined range for correction is a range corresponding to a range of color density lower than a predetermined value.

91. An image processing device according to claim 89, wherein said predetermined range for correction is defined based on a ratio of a color density corresponding to said designated gradation value to a maximum color density.

92. An image processing device according to claim 89, wherein said predetermined range for correction is defined as a range of gradation values.

93. An image processing device according to claim 89, wherein said predetermined range for correction is defined as a range of numbers of matrix elements of said dither mask to which said validity-indicative value is assigned assuming that said designated gradation value is directly set to said corrected gradation value without correction.

94. An image processing device according to claim 88, wherein said predetermined two values are 1 and 0.

95. An image processing device according to claim 88, wherein if said each of said at least one selected image element is a monochrome image,
said designated gradation value storage means stores a gradation value indicative of a shading of said monochrome image as said designated gradation value.

96. An image processing device according to claim 88, wherein if said each of said at least one selected image element is a color image,
said designated gradation value storage means stores primary color gradation values of respective three primary colors of said color image each as a kind of said designated gradation value;
said corrected gradation value-determining means determines a corrected primary color gradation value for each of said primary colors based on a corresponding one of said primary color gradation values, as a kind of said corrected gradation value;

said dither mask storage means stores at least one primary color dither mask each as a kind of said dither mask, such that a single primary color dither mask corresponds to ones of said primary colors identical in said corrected primary color gradation value; and said dithered image element-forming means forms three dithered primary color image elements each as a kind of said dithered image element by carrying out said logical AND operation by using a corresponding one of said at least one primary color dither mask as an operand.

97. An image processing device according to claim 96, including dithered mixed color image element-forming means for forming, as an additional kind of said dithered image element, a dithered mixed color image element in which said validity-indicative value is assigned to only matrix elements each corresponding in matrix position to matrix elements of said three dithered primary color image elements all of which are commonly assigned said validity-indicative value.

98. An image processing device according to claim 97, wherein said dithered mixed color image element is formed by carrying out a logical AND operation of matrix elements, corresponding in location, of said three dithered primary color image elements, such that said logical AND operation outputs said validity-indicative value only when said matrix elements of said three dithered primary color image elements all have said validity-indicative value.

99. An image processing device according to claim 97, further including mixed-color valid matrix elements-deleting means for converting values of matrix elements of said three dithered primary color image elements corresponding in matrix position to said only matrix elements of said dithered mixed color image element which are assigned said validity-indicative value, to said invalidity-indicative value.

100. An image processing device according to claim 99, wherein said mixed-color valid matrix elements-deleting means includes:

inverted dithered mixed color image element-forming means for forming an inverted dithered mixed color image element by carrying out a logical NOT operation on matrix elements of said dithered mixed color image element, such that said logical NOT operation outputs inverted values of said validity-indicative value and said invalidity-indicative value; and updated dithered primary color image element-forming means for forming updated three dithered primary color image elements by carrying out said logical AND operation between each matrix element of each of said three dithered primary color matrix elements and a corresponding matrix element of said dithered mixed color image element, such that said logical AND operation outputs said validity-indicative value only when said each matrix element and said corresponding matrix element both have said validity-indicative value.

101. An image processing device according to claim 88, wherein if said each of said at least one selected image element is a color image, said designated gradation value storage means stores primary color gradation values of respective three primary colors of said color image each as a kind of said designated gradation value; and said corrected gradation value-determining means determines a corrected primary color gradation value for each of said primary colors based on a corresponding one of said primary color gradation values, as a kind of said corrected gradation value; and wherein said dither mask storage means comprises:

provisional primary color dither mask storage means for storing at least one provisional primary color dither mask each as a kind of said dither mask, such that a single primary color dither mask corresponds to ones of said primary colors identical in said corrected primary color gradation value;

mixed color dither mask storage means for storing a mixed color dither mask in which said validity-indicative value is assigned to only matrix elements each corresponding in matrix position to matrix elements of said at least one provisional primary color dither mask all of which are commonly assigned said validity-indicative value; and primary color dither mask storage means for converting, out of matrix elements of each of said at lest one provisional primary color dither mask which have said validity-indicative value, values of matrix elements corresponding in matrix position to matrix elements of said mixed color dither mask which have said validity-indicative value to said invalidity-indicative value, to thereby form at least one primary color dither mask, respectively, and storing said at least one primary color dither mask; and wherein said dithered image element-forming means forms a dithered mixed color image element corresponding to said mixed color dither mask and three dithered primary color image elements corresponding to said at least one primary color dither mask each as a kind of said dithered image element by carrying out said logical AND operation by using a corresponding one of said mixed color dither mask and said at least one primary color dither mask as an operand.

102. An image processing device according to claim 101, wherein if all of said at least one provisional primary color dither mask are formed based on an identical dither matrix, one of said at least one primary color dither mask which contains a minimum number of matrix elements which have said validity-indicative value is stored as said mixed color dither mask.

103. An image processing device according to claim 102, wherein said mixed color dither mask is one of said at least one provisional primary color dither mask corresponding to one of said corrected primary color gradation values of said three primary colors selected such that said one of said corrected primary color gradation values satisfies said validity condition with respect to a smallest number of thresholds of said dither matrix.

104. An image processing device according to claim 103, wherein each of said corrected primary color gradation values satisfies said validity condition when said each of said corrected primary color graduation values is equal to or higher than a corresponding one of said thresholds of said dither matrix, and wherein said one of said corrected primary color gradation values of said three primary colors is selected by selecting a smallest one of said corrected primary color graduation values.

105. An image processing device according to claim 103, wherein each of said corrected primary color gradation values satisfies said validity condition when said each of said corrected primary color gradation values is equal to or lower than a corresponding one of said thresholds of said dither matrix, and wherein said one of said corrected primary color gradation values of said three primary colors is selected by selecting a largest one of said corrected primary color gradation values.

106. An image processing device according to claim 101, wherein said mixed color dither mask is formed by carrying out said logical AND operation on corresponding matrix elements of said at least one provisional primary color dither mask, such that said logical AND operation outputs said validity-indicative value only when all of said corresponding matrix elements have said validity-indicative value.

107. An image processing device according to: claim 101, wherein each of said at least one primary color dither mask is formed by carrying out said logical NOT operation on matrix elements of said colored dither, such that said logical NOT operation outputs inverted values of said validity-indicative value and said invalidity-indicative value, to form an inverted mixed color dither mask, and carrying out said logical AND operation between said inverted mixed color dither mask and each of said at least one provisional primary color dither mask such that said logical AND operation outputs said validity-indicative value only when corresponding matrix elements between said inverted mixed color dither mask and each of said at least one provisional primary color dither mask both have said validity-indicative value.

108. An image processing device according to claim 96, wherein said three primary colors are cyan, magenta, and yellow.

109. An image processing device according to claim 88, wherein said dithered image element is formed as a print image for being printed on a print material.

110. An image processing device according to claim 109, wherein matrix elements of said dithered image element which have said validity-indicative value correspond to pixels for which ink is to be ejected from an ink jet head.

111. An image processing device according to claim 109, wherein said print material is a tape.

112. An image processing device according to claim 96, wherein said three primary colors are red, green, and blue.

113. An image processing device according to claim 88, wherein said dithered image element is formed as a display image for being displayed on a display screen.

114. An image processing device according to claim 88, further including character entry means for entering a character including a letter, a numeral, a symbol, and a figure, as text data; and font data storage means for storing predetermined font data;

wherein said elementary shape image is formed by creating a character image corresponding to said text data of said entered character, based on said predetermined font data.

\* \* \* \* \*